US012673560B2

(12) United States Patent　　　(10) Patent No.:　US 12,673,560 B2

Watanabe　　　(45) Date of Patent:　Jul. 7, 2026

(54) HAUL VEHICLE AND METHOD FOR CONTROLLING HAUL VEHICLE

(71) Applicant: Komatsu Ltd., Tokyo (JP)

(72) Inventor: Natsuki Watanabe, Tokyo (JP)

(73) Assignee: KOMATSU LTD., Tokyo (JP)

( * ) Notice: Subject to any disclaimer, the term of this patent is extended or adjusted under 35 U.S.C. 154(b) by 27 days.

(21) Appl. No.: 18/717,442

(22) PCT Filed: Dec. 26, 2022

(86) PCT No.: PCT/JP2022/048055

§ 371 (c)(1),
(2) Date: Jun. 7, 2024

(87) PCT Pub. No.: WO2023/127842

PCT Pub. Date: Jul. 6, 2023

(65) Prior Publication Data

US 2025/0042265 A1　　Feb. 6, 2025

(30) Foreign Application Priority Data

Dec. 28, 2021　(JP) ................................. 2021-214829

(51) Int. Cl.
B60L 50/53　　(2019.01)
B60L 50/75　　(2019.01)
B60L 58/40　　(2019.01)
B60L 5/26　　(2006.01)

(52) U.S. Cl.
CPC ............... B60L 50/53 (2019.02); B60L 50/75 (2019.02); B60L 58/40 (2019.02); B60L 5/26

(2013.01); B60L 2200/36 (2013.01); B60L 2200/44 (2013.01); B60L 2240/60 (2013.01)

(58) Field of Classification Search
None
See application file for complete search history.

(56) References Cited

U.S. PATENT DOCUMENTS

| | | | | |
|---|---|---|---|---|
| 5,103,923 | A * | 4/1992 | Johnston | ................. B60L 50/61 |
| | | | | 180/65.265 |
| 9,022,153 | B2 | 5/2015 | Tojima et al. | |
| 9,225,268 | B2 * | 12/2015 | Nagatsuka | ................ B60L 3/00 |
| 2005/0242588 | A1 * | 11/2005 | Washington | ........ H01M 8/0687 |
| | | | | 429/513 |
| 2007/0138006 | A1 * | 6/2007 | Oakes | ..................... B60L 58/30 |
| | | | | 204/266 |

(Continued)

FOREIGN PATENT DOCUMENTS

| | | |
|---|---|---|
| JP | H03-036164 U | 4/1991 |
| JP | 2006-340464 A | 12/2006 |

(Continued)

*Primary Examiner* — Daniel L Greene

(74) *Attorney, Agent, or Firm* — Troutman Pepper Locke LLP; James E. Armstrong, IV; Joshua L. Jones

(57) ABSTRACT

A haul vehicle includes a dump body, a vehicle body supporting the dump body, a traveling apparatus including driving wheels and supporting the vehicle body, a trolley power receiving apparatus to which power is supplied from a trolley wire, a fuel cell that generates power through electrochemical reaction between hydrogen and oxygen, and an electric motor that generates driving force for rotating the driving wheels on a basis of power from at least one of the trolley wire or the fuel cell.

17 Claims, 29 Drawing Sheets

(56)                      References Cited

U.S. PATENT DOCUMENTS

| | | | |
|---|---|---|---|
| 2011/0094841 A1* | 4/2011 | Mazumdar | B60M 7/00 |
| | | | 191/33 R |
| 2013/0113279 A1 | 5/2013 | Hatanaka | |
| 2013/0126250 A1 | 5/2013 | Ruth | |
| 2013/0313059 A1* | 11/2013 | Inarida | B60L 15/007 |
| | | | 191/57 |
| 2016/0152129 A1 | 6/2016 | West et al. | |
| 2021/0316678 A1 | 10/2021 | Wolff | |
| 2024/0149717 A1* | 5/2024 | Hendrickson | B60L 53/22 |

FOREIGN PATENT DOCUMENTS

| | | |
|---|---|---|
| JP | 4056247 B2 | 3/2008 |
| JP | 2010-063274 A | 3/2010 |
| JP | 2012-239268 A | 12/2012 |
| JP | 5931669 B2 | 6/2016 |
| JP | 6257931 B2 | 1/2018 |
| JP | 6441343 B2 | 12/2018 |
| JP | 2021-170922 A | 10/2021 |
| WO | 2012/014540 A1 | 2/2012 |

* cited by examiner

Figure 27:
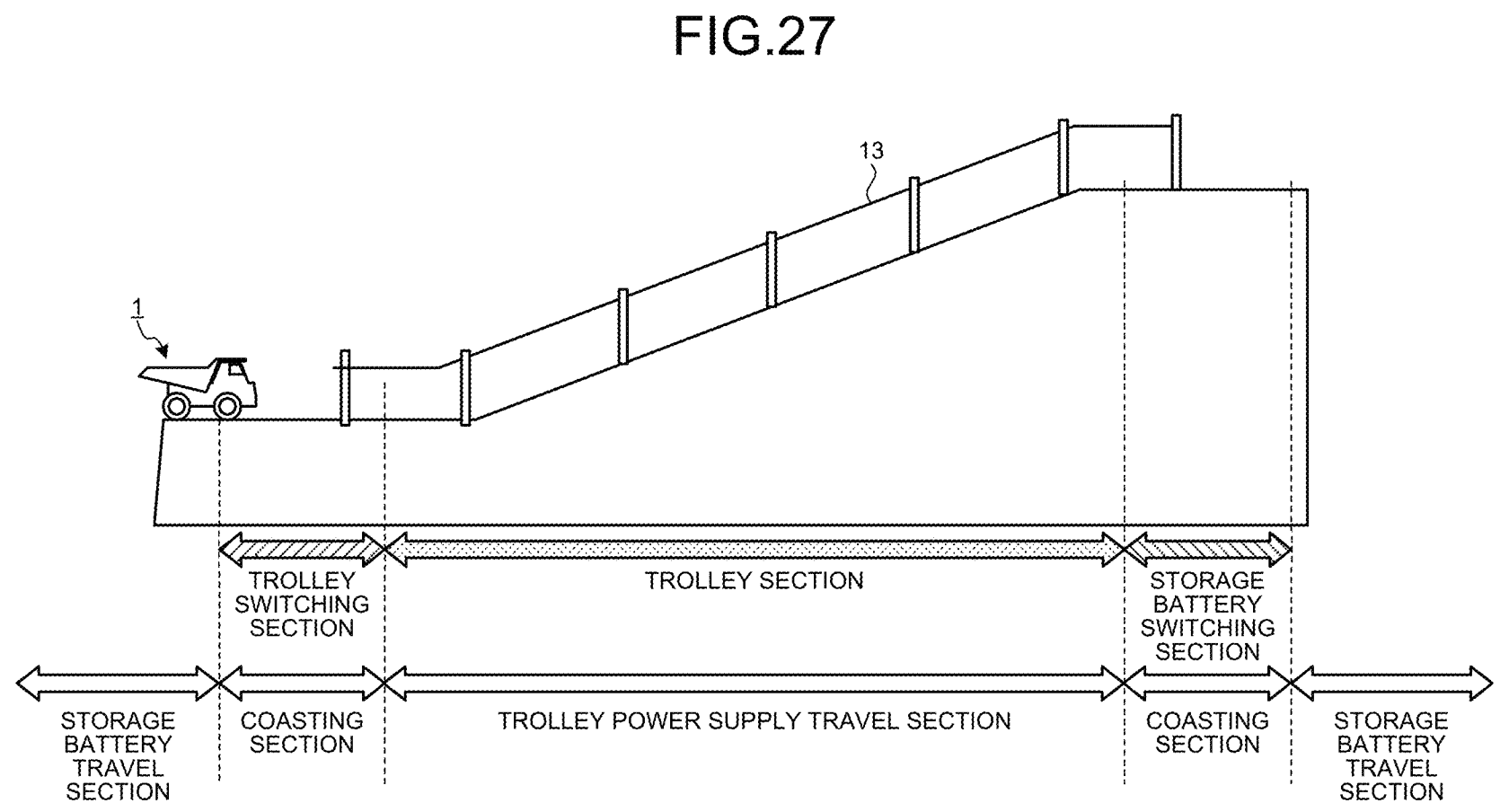

STORAGE BATTERY TRAVEL SECTION

STORAGE BATTERY SWITCHING SECTION

COASTING SECTION

TROLLEY SECTION

TROLLEY POWER SUPPLY TRAVEL SECTION

TROLLEY SWITCHING SECTION

COASTING SECTION

STORAGE BATTERY TRAVEL SECTION

HAUL VEHICLE AND METHOD FOR CONTROLLING HAUL VEHICLE

FIELD

The present disclosure relates to a haul vehicle and a method for controlling the haul vehicle.

BACKGROUND

In a technical field related to haul vehicles, a mining truck as disclosed in Patent Literature 1 is known.

CITATION LIST

Patent Literature

Patent Literature 1: US 2013/0126250 A

SUMMARY

Technical Problem

When an engine is used as a power source of a haul vehicle, exhaust gas from the engine might contaminate an environment of a work site.

An object of the present disclosure is to control pollution of an environment of a work site.

Solution to Problem

According to an aspect of the present invention, a haul vehicle comprises: a dump body; a vehicle body supporting the dump body; a traveling apparatus including driving wheels and supporting the vehicle body; a trolley power receiving apparatus to which power is supplied from a trolley wire; a fuel cell that generates power through electrochemical reaction between hydrogen and oxygen; and an electric motor that generates driving force for rotating the driving wheels on a basis of power from at least one of the trolley wire or the fuel cell.

Advantageous Effects of Invention

According to the present disclosure, pollution of an environment of a work site is controlled.

BRIEF DESCRIPTION OF DRAWINGS

FIG. 6 is a hard block diagram illustrating another example of the energy supply system according to the first embodiment.

FIG. 8 is an image diagram illustrating an example of an operation of the energy supply system according to the first embodiment.

FIG. 19 is an image diagram illustrating an example of an operation of the energy supply system according to the second embodiment.

FIG. 27 is an image diagram illustrating an example of an operation of the energy supply system according to the third embodiment.

DESCRIPTION OF EMBODIMENTS

Embodiments of the present disclosure will be described hereinafter with reference to the drawings, but the present disclosure is not limited to the embodiments. Components in the embodiments described below can be appropriately combined together. In addition, some components might not be used in some cases.

First Embodiment

A first embodiment will be described.

<Haul Vehicle>

Figure 1:
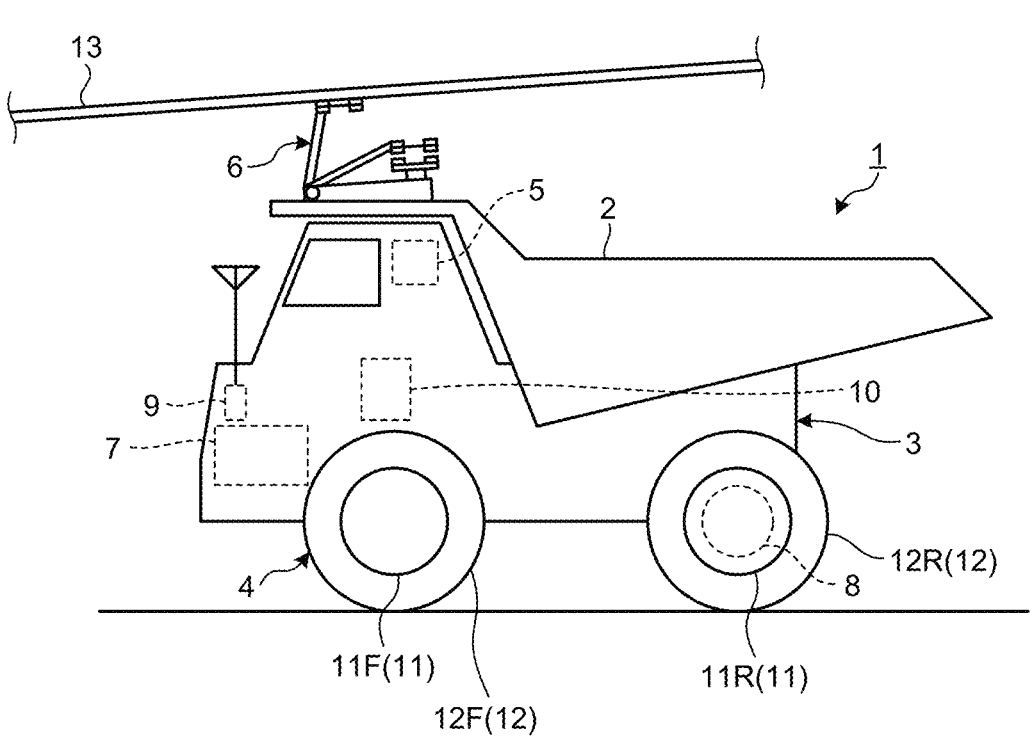
FIG. 1 is a diagram schematically illustrating a haul vehicle according to a first embodiment.

FIG. 1 is a diagram schematically illustrating a haul vehicle 1 according to the embodiment. In the embodiment, the haul vehicle 1 is a dump truck that travels at a work site and that transports a load. An example of the work site of the haul vehicle 1 is a mine or a quarry. The mine refers to a place or a business facility where minerals are mined. Examples of the mine include a metal mine for mining a metal, a non-metal mine for mining limestone, and a coal mine for mining coal. The quarry refers to a place or a business facility where stones are mined. An example of the load to be transported by the haul vehicle 1 is excavated objects excavated at the work site.

The haul vehicle 1 may be an unmanned dump truck that operates in an unmanned manner without depending on a driving operation by a driver, or may be a manned dump truck that operates on the basis of a driving operation by a driver. It is assumed in the embodiment that the haul vehicle 1 is a manned dump truck.

The haul vehicle 1 includes a dump body 2, a vehicle body 3, a traveling apparatus 4, a trolley power receiving apparatus 5, a power feed pantograph 6, a fuel cell 7, a traveling drive motor 8, a position sensor 9, and a control apparatus 10.

The dump body 2 is a member on which a load is loaded. At least a part of the dump body 2 is disposed above the vehicle body 3. The dump body 2 performs a dumping operation and a lowering operation. The dumping operation refers to an operation for separating the dump body 2 from the vehicle body 3 and inclining the dump body 2 in a dumping direction. The lowering operation refers to an operation for bringing the dump body 2 close to the vehicle body 3. When soil is discharged, the dump body 2 performs the dumping operation.

The vehicle body 3 includes a vehicle body frame. The vehicle body 3 supports the dump body 2. The vehicle body 3 is supported by the traveling apparatus 4. The trolley power receiving apparatus 5, the fuel cell 7, the position sensor 9, and the control apparatus 10 are each mounted on the vehicle body 3.

The traveling apparatus 4 supports the vehicle body 3. The traveling apparatus 4 causes the haul vehicle 1 to travel. The traveling apparatus 4 causes the haul vehicle 1 to travel forward or backward. At least a part of the traveling apparatus 4 is disposed below the vehicle body 3. The traveling apparatus 4 includes wheels 11 and tires 12.

The tires 12 are mounted on the wheels 11. The wheels 11 include front wheels 11F and rear wheels 11R. The tires 12 include front tires 12F mounted on the front wheels 11F and rear tires 12R mounted on the rear wheels 11R. The front wheels 11F are steering wheels. The rear wheels 11R are driving wheels.

Power is supplied to the trolley power receiving apparatus 5 from a trolley wire 13. The trolley power receiving apparatus 5 receives power supplied from the trolley wire 13. The trolley wire 13 is an overhead wire provided at the work site. The trolley power receiving apparatus 5 receives power from the trolley wire 13 via the power feed pantograph 6. The power feed pantograph 6 is supported by a part of the dump body 2. The power feed pantograph 6 moves up and down with respect to the dump body 2. When the power feed pantograph 6 moves up and comes into contact with the trolley wire 13, power is supplied from the trolley wire 13 to the trolley power receiving apparatus 5. When the power feed pantograph 6 moves down and separates from the trolley wire 13, the supply of power from the trolley wire 13 to the trolley power receiving apparatus 5 is stopped.

The fuel cell 7 generates power through electrochemical reaction between hydrogen and oxygen. An outside air inlet is provided in a front part of the vehicle body 3. The fuel cell 7 generates power using oxygen contained in air introduced from the outside air inlet.

The traveling drive motor 8 is an electric motor that generates driving force for rotating the rear wheels 11R, which are the driving wheels. The traveling drive motor 8 generates driving force for generating driving force for rotating the rear wheels 11R on the basis of power from at least one of the trolley wire 13 or the fuel cell 7.

The position sensor 9 detects a position of the haul vehicle 1. The position sensor 9 is disposed on the vehicle body 3. The position sensor 9 detects a current position of the vehicle body 3. In the embodiment, the position sensor 9 detects the position of the haul vehicle 1 using a global navigation satellite system (GNSS). The position sensor 9 includes a GNSS receiver.

Figure 2:
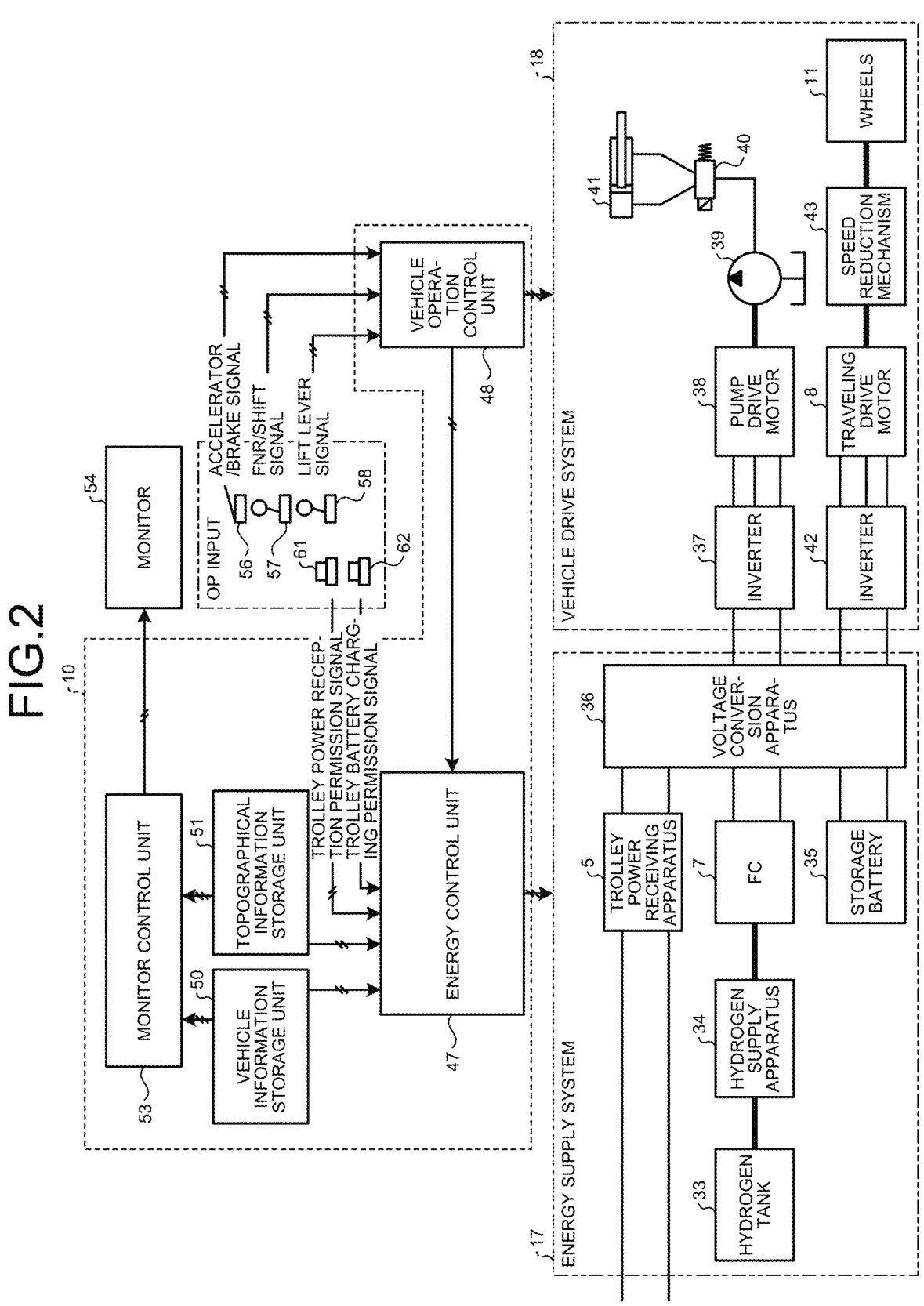
FIG. 2 is a configuration diagram illustrating the haul vehicle according to the first embodiment.

FIG. 2 is a configuration diagram illustrating the haul vehicle 1 according to the embodiment. The haul vehicle 1 includes a monitor 54, an accelerator brake pedal 56, a shift lever 57, a lift lever 58, a first input unit 61, a second input unit 62, an energy supply system 17, a vehicle drive system 18, and the control apparatus 10.

The monitor 54, the accelerator brake pedal 56, the shift lever 57, the lift lever 58, the first input unit 61, and the second input unit 62 are each disposed in a cab of the haul vehicle 1. The monitor 54 displays display data. When the accelerator brake pedal 56 is operated by the driver, the traveling apparatus 4 is accelerated or decelerated. When the shift lever 57 is operated by the driver, speed of the traveling apparatus 4 is changed, or forward movement and backward movement of the traveling apparatus 4 are switched. When the lift lever 58 is operated by the driver, the dump body 2 performs the dumping operation or the lowering operation. Each of the first input unit 61 and the second input unit 62 generates an input signal when operated by the driver.

The energy supply system 17 includes a hydrogen tank 33, a hydrogen supply apparatus 34, the trolley power receiving apparatus 5, the fuel cell 7, the storage battery 35, and a voltage conversion apparatus 36. The hydrogen supply apparatus 34 supplies hydrogen in the hydrogen tank 33 to the fuel cell 7. Air is supplied to the fuel cell 7 from the outside air inlet provided in vehicle body 3. The fuel cell 7 generates power through electrochemical reaction between hydrogen and oxygen. The storage battery 35 is charged with power from at least one of the trolley wire 13 or the fuel cell 7. The voltage conversion apparatus 36 converts a voltage of the fuel cell 7 or a voltage of the storage battery 35.

The vehicle drive system 18 includes an inverter 37, a pump drive motor 38, a hydraulic pump 39, a control valve 40, a hoist cylinder 41, an inverter 42, the traveling drive motor 8, a speed reduction mechanism 43, and the wheels 11. The inverter 37 converts a direct current from the voltage conversion apparatus 36 into a three-phase alternating current and supplies the three-phase alternating current to the pump drive motor 38. The pump drive motor 38 is an electric motor that generates driving force for operating the hydraulic pump 39. Hydraulic oil discharged from the hydraulic pump 39 is supplied to the hoist cylinder 41 via the control valve 40. When the hydraulic oil is supplied to the hoist cylinder 41, the hoist cylinder 41 operates. The hoist cylinder 41 causes the dump body 2 to perform the dumping operation or the lowering operation. The inverter 42 converts a direct current from the voltage conversion apparatus 36 into a three-phase alternating current and supplies the three-phase alternating current to the traveling drive motor 8. The traveling drive motor 8 is an electric motor that generates driving force for rotating the rear wheels 11R. The driving force generated by the traveling drive motor 8 is transmitted to the rear wheels 11R via the speed reduction mechanism 43. When the wheels 11 rotate, the haul vehicle 1 travels.

The control apparatus 10 includes an energy control unit 47, a vehicle operation control unit 48, a vehicle information storage unit 50, a topographical information storage unit 51, and a monitor control unit 53. The energy control unit 47 controls the energy supply system 17. When operated by the driver, the first input unit 61 generates a trolley power reception permission signal as an input signal. When operated by the driver, the second input unit 62 generates a trolley battery charging permission signal as an input signal. The vehicle operation control unit 48 controls the vehicle drive system 18. The vehicle information storage unit 50 stores information related to the haul vehicle 1 on which the vehicle information storage unit 50 is mounted. The topographical information storage unit 51 stores map information regarding the work site. The map information regarding the work site includes topographical information and positional information regarding the work site. The topographic information regarding the work site includes, for example, an inclination angle (gradient) of a road surface of a travel path of the work site where the haul vehicle 1 travels. The positional information regarding the work site includes positional information regarding trolley switching sections, positional information regarding trolley sections, and positional information regarding FC switching sections. The monitor control unit 53 controls the monitor 54.

<Energy Supply System>

Figure 3:
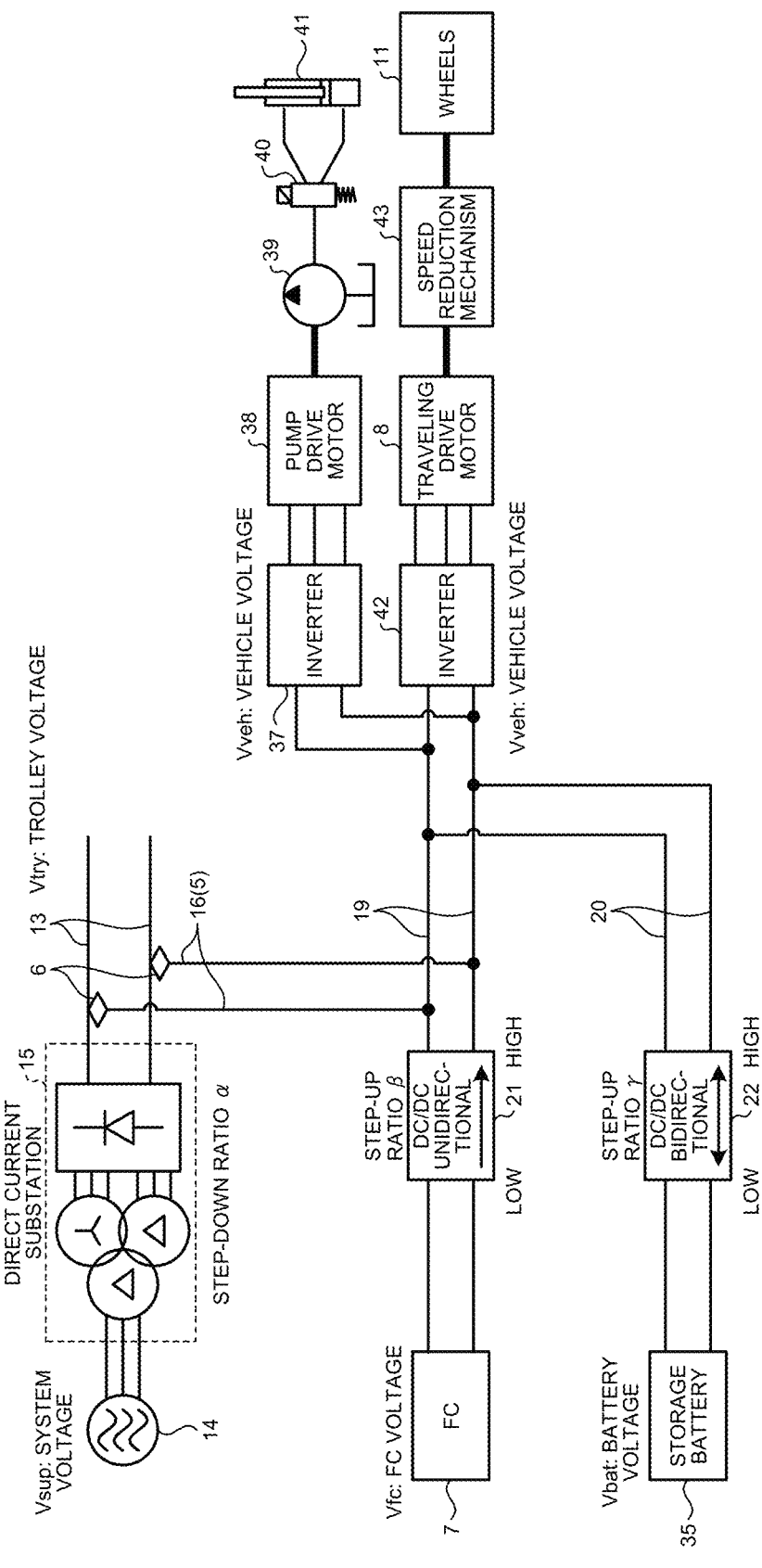
FIG. 3 is a hard block diagram illustrating an example of an energy supply system according to the first embodiment.

FIG. 3 is a hard block diagram illustrating an example of the energy supply system 17 according to the embodiment. The energy supply system 17 supplies power to the vehicle drive system 18. The energy supply system 17 supplies power to the pump drive motor 38 via the inverter 37 and supplies power to the traveling drive motor 8 via the inverter 42. In order to simplify description, supplying power to at least one of the pump drive motor 38 or the traveling drive motor 8 will be appropriately referred to as supplying power to the vehicle drive system 18 hereinafter.

The energy supply system 17 includes the power feed pantograph 6, the fuel cell 7, a DC/DC converter 21, the storage battery 35, and a DC/DC converter 22. The voltage conversion apparatus 36 includes the DC/DC converter 21 and the DC/DC converter 22.

An alternating current generated in a power plant 14 is converted into a direct current in a direct current substation 15. The direct current substation 15 steps down a system voltage Vsup of the power plant 14 by a certain step-down ratio α. The direct current substation 15 lowers the system voltage Vsup to a trolley voltage Vtry. The trolley power receiving apparatus 5 includes a trolley power feed line 16 connected to the power feed pantograph 6. Power is supplied to the trolley power feed line 16 from the trolley wire 13. The trolley voltage Vtry is applied to the trolley power feed line 16.

The fuel cell 7 is connected to the vehicle drive system 18 via a power line 19. The storage battery 35 is connected to the vehicle drive system 18 via a power line 20. The trolley power feed line 16 is connected to the power line 19.

The DC/DC converter 21 converts an FC voltage Vfc indicating a voltage of the fuel cell 7. The DC/DC converter 21 is disposed in the power line 19. The DC/DC converter 21 steps up the FC voltage Vfc by a certain step-up ratio β. The DC/DC converter 21 is a unidirectional DC/DC converter capable of outputting power only from a primary side to a secondary side. The primary side of the DC/DC converter 21 is a low-voltage side. The secondary side of the DC/DC converter 21 is a high-voltage side.

The trolley power feed line 16 is connected to the power line 19 between the DC/DC converter 21 and the vehicle drive system 18. That is, the trolley power feed line 16 is connected to the power line 19 on the secondary side of the DC/DC converter 21. The primary side of the DC/DC converter 21 is a side of the fuel cell 7, and the secondary side of the DC/DC converter 21 is a side of the trolley power feed line 16 (a side of the vehicle drive system 18). Power is supplied from the fuel cell 7 to the vehicle drive system 18 via the DC/DC converter 21. The FC voltage Vfc converted by the DC/DC converter 21 is applied to the traveling drive motor 8 of the vehicle drive system 18. Power is not supplied from the trolley power feed line 16 to the fuel cell 7 by the DC/DC converter 21.

The DC/DC converter 22 converts a battery voltage Vbat indicating the voltage of the storage battery 35. The DC/DC converter 22 is disposed in the power line 20. The DC/DC converter 22 steps up the battery voltage Vbat by a certain step-up ratio γ. The DC/DC converter 22 is a bidirectional DC/DC converter capable of outputting power from a primary side to a secondary side and outputting power from the secondary side to the primary side. The primary side of the DC/DC converter 22 is a low-voltage side. The secondary side of the DC/DC converter 22 is a high-voltage side.

The power line 20 is connected to the power line 19 on the secondary side of the DC/DC converter 21. The power line 20 is connected to the power line 19 between a connection between the trolley power feed line 16 and the power line 19 and the vehicle drive system 18. The primary side of the DC/DC converter 22 is a side of the storage battery 35, and the secondary side of the DC/DC converter 22 is the side of the trolley power feed line 16 (the side of the vehicle drive system 18). Power is supplied from the storage battery 35 to the vehicle drive system 18 via the DC/DC converter 22. The battery voltage Vbat converted by the DC/DC converter 22 is applied to the traveling drive motor 8 of the vehicle drive system 18. In addition, the storage battery 35 is charged with power from at least one of the trolley wire 13 or the fuel cell 7.

When the step-down ratio α is low and the trolley voltage Vtry is low, the power received by the trolley power receiving apparatus 5 is small. A vehicle voltage Vveh indicating a required voltage of the vehicle drive system 18, therefore, decreases, and an increase in cost is suppressed. When the step-down ratio α is 0.27 and the trolley voltage Vtry is 27% of the system voltage Vsup, for example, the vehicle voltage Vveh is 27% of the system voltage Vsup. The step-up ratio β and the step-up ratio γ are determined on the basis of the vehicle voltage Vveh. When the FC voltage Vfc is 6% or more and 12% or less of the system voltage Vsup, the step-up ratio @ is 2.3 or more and 4.5 or less. When the battery voltage Vbat is 13% or more and 15% or less of the system voltage Vsup, the step-up ratio β is 1.8 or more and 2.1 or less.

When the step-down ratio α is high and the trolley voltage Vtry is high, the power received by the trolley power receiving apparatus 5 is large. Therefore, the vehicle voltage Vveh, for example, increases, and a traveling output of the traveling apparatus 4 improves. When the step-down ratio α is 0.39 and the trolley voltage Vtry is 40% of the system voltage Vsup, for example, the vehicle voltage Vveh is 40% of the system voltage Vsup. The step-up ratio β and the step-up ratio γ are determined on the basis of the vehicle voltage Vveh. When the FC voltage Vfc is 6% or more and 12% or less of the system voltage Vsup, the step-up ratio β is 3.3 or more and 6.7 or less. When the battery voltage Vbat is 13% or more and 15% or less of the system voltage Vsup, the step-up ratio @ is 2.7 or more and 3.1 or less.

Figure 4:
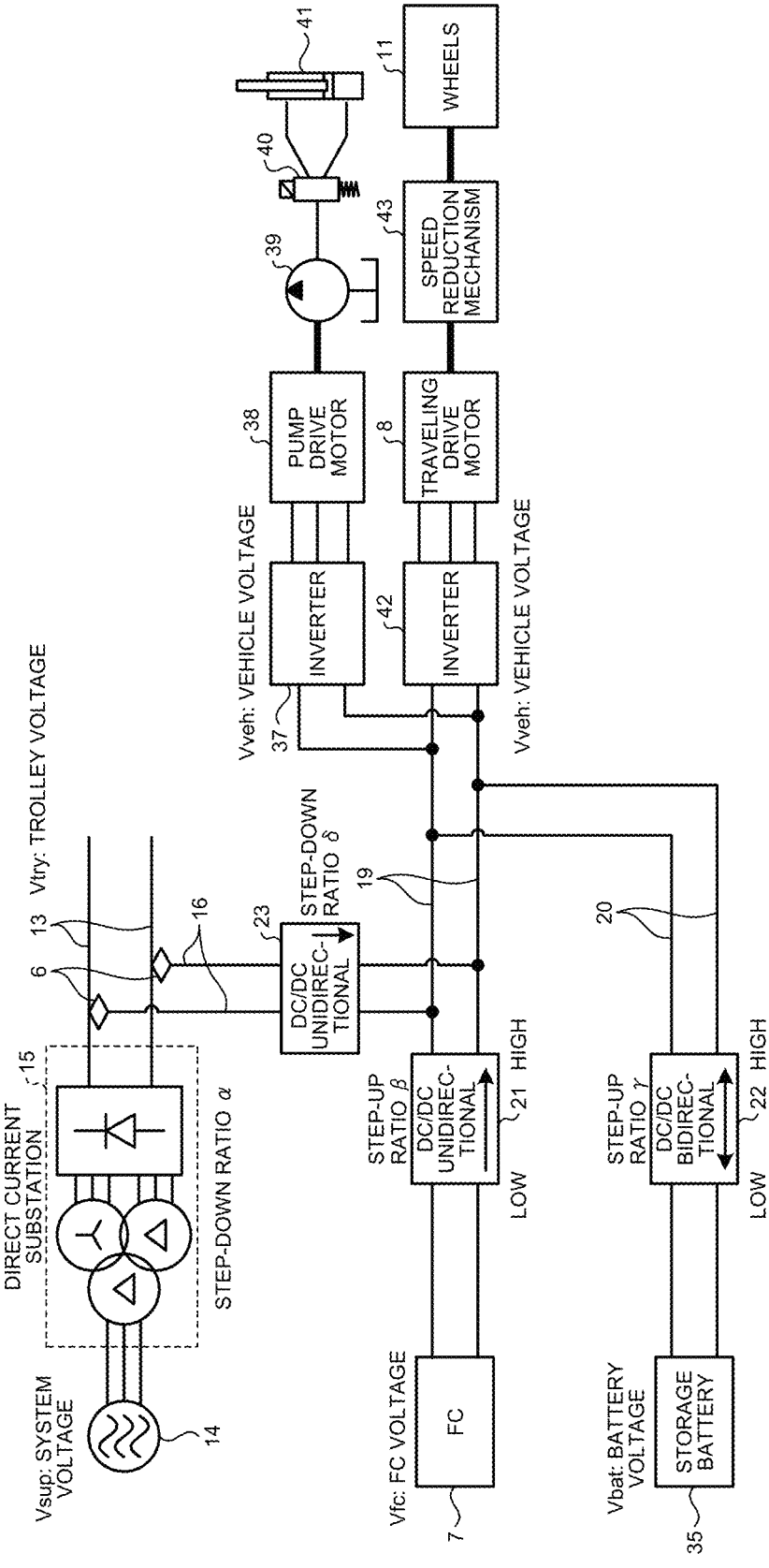
FIG. 4 is a hard block diagram illustrating another example of the energy supply system according to the first embodiment.

FIG. 4 is a hard block diagram illustrating an example of the energy supply system 17 according to the embodiment. FIG. 4 is a modification of FIG. 3 and illustrates an example where a DC/DC converter 23 is added to the configuration illustrated in FIG. 3.

The DC/DC converter 23 converts the trolley voltage Vtry indicating a voltage of the trolley wire 13. The DC/DC converter 23 is disposed in the trolley power feed line 16. The DC/DC converter 23 steps down the trolley voltage Vtry by a certain step-down ratio δ. The DC/DC converter 23 is a unidirectional DC/DC converter capable of outputting power only from a primary side to a secondary side. The primary side of the DC/DC converter 23 is a high-voltage side. The secondary side of the DC/DC converter 23 is a low-voltage side.

The DC/DC converter 23 may be a bidirectional DC/DC converter capable of outputting power from the primary side to the secondary side and outputting power from the secondary side to the primary side, instead.

The primary side of the DC/DC converter 23 is a side of the trolley wire 13, and the secondary side of the DC/DC converter 23 is a side of the power line 19 (the side of the vehicle drive system 18). Power is supplied from the trolley wire 13 to the vehicle drive system 18 via the DC/DC converter 23. The trolley voltage Vtry converted by the DC/DC converter 23 is applied to the traveling drive motor 8 of the vehicle drive system 18.

The DC/DC converter 23, which steps down the trolley voltage Vtry, can increase the trolley voltage Vtry even if the vehicle voltage Vveh is low. When the step-down ratio α is 0.39, the trolley voltage Vtry is 40% of the system voltage Vsup, and the step-down ratio δ is 0.68, for example, the vehicle voltage Vveh is 27% of the system voltage Vsup. The step-up ratio β and the step-up ratio γ are determined on the basis of the vehicle voltage Vveh. When the FC voltage Vfc is 6% or more and 12% or less of the system voltage Vsup, the step-up ratio β is 2.3 or more and 4.5 or less. When the battery voltage Vbat is 13% or more and 15% or less of the system voltage Vsup, the step-up ratio β is 1.8 or more and 2.1 or less.

Figure 5:
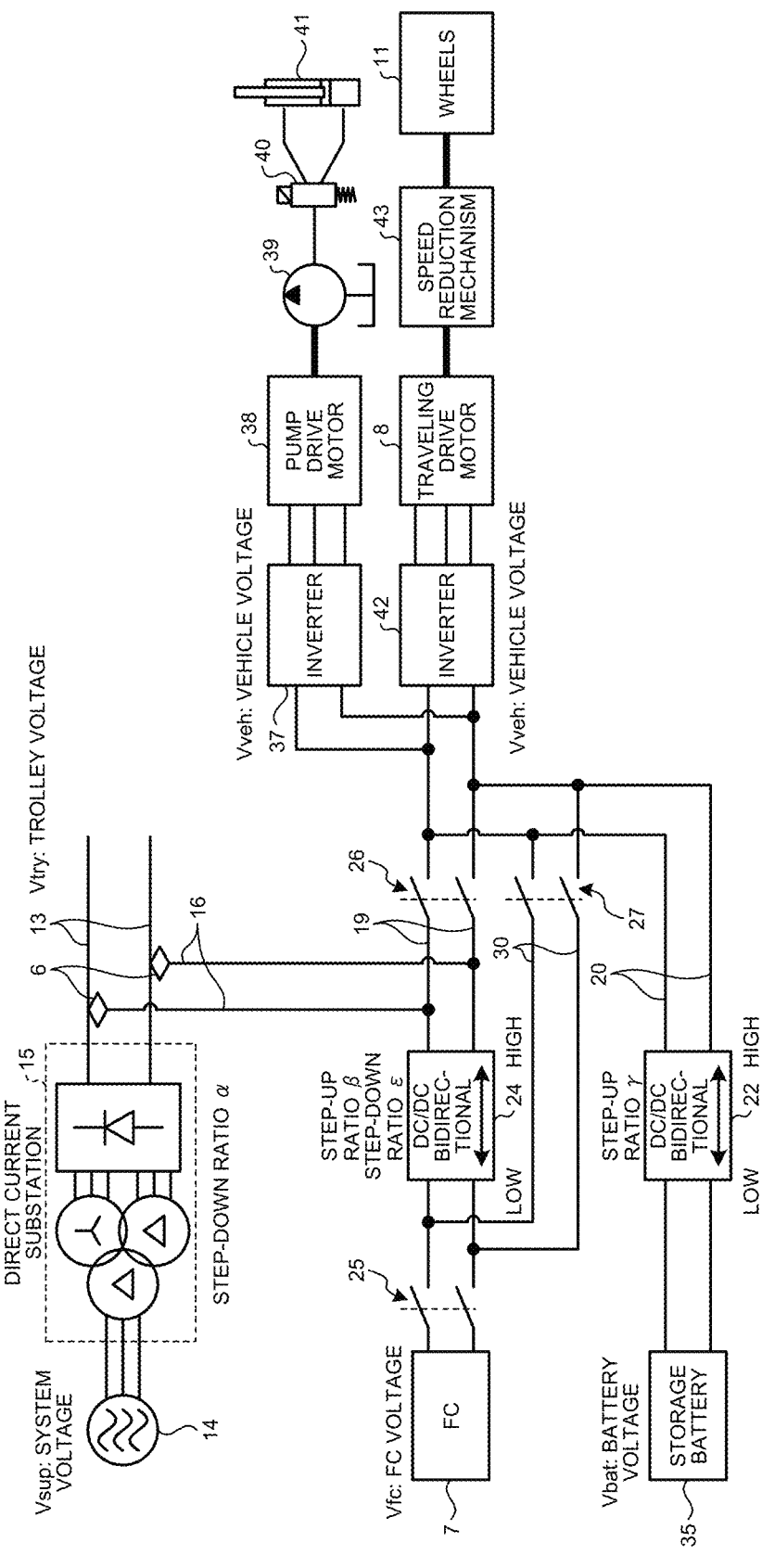
FIG. 5 is a hard block diagram illustrating another example of the energy supply system according to the first embodiment.

FIG. 5 is a hard block diagram illustrating another example of the energy supply system 17 according to the embodiment. FIG. 5 is a modification of FIG. 3 and illustrates an example where a power line 30, a first switch 25, a second switch 26, and a third switch 27 are added to the configuration illustrated in FIG. 3. In addition, a DC/DC converter 24, which is a bidirectional DC/DC converter, is provided instead of the DC/DC converter 21.

The power line 30 is disposed in parallel with the power line 19. The first switch 25 is disposed in the power line 19 between the fuel cell 7 and the DC/DC converter 24. The second switch 26 is disposed in the power line 19 between the DC/DC converter 24 and the vehicle drive system 18. The second switch 26 is disposed in the power line 19 between the connection between the trolley power feed line

16 and the power line 19 and the vehicle drive system 18. The third switch 27 is disposed in the power line 30. One end of the power line 30 is connected to the power line 19 between the first switch 25 and the DC/DC converter 24. Another end of the power line 30 is connected to the power line 20 on the secondary side of the DC/DC converter 22. The power line 20 on the secondary side of the DC/DC converter 22 is connected to the power line 19 between the second switch 26 and the vehicle drive system 18. The other end of the power line 30 is connected to the power line 19 between the second switch 26 and the vehicle drive system 18 via the power line 20.

The DC/DC converter 24 converts the trolley voltage Vtry of the trolley wire 13 and the FC voltage Vfc of the fuel cell 7. The DC/DC converter 24 is disposed in the power line 19 between the first switch 25 and the second switch 26. The trolley power feed line 16 is connected to the power line 19 between the DC/DC converter 24 and the second switch 26.

The DC/DC converter 24 is a bidirectional DC/DC converter capable of outputting power from a primary side to a secondary side and outputting power from the secondary side to the primary side. The primary side of the DC/DC converter 24 is a low-voltage side. The secondary side of the DC/DC converter 24 is a high-voltage side. The primary side of the DC/DC converter 24 is the side of the fuel cell 7, and the secondary side of the DC/DC converter 24 is the side of the trolley power feed line 16 (the side of the vehicle drive system 18).

The DC/DC converter 24 steps up the FC voltage Vfc by the certain step-up ratio. The DC/DC converter 24 steps down the trolley voltage Vtry by a certain step-down ratio ε. Power is supplied from at least one of the trolley wire 13 or the fuel cell 7 to the vehicle drive system 18 via the DC/DC converter 24. At least one of the trolley voltage Vtry or the FC voltage Vfc converted by the DC/DC converter 24 is applied to the traveling drive motor 8 of the vehicle drive system 18. The storage battery 35 is charged with power from at least one of the trolley wire 13 or the fuel cell 7.

The first switch 25, the second switch 26, and the third switch 27 constitute a switch mechanism for switching between a first state, in which power is supplied from the trolley wire 13 to the vehicle drive system 18 via the DC/DC converter 24, a second state, in which power is supplied from the fuel cell 7 and the storage battery 35 to the vehicle drive system 18 via the DC/DC converter 24, and a third state, in which power is supplied from the storage battery 35 to the vehicle drive system 18 via the DC/DC converter 22.

By controlling the first switch 25, the second switch 26, and the third switch 27, the first state, in which power is supplied from the trolley wire 13 to the vehicle drive system 18, the second state, in which power is supplied from the fuel cell 7 and the storage battery 35 to the vehicle drive system 18, and the third state, in which power is supplied from the storage battery 35 to the vehicle drive system 18, are switched. When power is supplied to the vehicle drive system 18, the traveling drive motor 8 is driven.

When power is supplied from the trolley wire 13 to the vehicle drive system 18, the first switch 25 is opened, the second switch 26 is opened, and the third switch 27 is closed. Power from the trolley wire 13 is input from the secondary side of the DC/DC converter 24 to the DC/DC converter 24, stepped down by the certain step-down ratio ε, and then supplied to the vehicle drive system 18 via the power line 30 and the third switch 27. The traveling drive motor 8 generates driving force for rotating the rear wheels 11R on the basis of power from the trolley wire 13. When the storage battery 35 is charged with power from the trolley wire 13, too, the first switch 25 is opened, the second switch 26 is opened, and the third switch 27 is closed.

When power is supplied from the fuel cell 7 and the storage battery 35 to the vehicle drive system 18, the first switch 25 is closed, the second switch 26 is closed, and the third switch 27 is opened. Power from the fuel cell 7 is input to the DC/DC converter 24 from the primary side of the DC/DC converter 24 via the first switch 25, stepped up by the certain step-up ratio, and then supplied to the vehicle drive system 18 via the second switch 26. The traveling drive motor 8 generates driving force for rotating the rear wheels 11R on the basis of power from the fuel cell 7. When the storage battery 35 is charged with power from the fuel cell 7, too, the first switch 25 is closed, the second switch 26 is closed, and the third switch 27 is opened.

When power is supplied from the storage battery 35 to the vehicle drive system 18, the first switch 25 is opened, the second switch 26 is opened, and the third switch 27 is opened. Power from the storage battery 35 is input to the DC/DC converter 22 from the primary side of the DC/DC converter 22, stepped up by the certain step-up ratio γ, and then supplied to the vehicle drive system 18. The traveling drive motor 8 generates driving force for rotating the rear wheels 11R on the basis of power from the storage battery 35.

The DC/DC converter 24 is a shared DC/DC converter shared for conversion of the trolley voltage Vtry and conversion of the FC voltage Vfc. Since the DC/DC converter 24 is shared for the supply of power from the trolley wire 13 to the vehicle drive system 18 and the supply of power from the fuel cell 7 to the vehicle drive system 18, an increase in cost of the energy supply system 17 is suppressed. In addition, since one DC/DC converter 24 is shared for the conversion of the trolley voltage Vtry and the conversion of the FC voltage Vfc, an increase in size of the energy supply system 17 is suppressed.

Figure 6:
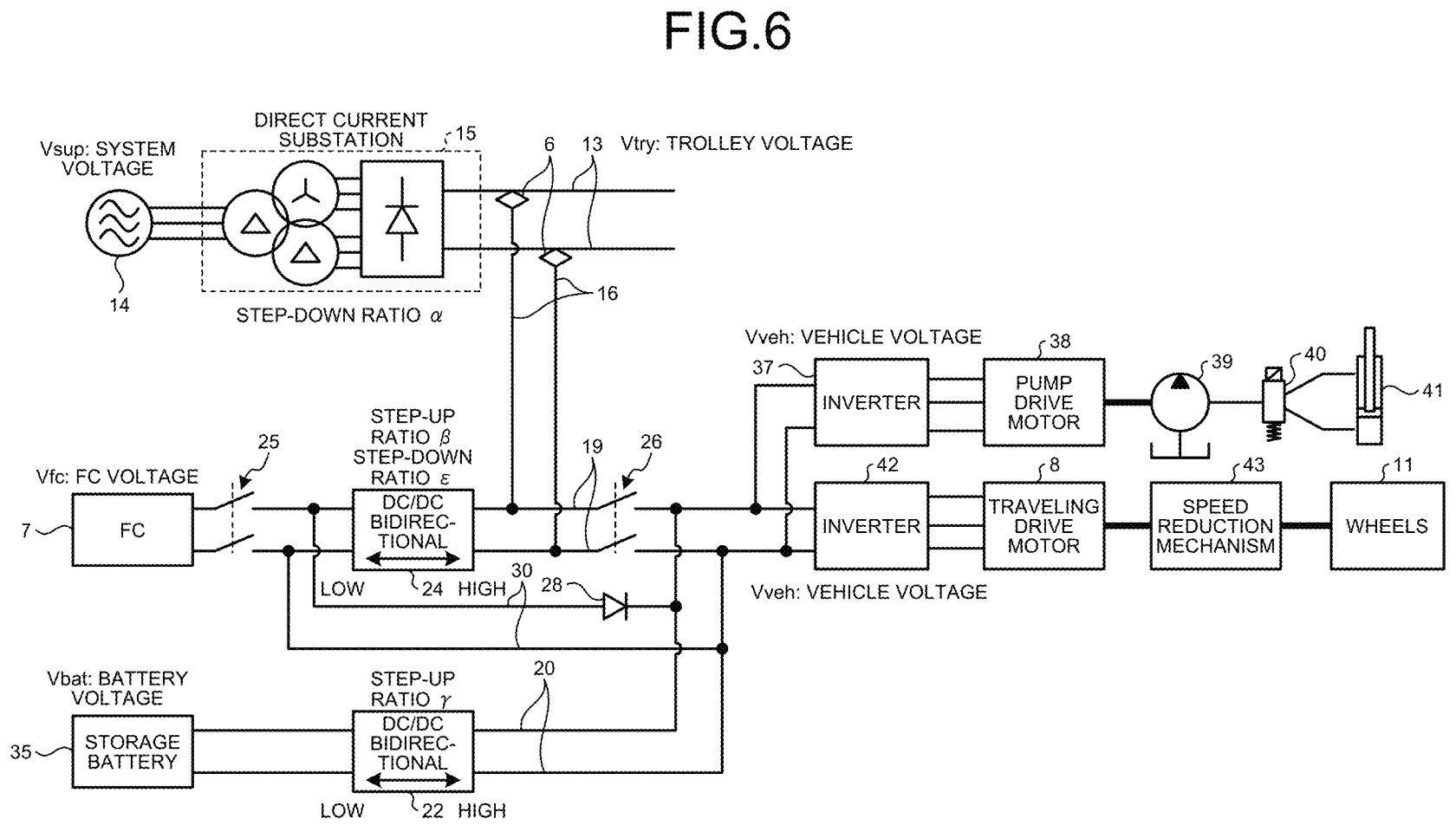

FIG. 6 is a hard block diagram illustrating another example of the energy supply system 17 according to the embodiment. FIG. 6 is a modification of FIG. 5 and illustrates an example where a diode 28 is disposed in the power line 30 instead of the third switch 27 in FIG. 5. When insulation resistance between the fuel cell 7 and the vehicle drive system 18 is secured, the diode 28 may be disposed in the power line 30 instead of the third switch 27 as illustrated in FIG. 6. As a result, increases in the cost and the size of the energy supply system 17 are suppressed.

Figure 7:
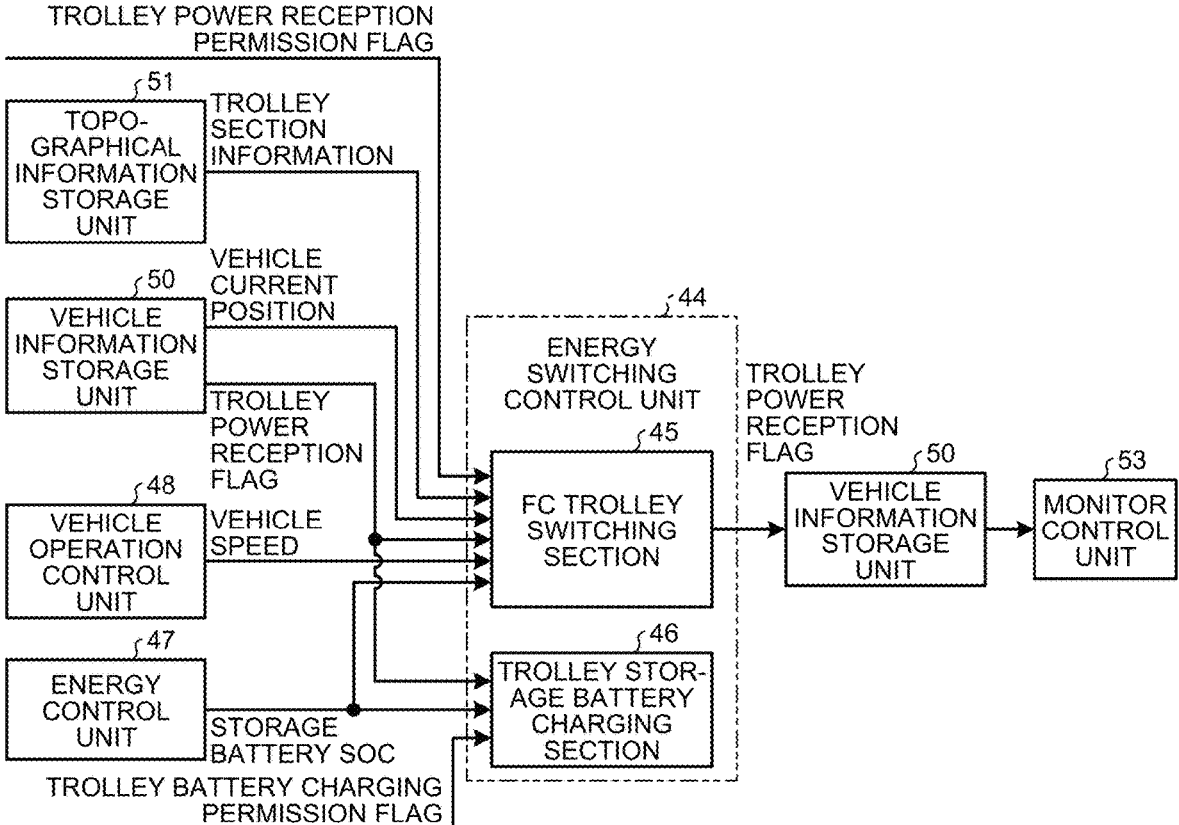
FIG. 7 is a soft block diagram illustrating an example of a control apparatus according to the first embodiment.

FIG. 7 is a soft block diagram illustrating an example of the control apparatus 10 according to the embodiment. FIG. 7 illustrates an example of the control apparatus 10 that controls the energy supply system 17 illustrated in FIG. 5.

The control apparatus 10 includes the energy control unit 47, the vehicle operation control unit 48, the vehicle information storage unit 50, the topographical information storage unit 51, an energy switching control unit 44, and the monitor control unit 53. The energy switching control unit 44 includes an FC trolley switching section 45 and a trolley storage battery charging section 46.

The energy control unit 47 monitors a state of charge (SOC) of the storage battery 35. When the storage battery 35 is in a fully charged state, the SOC is 100%, and when the storage battery 35 is in a fully discharged state, the SOC is 0%.

The vehicle operation control unit 48 monitors vehicle speed, which indicates traveling speed of the traveling apparatus 4.

The vehicle information storage unit 50 acquires data detected by the position sensor 9. The position sensor 9 detects a current position of the vehicle body 3. The vehicle information storage unit 50 acquires data detected by the position sensor 9 and monitors the current position of the vehicle body 3.

The topographical information storage unit 51 stores map information regarding the work site. As described later, trolley switching sections, trolley sections, and FC switching sections are set in the work site. In the embodiment, the map information includes positional information regarding trolley switching sections, positional information regarding trolley sections, and positional information regarding FC switching sections.

The FC trolley switching section 45 controls the switch mechanism including the first switch 25, the second switch 26, and the third switch 27 such that the first state, in which power is supplied from the trolley wire 13 to the vehicle drive system 18, the second state, in which power is supplied from the fuel cell 7 and the storage battery 35 to the vehicle drive system 18, and the third state, in which power is supplied from the storage battery 35 to the vehicle drive system 18, are switched. The FC trolley switching section 45 controls the switch mechanism in such a way as to switch between the first state, the second state, and the third state on the basis of a trolley power reception permission signal (trolley power reception permission flag) input from the first input unit 61, the map information including the positional information regarding trolley sections input from the topographical information storage unit 51, the current position of the vehicle body 3 input from the vehicle information storage unit 50, a trolley power reception flag input from the vehicle information storage unit 50, the vehicle speed input from the vehicle operation control unit 48, and the state of charge (SOC) of the storage battery 35 input from the energy control unit 47.

The trolley storage battery charging section 46 controls the switch mechanism including the first switch 25, the second switch 26, and the third switch 27 such that the storage battery 35 is charged by power from the trolley wire 13. The trolley storage battery charging section 46 charges the storage battery 35 with power from the trolley wire 13 on the basis of a trolley battery charging permission signal (trolley battery charging permission flag) input from the second input unit 62, the trolley power reception flag input from the vehicle information storage unit 50, and the state of charge (SOC) of the storage battery 35 input from the energy control unit 47.

The FC trolley switching section 45 transmits the trolley power reception flag indicating that FC trolley switching control has been switched to a trolley power reception state to the vehicle information storage unit 50. The vehicle information storage unit 50 stores the trolley power reception flag.

The monitor control unit 53 displays a trolley power reception state on the monitor 54 on the basis of the trolley power reception flag from the vehicle information storage unit 50.

Figure 8:
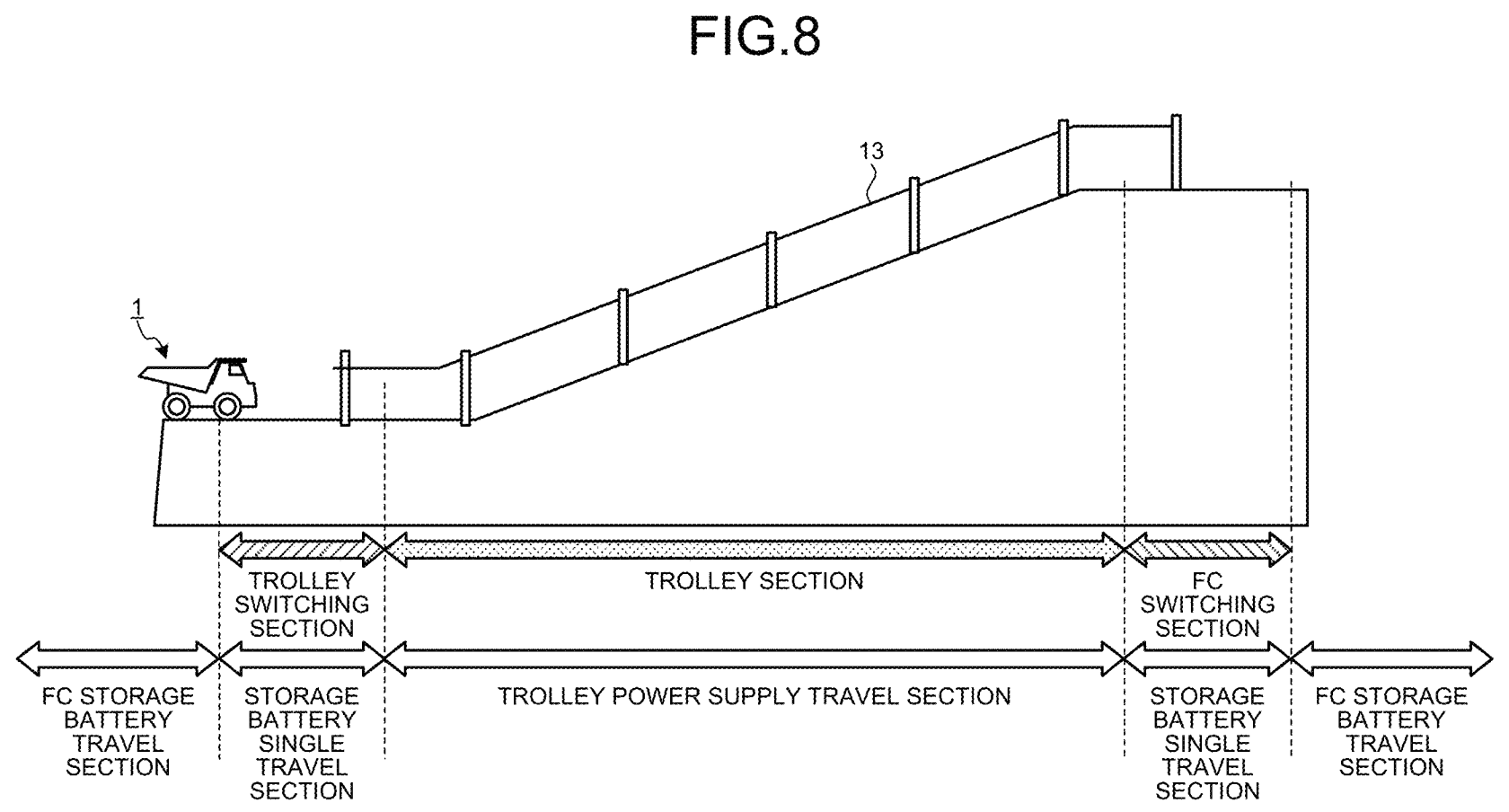

FIG. 8 is an image diagram illustrating an example of an operation of the energy supply system 17 according to the embodiment. As illustrated in FIG. 8, the trolley wire 13 is provided on a climbing road at the work site. Trolley switching sections, trolley sections, and FC switching sections are set in a travel path in the work site. The trolley switching sections are set before climbing roads. The trolley sections are set on the climbing roads. The FC switching sections are set after the climbing roads.

The FC trolley switching section 45 controls the switch mechanism such that the vehicle drive system 18 is driven on the basis of power output from the fuel cell 7 and the storage battery 35 in FC storage battery travel sections before the trolley switching sections.

In the trolley switching sections, the FC trolley switching section 45 controls the switch mechanism in such a way as to switch from the second state, in which power is supplied from the fuel cell 7 and the storage battery 35 to the vehicle drive system 18, to the first state, in which power is supplied from the trolley wire 13 to the vehicle drive system 18. The trolley switching sections are storage battery single travel sections where the output of power from the fuel cell 7 is stopped and the vehicle drive system 18 is driven only by power supplied from the storage battery 35.

The trolley sections are trolley power supply travel sections where the vehicle drive system 18 is driven only by power supplied from the trolley wire 13. The FC trolley switching section 45 controls the switch mechanism in such a way as to maintain the first state, in which power is supplied from the trolley wire 13 to the vehicle drive system 18, in the trolley sections. Surplus power is used to charge the storage battery 35.

In the FC switching sections, the FC trolley switching section 45 controls the switch mechanism in such a way as to switch from the first state, in which power is supplied from the trolley wire 13 to the vehicle drive system 18, to the second state, in which power is supplied from the fuel cell 7 and the storage battery 35 to the vehicle drive system 18. The FC switching sections are storage battery single travel sections where reception of power from the trolley wire 13 is stopped and the vehicle drive system 18 is driven only by power supplied from the storage battery 35.

The FC trolley switching section 45 controls the switch mechanism such that the vehicle drive system 18 is driven on the basis of power output from the fuel cell 7 and the storage battery 35 in the FC storage battery travel sections after the FC switching sections.

Figure 9:
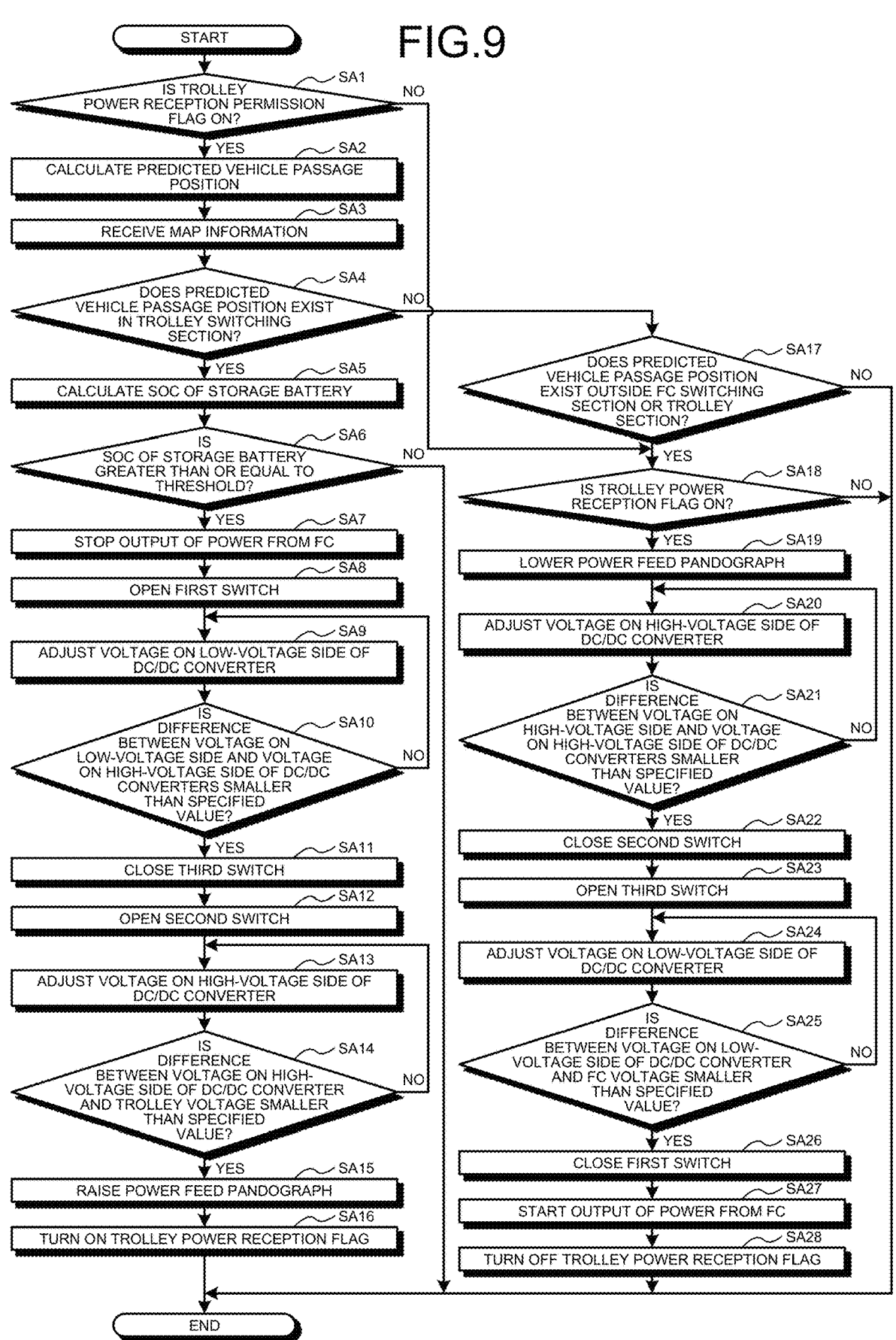
FIG. 9 is a flowchart illustrating an example of a method for controlling a haul vehicle according to the first embodiment.

FIG. 9 is a flowchart illustrating an example of a method for controlling the haul vehicle 1 according to the embodiment. FIG. 9 illustrates a method for controlling the haul vehicle 1 at a time when the haul vehicle 1 including the energy supply system 17 illustrated in FIG. 5 travels on the climbing road illustrated in FIG. 8.

When the haul vehicle 1 travels in an FC storage battery travel section, the FC trolley switching section 45 controls the switch mechanism such that power is supplied from the fuel cell 7 to the vehicle drive system 18. The first switch 25 is closed, the second switch 26 is closed, and the third switch 27 is opened.

The FC trolley switching section 45 determines whether the trolley power reception permission flag is on (step SA1).

When it is determined in step SA1 that the trolley power reception permission flag is on (step SA1: Yes), the FC trolley switching section 45 calculates a predicted vehicle passage position on the basis of the current position of the vehicle body 3 input from the vehicle information storage unit 50 and the vehicle speed input from the vehicle operation control unit 48 (step SA2).

The FC trolley switching section 45 receives the map information regarding the work site from the topographical information storage unit 51 (step SA3).

The FC trolley switching section 45 determines whether the predicted vehicle passage position exists in the trolley switching section (step SA4).

If it is determined in step SA4 that the predicted vehicle passage position exists in a trolley switching section (step SA4: Yes), the FC trolley switching section 45 calculates the SOC of the storage battery 35 (step SA5).

The FC trolley switching section 45 determines whether the SOC of the storage battery 35 calculated in step SA5 is larger than or equal to a predetermined threshold (step SA6).

If it is determined in step SA6 that the SOC of the storage battery 35 is greater than or equal to the threshold (step SA6: Yes), the FC trolley switching section 45 stops the output of power from the fuel cell 7 (step SA7).

The FC trolley switching section 45 opens the first switch 25 (step SA8).

The FC trolley switching section 45 adjusts a voltage on the low-voltage side (primary side) of the DC/DC converter 24 (step SA9).

The FC trolley switching section 45 determines whether a difference between the voltage on the low-voltage side of the DC/DC converter 24 and a voltage on the high-voltage side (secondary side) of the DC/DC converter 22 has fallen below a predetermined specified value (step SA10).

If it is determined in step SA10 that the difference between the voltage on the low-voltage side of the DC/DC converter 24 and the voltage on the high-voltage side of the DC/DC converter 22 has not fallen below the specified value (step SA10: No), the FC trolley switching section 45 returns to the processing in step SA9.

If it is determined in step SA10 that the difference between the voltage on the low-voltage side of the DC/DC converter 24 and the voltage on the high-voltage side of the DC/DC converter 22 has fallen below the specified value (step SA10: Yes), the FC trolley switching section 45 closes the third switch 27 (step SA11).

The FC trolley switching section 45 opens the second switch 26 (step SA12).

The FC trolley switching section 45 adjusts a voltage on the high-voltage side (secondary side) of the DC/DC converter 24 (step SA13).

The FC trolley switching section 45 determines whether a difference between the voltage on the high-voltage side of the DC/DC converter 24 and the trolley voltage Vtry has fallen below a predetermined specified value (step SA14).

If it is determined in step SA14 that the difference between the voltage on the high-voltage side of the DC/DC converter 24 and the trolley voltage Vtry has not fallen below the specified value (step SA14: No), the FC trolley switching section 45 returns to the processing in step SA13.

If it is determined in step SA14 that the difference between the voltage on the high-voltage side of the DC/DC converter 24 and the trolley voltage Vtry has fallen below the specified value (step SA14: Yes), the FC trolley switching section 45 raises the power feed pantograph 6 (step SA15).

The FC trolley switching section 45 determines that reception of power from the trolley wire 13 has started, and turns on the trolley power reception flag (step SA16).

If it is determined in step SA4 that the predicted vehicle passage position does not exist in a trolley switching section (step SA4: No), the FC trolley switching section 45 determines whether the predicted vehicle passage position exists outside an FC switching section or a trolley section (step SA17).

If it is determined in step SA17 that the predicted vehicle passage position exists outside an FC switching section or a trolley section (step SA17: Yes), or if it is determined in step SA1 that the trolley power reception permission flag is not ON (step SA1: No), the FC trolley switching section 45 determines whether the trolley power reception flag is on (step SA18).

If it is determined in step SA18 that the trolley power reception flag is on (step SA18: Yes), the FC trolley switching section 45 lowers the power feed pantograph 6 (step SA19).

The FC trolley switching section 45 adjusts the voltage on the high-voltage side of the DC/DC converter 24 (step SA20).

The FC trolley switching section 45 determines whether a difference between the voltage on the high-voltage side of the DC/DC converter 24 and the voltage on the high-voltage side of the DC/DC converter 22 has fallen below a predetermined specified value (step SA21).

If it is determined in step SA21 that the difference between the voltage on the high-voltage side of the DC/DC converter 24 and the voltage on the high-voltage side of the DC/DC converter 22 has not fallen below the specified value (step SA21: No), the FC trolley switching section 45 returns to the processing in step SA20.

If it is determined in step SA21 that the difference between the voltage on the high-voltage side of the DC/DC converter 24 and the voltage on the high-voltage side of the DC/DC converter 22 has fallen below the specified value (step SA21: Yes), the FC trolley switching section 45 closes the second switch 26 (step SA22).

The FC trolley switching section 45 opens the third switch 27 (step SA23).

The FC trolley switching section 45 adjusts the voltage on the low-voltage side (primary side) of the DC/DC converter 24 (step SA24).

The FC trolley switching section 45 determines whether a difference between the voltage on the low-voltage side of the DC/DC converter 24 and the FC voltage Vfc has fallen below a predetermined specified value (step SA25).

If it is determined in step SA25 that the difference between the voltage on the low-voltage side of the DC/DC converter 24 and the FC voltage Vfc has not fallen below the specified value (step SA25: No), the FC trolley switching section 45 returns to the processing in step SA24.

If it is determined in step SA25 that the difference between the voltage on the low-voltage side of the DC/DC converter 24 and the FC voltage Vfc has fallen below the specified value (step SA25: Yes), the FC trolley switching section 45 closes the first switch 25 (step SA26).

The FC trolley switching section 45 starts output of power from the fuel cell 7 (step SA27).

The FC trolley switching section 45 determines that the reception of power from the trolley wire 13 has stopped, and turns off the trolley power reception flag (step SA28).

When the processing in step SA16 has ended, if it is determined in step SA6 that the SOC of the storage battery 35 is not greater than or equal to the threshold (step SA6: No), if it is determined in step SA17 that the predicted vehicle passage position does not exist outside an FC switching section or a trolley section (step SA17: No), if it is determined in step SA18 that the trolley power reception flag is off (step SA18: No), or when the processing in step SA28 has ended, the process ends.

Figure 10:
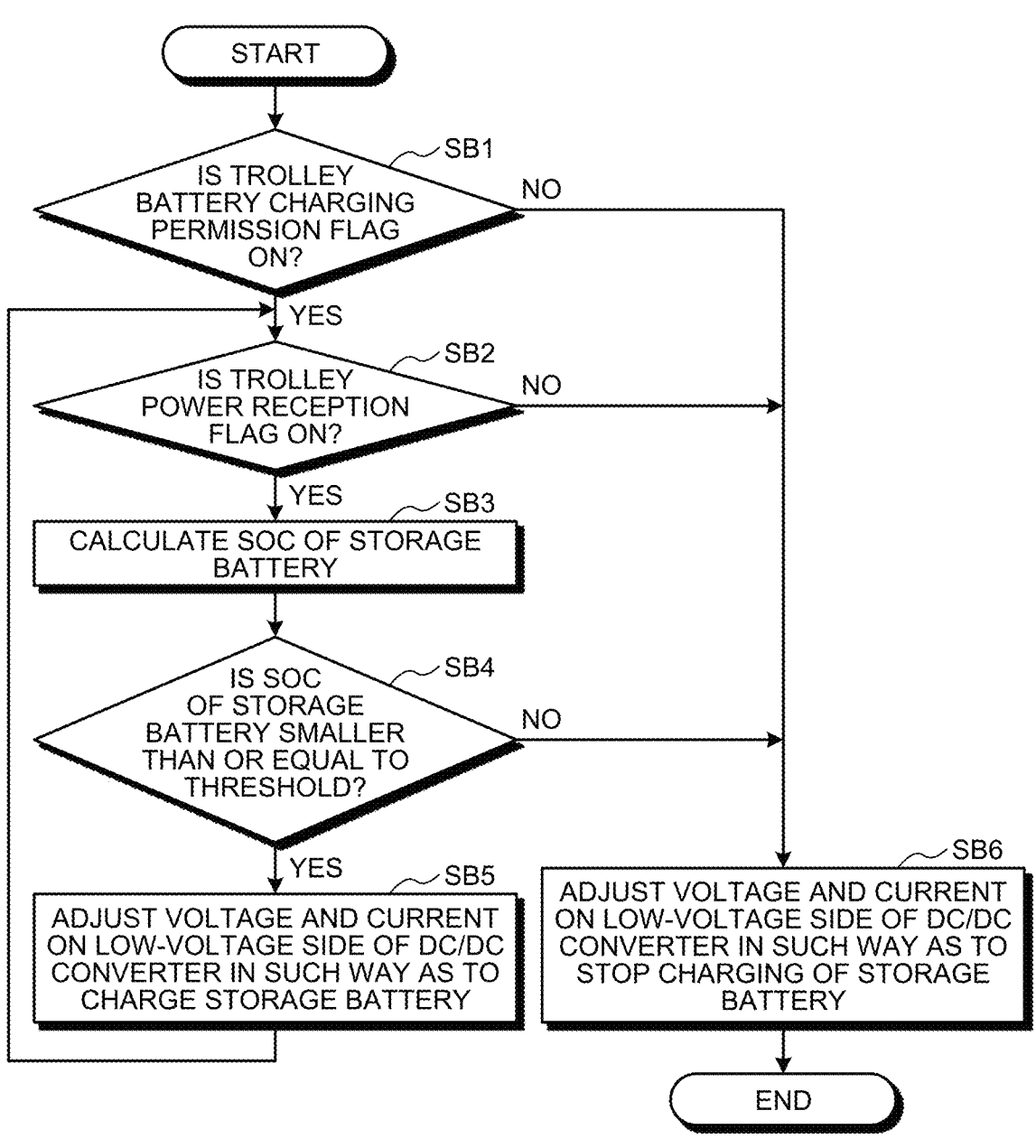
FIG. 10 is a flowchart illustrating another example of the method for controlling a haul vehicle according to the first embodiment.

FIG. 10 is a flowchart illustrating another example of the method for controlling the haul vehicle 1 according to the embodiment. FIG. 10 illustrates a method for controlling the haul vehicle 1 at a time when the haul vehicle 1 including the energy supply system 17 illustrated in FIG. 5 charges the storage battery 35.

The trolley storage battery charging section 46 determines whether the trolley battery charging permission flag is on (step SB1).

If it is determined in step SB1 that the trolley battery charging permission flag is on (step SB1: Yes), the trolley storage battery charging section 46 determines whether the trolley power reception flag is on (step SB2).

If it is determined in step SB2 that the trolley power reception flag is on (step SB2: Yes), the trolley storage battery charging section 46 calculates the SOC of the storage battery 35 (step SB3).

The trolley storage battery charging section 46 determines whether the SOC of the storage battery 35 calculated in step SB3 is smaller than or equal to a predetermined threshold (step SB4).

If it is determined in step SB4 that the SOC of the storage battery 35 is smaller than or equal to the threshold (step SB4: Yes), the trolley storage battery charging section 46 adjusts the voltage and a current on the low-voltage side (primary side) of the DC/DC converter 22 in such a way as to charge the storage battery 35 (step SB5), and returns to the processing in step SB2.

If it is determined in step SB1 that the trolley battery charging permission flag is off (step SB1: No), if it is determined in step SB2 that the trolley power reception flag is off (step SB2: No), or if it is determined in step SB4 that the SOC of the storage battery 35 exceeds the threshold (step SB4: No), the trolley storage battery charging section 46 adjusts the voltage and the current on the primary side of the DC/DC converter 22 in such a way as to stop the charging of the storage battery 35 (step SB6), and ends the process.

Figure 11:
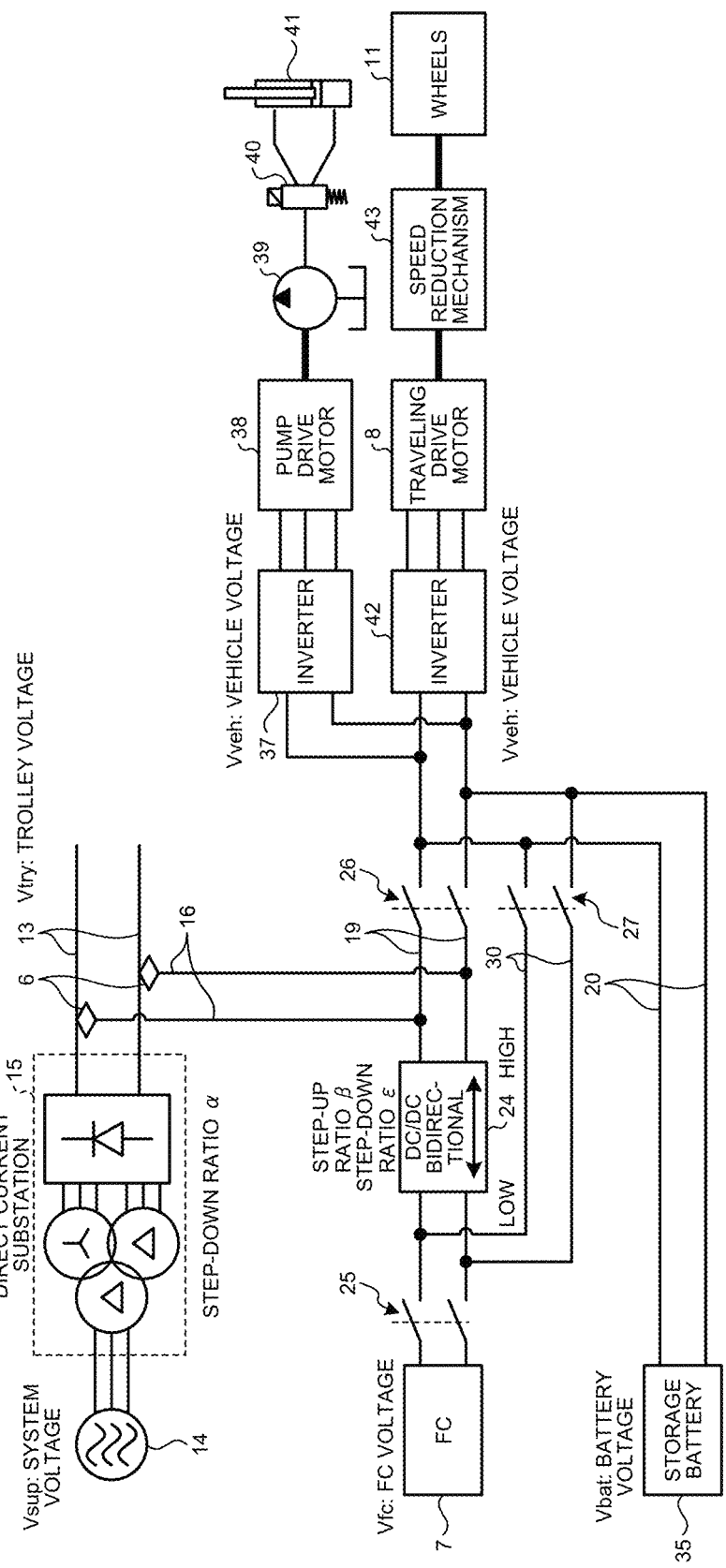
FIG. 11 is a hard block diagram illustrating another example of the energy supply system according to the first embodiment.

FIG. 11 is a hard block diagram illustrating another example of the energy supply system 17 according to the embodiment. FIG. 11 is a modification of FIG. 5 and illustrates an example where the DC/DC converter 22 is omitted from the configuration illustrated in FIG. 5. By omitting the DC/DC converter 22, increases in the cost and the size of the energy supply system 17 are suppressed.

Figure 12:
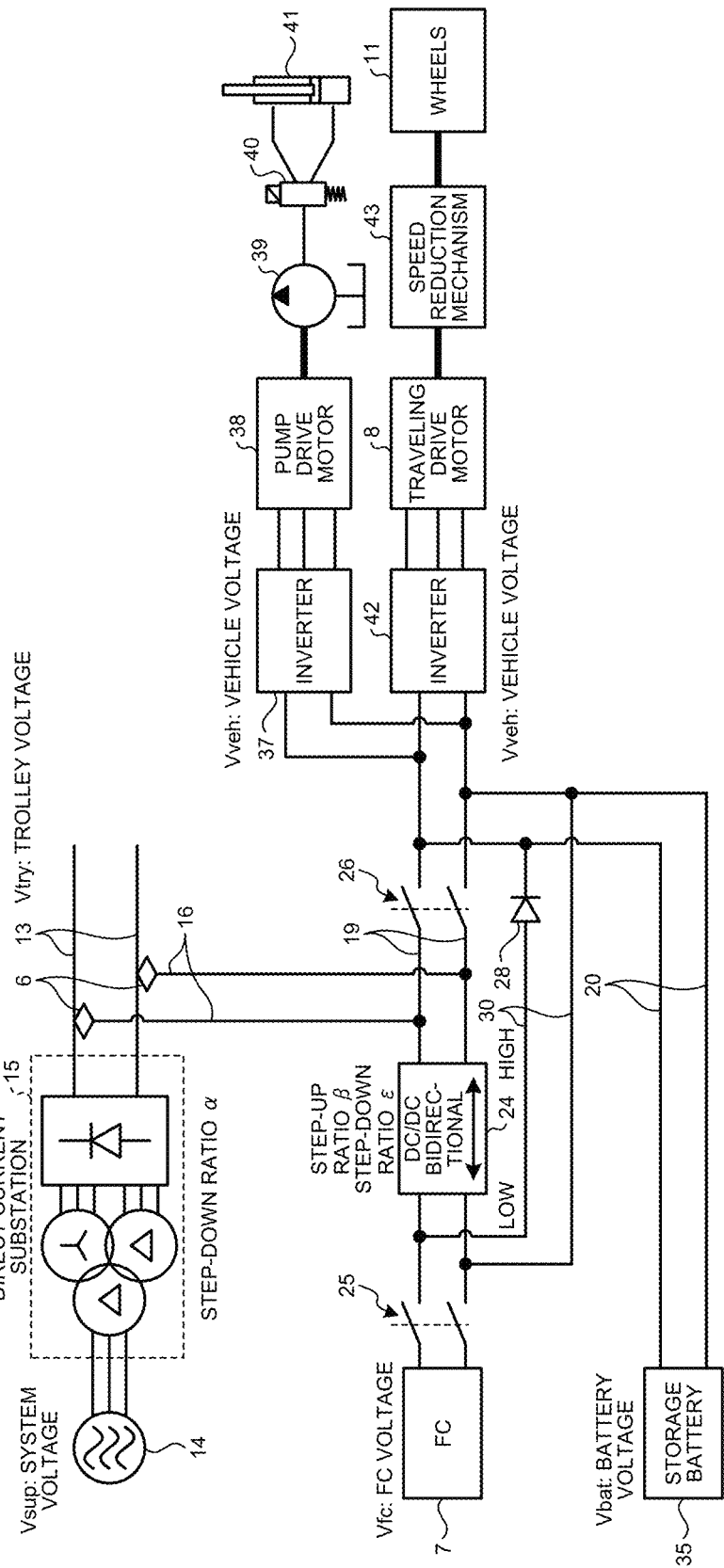
FIG. 12 is a hard block diagram illustrating another example of the energy supply system according to the first embodiment.

FIG. 12 is a hard block diagram illustrating another example of the energy supply system 17 according to the embodiment. FIG. 12 is a modification of FIG. 11 and illustrates an example where the diode 28 is disposed in the power line 30 instead of the third switch 27 in FIG. 11. When insulation resistance between the fuel cell 7 and the vehicle drive system 18 is secured, the diode 28 may be disposed in the power line 30 instead of the third switch 27 as illustrated in FIG. 12. As a result, increases in the cost and the size of the energy supply system 17 are suppressed.

Figure 13:
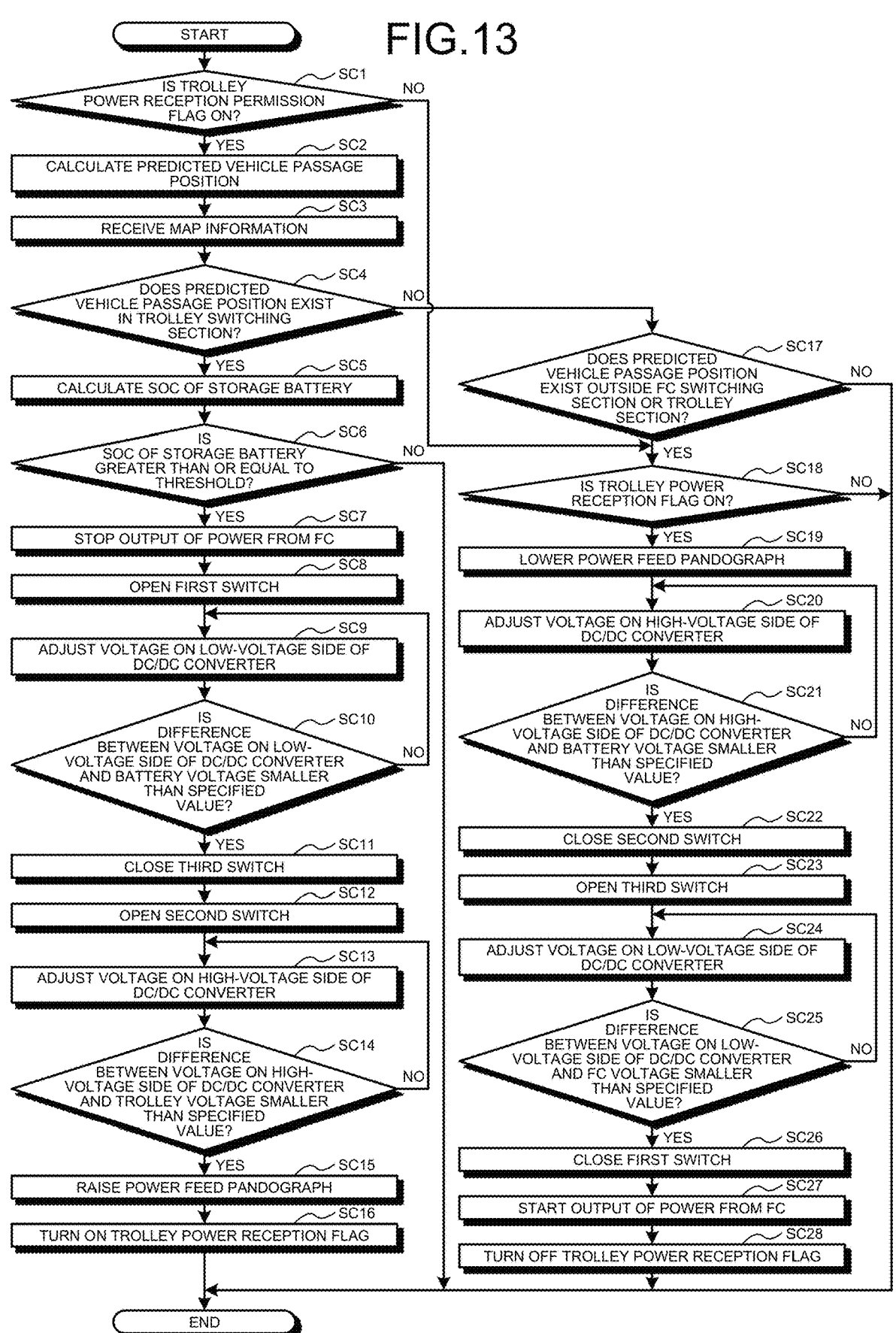
FIG. 13 is a flowchart illustrating another example of the method for controlling a haul vehicle according to the first embodiment.

FIG. 13 is a flowchart illustrating another example of the method for controlling the haul vehicle 1 according to the embodiment. FIG. 13 illustrates a method for controlling the haul vehicle 1 at a time when the haul vehicle 1 including the energy supply system 17 illustrated in FIG. 11 travels on the climbing road illustrated in FIG. 8.

When the haul vehicle 1 travels in an FC storage battery travel section, the FC trolley switching section 45 controls the switch mechanism such that power is supplied from the fuel cell 7 to the vehicle drive system 18. The first switch 25 is closed, the second switch 26 is closed, and the third switch 27 is opened.

The FC trolley switching section 45 determines whether the trolley power reception permission flag is on (step SC1).

If it is determined in step SC1 that the trolley power reception permission flag is on (step SC1: Yes), the FC trolley switching section 45 calculates the predicted vehicle passage position on the basis of the current position of the vehicle body 3 input from the vehicle information storage unit 50 and the vehicle speed input from the vehicle operation control unit 48 (step SC2).

The FC trolley switching section 45 receives the map information regarding the work site from the topographical information storage unit 51 (step SC3).

The FC trolley switching section 45 determines whether the predicted vehicle passage position exists in a trolley switching section (step SC4).

If it is determined in step SAC that the predicted vehicle passage position exists in a trolley switching section (step SC4: Yes), the FC trolley switching section 45 calculates the SOC of the storage battery 35 (step SC5).

The FC trolley switching section 45 determines whether the SOC of the storage battery 35 calculated in step SC5 is greater than or equal to a predetermined threshold (step SC6).

If it is determined in step SC6 that the SOC of the storage battery 35 is greater than or equal to the threshold (step SC6: Yes), the FC trolley switching section 45 stops the output of power from the fuel cell 7 (step SC7).

The FC trolley switching section 45 opens the first switch 25 (step SC8).

The FC trolley switching section 45 adjusts the voltage on the low-voltage side (primary side) of the DC/DC converter 24 (step SC9).

The FC trolley switching section 45 determines whether a difference between the voltage on the low-voltage side of the DC/DC converter 24 and the battery voltage Vbat of the storage battery 35 has fallen below a predetermined specified value (step SC10).

If it is determined in step SA10 that the difference between the voltage on the low-voltage side of the DC/DC converter 24 and the battery voltage Vbat of the storage battery 35 has not fallen below the specified value (step SC10: No), the FC trolley switching section 45 returns to the processing in step SC9.

If it is determined in step SC10 that the difference between the voltage on the low-voltage side of the DC/DC converter 24 and the battery voltage Vbat of the storage battery 35 has fallen below the specified value (step SC10: Yes), the FC trolley switching section 45 closes the third switch 27 (step SC11).

The FC trolley switching section 45 opens the second switch 26 (step SC12).

The FC trolley switching section 45 adjusts the voltage on the high-voltage side (secondary side) of the DC/DC converter 24 (step SC13).

The FC trolley switching section 45 determines whether the difference between the voltage on the high-voltage side of the DC/DC converter 24 and the trolley voltage Vtry has fallen below a predetermined specified value (step SC14).

If it is determined in step SC14 that the difference between the voltage on the high-voltage side of the DC/DC converter 24 and the trolley voltage Vtry has not fallen below the specified value (step SC14: No), the FC trolley switching section 45 returns to the processing in step SC13.

If it is determined in step SC14 that the difference between the voltage on the high-voltage side of the DC/DC converter 24 and the trolley voltage Vtry has fallen below the specified value (step SC14: Yes), the FC trolley switching section 45 raises the power feed pantograph 6 (step SC15).

The FC trolley switching section 45 determines that reception of power from the trolley wire 13 has started, and turns on the trolley power reception flag (step SC16).

If it is determined in step SC4 that the predicted vehicle passage position does not exist in a trolley switching section (step SC4: No), the FC trolley switching section 45 determines whether the predicted vehicle passage position exists outside an FC switching section or a trolley section (step SC17).

If it is determined in step SC17 that the predicted vehicle passage position exists outside an FC switching section or a trolley section (step SC17: Yes), or if it is determined in step SC1 that the trolley power reception permission flag is not ON (step SC1: No), the FC trolley switching section 45 determines whether the trolley power reception flag is on (step SC18).

If it is determined in step SC18 that the trolley power reception flag is on (step SC18: Yes), the FC trolley switching section 45 lowers the power feed pantograph 6 (step SC19).

The FC trolley switching section 45 adjusts the voltage on the high-voltage side of the DC/DC converter 24 (step SC20).

The FC trolley switching section 45 determines whether the difference between the voltage on the low-voltage side of the DC/DC converter 24 and the battery voltage Vbat of the storage battery 35 has fallen below a predetermined specified value (step SC21).

If it is determined in step SC21 that the difference between the voltage on the high-voltage side of the DC/DC converter 24 and the battery voltage Vbat of the storage battery 35 has not fallen below the specified value (step SC21: No), the FC trolley switching section 45 returns to the processing in step SC20.

If it is determined in step SC21 that the difference between the voltage on the high-voltage side of the DC/DC converter 24 and the battery voltage Vbat of the storage battery 35 has fallen below the specified value (step SC21: Yes), the FC trolley switching section 45 closes the second switch 26 (step SC22).

The FC trolley switching section 45 opens the third switch 27 (step SC23).

The FC trolley switching section 45 adjusts the voltage on the low-voltage side (primary side) of the DC/DC converter 24 (step SC24).

The FC trolley switching section 45 determines whether the difference between the voltage on the low-voltage side of the DC/DC converter 24 and the FC voltage Vfc has fallen below a predetermined specified value (step SC25).

If it is determined in step SC25 that the difference between the voltage on the low-voltage side of the DC/DC converter 24 and the FC voltage Vfc has not fallen below the specified value (step SC25: No), the FC trolley switching section 45 returns to the processing in step SC24.

If it is determined in step SC25 that the difference between the voltage on the low-voltage side of the DC/DC converter 24 and the FC voltage Vfc has fallen below the specified value (step SC25: Yes), the FC trolley switching section 45 closes the first switch 25 (step SC26).

The FC trolley switching section 45 starts output of power from the fuel cell 7 (step SC27).

The FC trolley switching section 45 determines that the reception of power from the trolley wire 13 has stopped, and turns off the trolley power reception flag (step SC28).

When the processing in step SC16 has ended, if it is determined in step SC6 that the SOC of the storage battery 35 is not greater than or equal to the threshold (step SC6: No), if it is determined in step SC17 that the predicted vehicle passage position does not exist outside an FC switching section or a trolley section (step SC17: No), if it is determined in step SC18 that the trolley power reception flag is off (step SC18: No), or when the processing in step SC28 has ended, the process ends.

Figure 14:
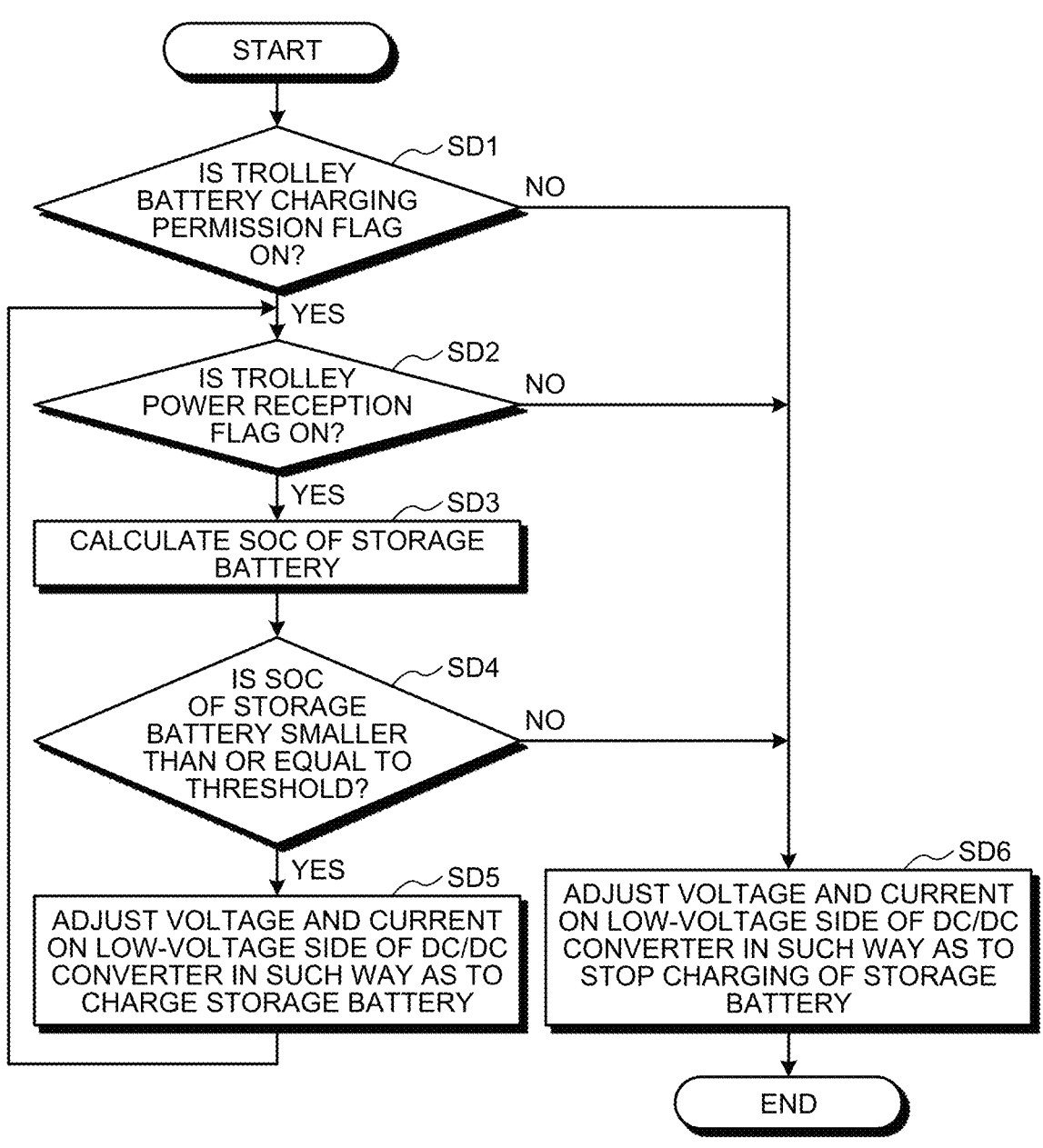
FIG. 14 is a flowchart illustrating another example of the method for controlling a haul vehicle according to the first embodiment.

FIG. 14 is a flowchart illustrating another example of the method for controlling the haul vehicle 1 according to the embodiment. FIG. 14 illustrates a method for controlling the haul vehicle 1 at a time when the haul vehicle 1 including the energy supply system 17 illustrated in FIG. 11 charges the storage battery 35.

The trolley storage battery charging section 46 determines whether the trolley battery charging permission flag is on (step SD1).

If it is determined in step SD1 that the trolley battery charging permission flag is on (step SD1: Yes), the trolley storage battery charging section 46 determines whether the trolley power reception flag is on (step SD2).

If it is determined in step SD2 that the trolley power reception flag is on (step SD2: Yes), the trolley storage battery charging section 46 calculates the SOC of the storage battery 35 (step SD3).

The trolley storage battery charging section 46 determines whether the SOC of the storage battery 35 calculated in step SD3 is smaller than or equal to a predetermined threshold (step SD4).

If it is determined in step SD4 that the SOC of the storage battery 35 is smaller than or equal to the threshold (step SD4: Yes), the trolley storage battery charging section 46 adjusts the voltage and a current on the low-voltage side (primary side) of the DC/DC converter 24 in such a way as to charge the storage battery 35 (step SD5), and returns to the processing in step SD2.

If it is determined in step SD1 that the trolley battery charging permission flag is off (step SD1: No), if it is determined in step SD2 that the trolley power reception flag is off (step SD2: No), or if it is determined in step SD4 that the SOC of the storage battery 35 exceeds the threshold (step SD4: No), the trolley storage battery charging section 46 adjusts the voltage and the current on the primary side of the DC/DC converter 24 in such a way as to stop the charging of the storage battery 35 (step SD6), and ends the process.

Effects

As described above, according to the embodiment, power is supplied from the trolley wire 13 to the haul vehicle 1. In addition, the fuel cell 7 of the haul vehicle 1 generates power. Power is supplied from at least one of the trolley wire 13 or the fuel cell 7 to the traveling drive motor 8 of the haul vehicle 1. The traveling drive motor 8 generates driving force for rotating the rear wheels 11R on the basis of power from at least one of the trolley wire 13 or the fuel cell 7. The haul vehicle 1 travels on the driving force generated by the traveling drive motor 8. Since exhaust gas is not discharged from the haul vehicle 1, pollution of the environment of the work site is controlled.

As described with reference to FIG. 5 and the like, the DC/DC converter 24 capable of converting both the trolley voltage Vtry of the trolley wire 13 and the FC voltage Vfc of the fuel cell 7 is provided. Since one DC/DC converter 24 is shared for the conversion of the trolley voltage Vtry and the conversion of the FC voltage Vfc, increases in the cost and the size of the energy supply system 17 are suppressed.

When the haul vehicle 1 travels on a climbing road, the traveling drive motor 8 is driven on the basis of power from the trolley wire 13. High-speed traveling is achieved and productivity is improved on a climbing road as a result of the supply of high-output power from the outside. In addition, the use of trolley power in high-load trolley sections can reduce hydrogen consumption of the fuel cell 7.

Surplus power from the trolley wire 13 is used to charge the storage battery 35. Since the traveling drive motor 8 is driven by power from the storage battery 35, the hydrogen consumption of the fuel cell 7 can be reduced even during traveling on a travel path outside the trolley sections.

Second Embodiment

A second embodiment will be described. In the following description, components that are the same as or equivalent to those in the above-described embodiment will be given the same reference numerals, and description of the components will be simplified or omitted.

<Energy Supply System>

Figure 15:
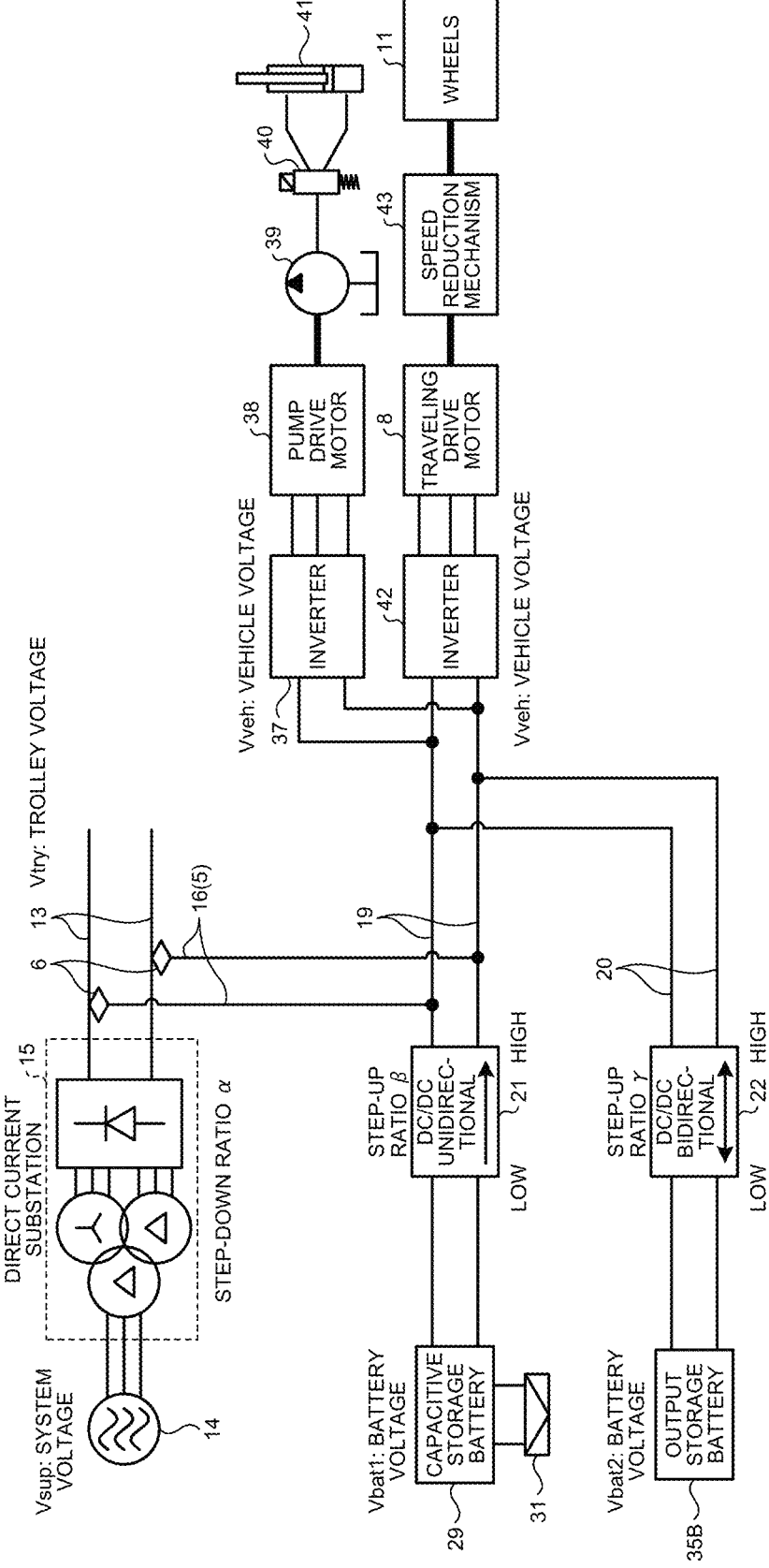
FIG. 15 is a hard block diagram illustrating an example of an energy supply system according to a second embodiment.

FIG. 15 is a hard block diagram illustrating an example of the energy supply system 17 according to the embodiment. FIG. 15 is a modification of FIG. 3 and illustrates an example where a capacitive storage battery 29 is provided instead of the fuel cell 7 illustrated in FIG. 3, and an output storage battery 35B is provided instead of the storage battery 35.

The capacitive storage battery 29 can output power for a longer time than the output storage battery 35B. Energy density [Wh/kg] of the capacitive storage battery 29 is higher than that of the output storage battery 35B. The output storage battery 35B has a higher output than the capacitive storage battery 29. Power density [kW/kg] of the output storage battery 35B is higher than that of the capacitive storage battery 29. The capacitive storage battery 29 is an example of a first storage battery. The output storage battery 35B is an example of a second storage battery.

The haul vehicle 1 has a charging port 31. The charging port 31 is connected to the capacitive storage battery 29. An external charger is connected to the charging port 31. The external charger is connected to the power plant 14 or the direct current substation 15 via a power transmission line different from the trolley wire 13. The external charger is a charger different from the trolley wire 13. The capacitive storage battery 29 is charged by the external charger via the charging port 31.

The traveling drive motor 8 of the vehicle drive system 18 generates driving force for rotating the rear wheels 11R on the basis of power from at least one of the trolley wire 13 or the capacitive storage battery 29. The output storage battery 35B is charged with power from at least one of the trolley wire 13 or the capacitive storage battery 29. The traveling drive motor 8 is capable of generating driving force for rotating the rear wheels 11R on the basis of power from the output storage battery 35B.

The DC/DC converter 21 converts a battery voltage Vbat1 indicating voltage of the capacitive storage battery 29. The DC/DC converter 21 steps up the battery voltage Vbat1 by the certain step-up ratio β. The DC/DC converter 22 is a unidirectional DC/DC converter capable of outputting power only from the primary side to the secondary side. The primary side of the DC/DC converter 21 is a low-voltage side. The secondary side of the DC/DC converter 21 is a high-voltage side. The primary side of the DC/DC converter 21 is a side of the capacitive storage battery 29, and the secondary side of the DC/DC converter 21 is the side of the trolley power feed line 16 (the side of the vehicle drive system 18). Power is supplied from the capacitive storage battery 29 to the vehicle drive system 18 via the DC/DC converter 21. The battery voltage Vbat1 converted by the DC/DC converter 21 is applied to the traveling drive motor 8 of the vehicle drive system 18. Power is not supplied from the trolley power feed line 16 to the capacitive storage battery 29 due to the DC/DC converter 21.

The DC/DC converter 22 converts a battery voltage Vbat2 indicating voltage of the output storage battery 35B. The DC/DC converter 22 steps up the battery voltage Vbat2 by the certain step-up ratio γ. The DC/DC converter 22 is a bidirectional DC/DC converter capable of outputting power from a primary side to a secondary side and outputting power from the secondary side to the primary side. The primary side of the DC/DC converter 22 is a low-voltage side. The secondary side of the DC/DC converter 22 is a high-voltage side. The primary side of the DC/DC converter 22 is a side of the output storage battery 35B, and the secondary side of the DC/DC converter 22 is the side of the trolley power feed line 16 (the side of the vehicle drive system 18). Power is supplied from the output storage battery 35B to the vehicle drive system 18 via the DC/DC converter 22. The battery voltage Vbat2 converted by the DC/DC converter 22 is applied to the traveling drive motor 8 of the vehicle drive system 18. In addition, the output storage battery 35B is charged with power from at least one of the trolley wire 13 or the capacitive storage battery 29.

Figure 16:
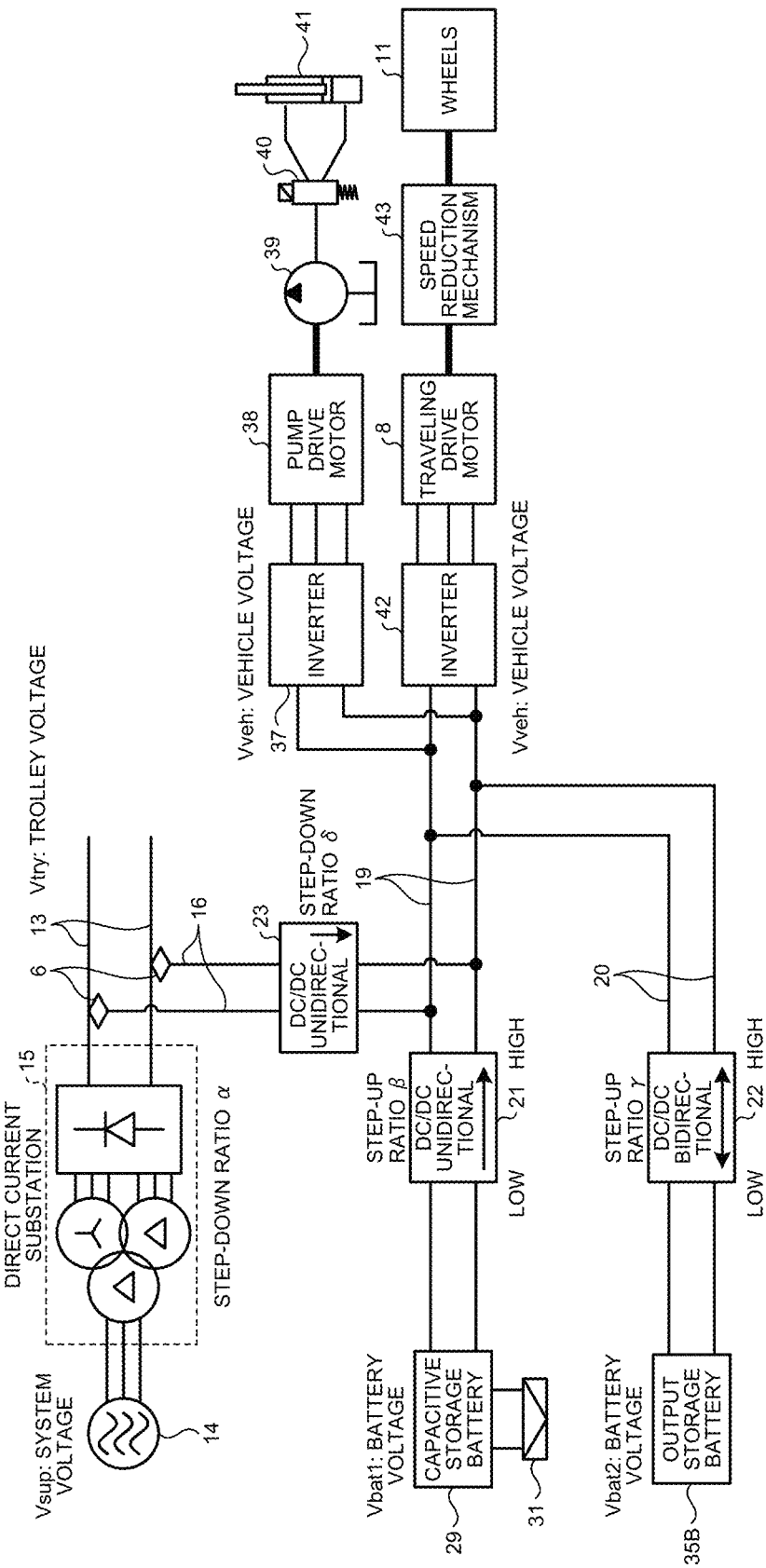
FIG. 16 is a hard block diagram illustrating another example of the energy supply system according to the second embodiment.

FIG. 16 is a hard block diagram illustrating another example of the energy supply system 17 according to the embodiment. FIG. 16 is a modification of FIG. 15 and illustrates an example where the DC/DC converter 23 is added to the configuration illustrated in FIG. 15.

The DC/DC converter 23 converts the trolley voltage Vtry indicating a voltage of the trolley wire 13. The DC/DC converter 23 is disposed in the trolley power feed line 16. The DC/DC converter 23 steps down the trolley voltage Vtry by a certain step-down ratio δ. The DC/DC converter 23 is a unidirectional DC/DC converter capable of outputting power only from a primary side to a secondary side. The primary side of the DC/DC converter 23 is a high-voltage side. The secondary side of the DC/DC converter 23 is a low-voltage side.

The primary side of the DC/DC converter 23 is a side of the trolley wire 13, and the secondary side of the DC/DC converter 23 is a side of the power line 19 (the side of the vehicle drive system 18). Power is supplied from the trolley wire 13 to the vehicle drive system 18 via the DC/DC converter 23. The trolley voltage Vtry converted by the DC/DC converter 23 is applied to the traveling drive motor 8 of the vehicle drive system 18.

The DC/DC converter 23, which steps down the trolley voltage Vtry, can increase the trolley voltage Vtry even if the vehicle voltage Vveh is low.

Figure 17:
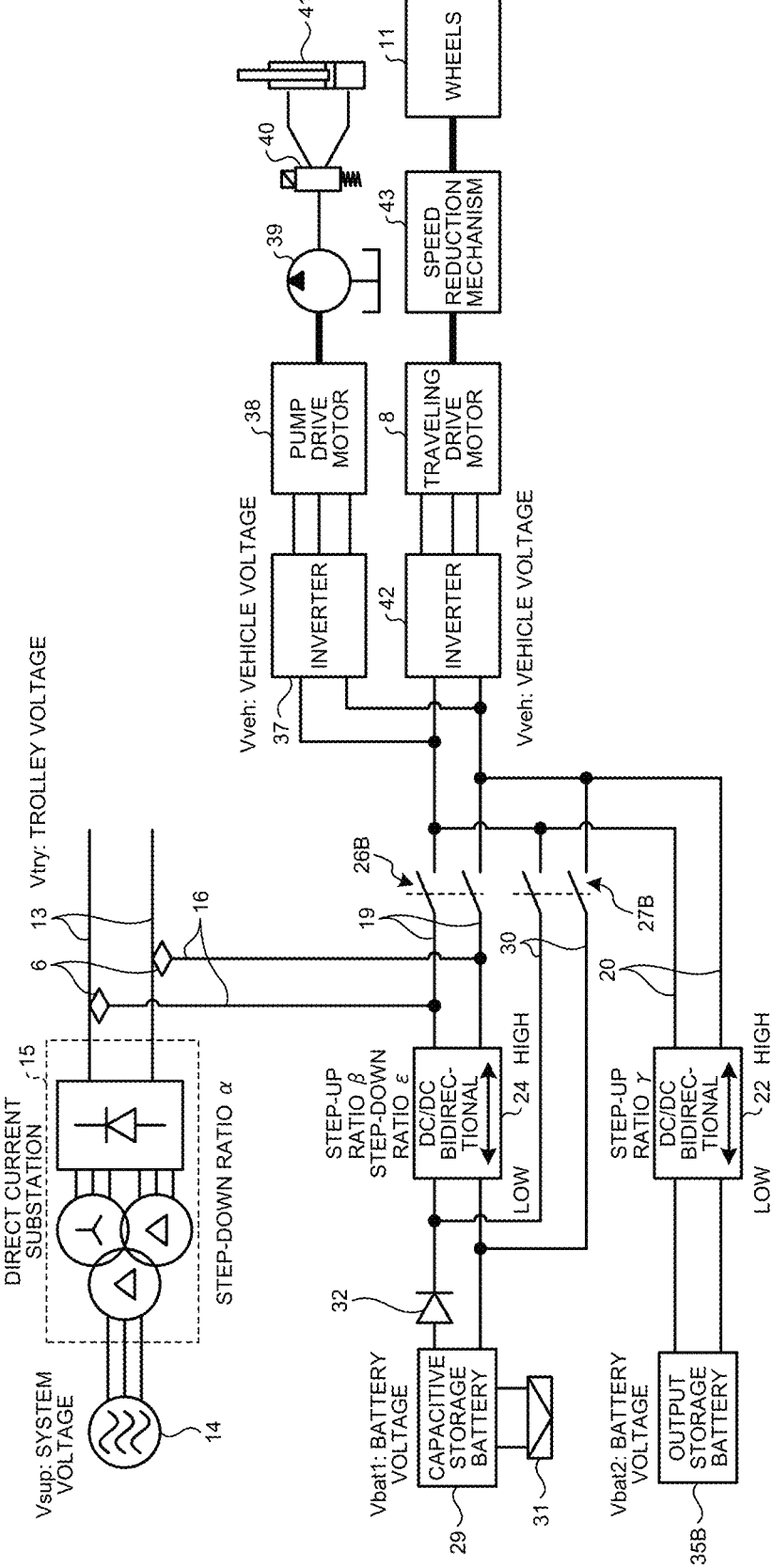
FIG. 17 is a hard block diagram illustrating another example of the energy supply system according to the second embodiment.

FIG. 17 is a hard block diagram illustrating another example of the energy supply system 17 according to the embodiment. FIG. 17 is a modification of FIG. 15 and illustrates an example where the power line 30, a diode 32, a first switch 26B, and a second switch 27B are added to the configuration illustrated in FIG. 15. In addition, a DC/DC converter 24, which is a bidirectional DC/DC converter, is provided instead of the DC/DC converter 21.

The power line 30 is disposed in parallel with the power line 19. The diode 32 is disposed in the power line 19 between the capacitive storage battery 29 and the DC/DC converter 24. The first switch 26B is disposed in the power line 19 between the DC/DC converter 24 and the vehicle drive system 18. The first switch 26B is disposed in the power line 19 between the connection between the trolley power feed line 16 and the power line 19 and the vehicle drive system 18. The second switch 27B is disposed in the power line 30. One end of the power line 30 is connected to the power line 19 between the diode 32 and the DC/DC converter 24. Another end of the power line 30 is connected to the power line 20 on the secondary side of the DC/DC converter 22. The power line 20 on the secondary side of the DC/DC converter 22 is connected to the power line 19 between the first switch 26B and the vehicle drive system 18. The other end of the power line 30 is connected to the power line 19 between the first switch 26B and the vehicle drive system 18 via the power line 20.

The DC/DC converter 24 converts the trolley voltage Vtry of the trolley wire 13 and the battery voltage Vbat1 of the capacitive storage battery 29. The DC/DC converter 24 is disposed in the power line 19 between the diode 32 and the first switch 26B. The trolley power feed line 16 is connected to the power line 19 between the DC/DC converter 24 and the first switch 26B.

The DC/DC converter 24 is a bidirectional DC/DC converter capable of outputting power from a primary side to a secondary side and outputting power from the secondary side to the primary side. The primary side of the DC/DC converter 24 is a low-voltage side. The secondary side of the DC/DC converter 24 is a high-voltage side. The primary side of the DC/DC converter 24 is the side of the capacitive storage battery 29, and the secondary side of the DC/DC converter 24 is the side of the trolley power feed line 16 (the side of the vehicle drive system 18).

The DC/DC converter 24 steps up the battery voltage Vbat1 by the certain step-up ratio β. The DC/DC converter 24 steps down the trolley voltage Vtry by a certain step-down ratio α. Power is supplied from at least one of the trolley wire 13 or the capacitive storage battery 29 to the vehicle drive system 18 via the DC/DC converter 24. At least one of the trolley voltage Vtry or the battery voltage Vbat1 converted by the DC/DC converter 24 is applied to the traveling drive motor 8 of the vehicle drive system 18. The output storage battery 35B is charged with power from at least one of the trolley wire 13 or the capacitive storage battery 29.

The first switch 26B and the second switch 27B constitute a switch mechanism for switching between a first state, in which power is supplied from the trolley wire 13 to the vehicle drive system 18 via the DC/DC converter 24, a second state, in which power is supplied from the capacitive storage battery 29 to the vehicle drive system 18 via the DC/DC converter 24, and a third state, in which power is supplied from the output storage battery 35B to the vehicle drive system 18 via the DC/DC converter 22.

By controlling the first switch 26B and the second switch 27B, the first state, in which power is supplied from the trolley wire 13 to the vehicle drive system 18, the second state, in which power is supplied from the capacitive storage battery 29 to the vehicle drive system 18, and the third state, in which power is supplied from the output storage battery 35B to the vehicle drive system 18, are switched. When power is supplied to the vehicle drive system 18, the traveling drive motor 8 is driven.

When power is supplied from the trolley wire 13 to the vehicle drive system 18, the first switch 26B is opened, and the second switch 27B is closed. Power from the trolley wire 13 is input from the secondary side of the DC/DC converter 24 to the DC/DC converter 24, stepped down by the certain step-down ratio α, and then supplied to the vehicle drive system 18 via the power line 30 and the second switch 27B. The traveling drive motor 8 generates driving force for rotating the rear wheels 11R on the basis of power from the trolley wire 13. When the output storage battery 35B is charged with power from the trolley wire 13, too, the first switch 26B is opened, and the second switch 27B is closed.

When power is supplied from the capacitive storage battery 29 to the vehicle drive system 18, the first switch 26B is closed, and the second switch 27B is opened. Power from the capacitive storage battery 29 is input to the DC/DC converter 24 from the primary side of the DC/DC converter 24 via the diode 32, stepped up by the certain step-up ratio, and then supplied to the vehicle drive system 18 via the first switch 26B. The traveling drive motor 8 generates driving force for rotating the rear wheels 11R on the basis of power from the capacitive storage battery 29. When the output storage battery 35B is charged with power from the capacitive storage battery 29, too, the first switch 26B is closed, and the second switch 27B is opened.

When power is supplied from the output storage battery 35B to the vehicle drive system 18, the first switch 26B is opened, and the second switch 27B is opened. Power from the output storage battery 35B is input to the DC/DC converter 22 from the primary side of the DC/DC converter 22, stepped up by the certain step-up ratio γ, and then supplied to the vehicle drive system 18. The traveling drive motor 8 generates driving force for rotating the rear wheels 11R on the basis of power from the output storage battery 35B.

The DC/DC converter 24 is a shared DC/DC converter shared for the conversion of the trolley voltage Vtry and conversion of the battery voltage Vbat1. Since the DC/DC converter 24 is shared for the supply of power from the trolley wire 13 to the vehicle drive system 18 and the supply of power from the capacitive storage battery 29 to the vehicle drive system 18, an increase in the cost of the energy supply system 17 is suppressed. In addition, since one DC/DC converter 24 is shared for the conversion of the trolley voltage Vtry and the conversion of the battery voltage Vbat1, an increase in the size of the energy supply system 17 is suppressed.

Figure 18:
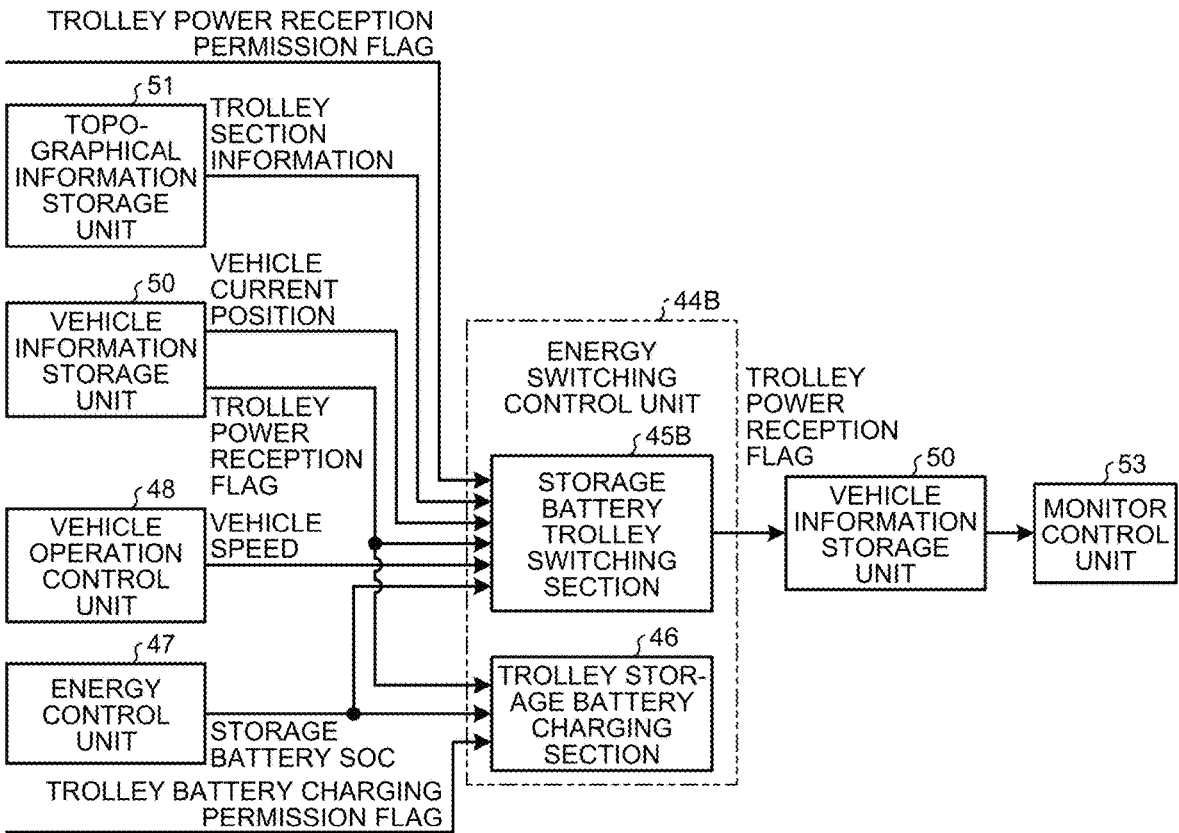
FIG. 18 is a soft block diagram illustrating an example of a control apparatus according to the second embodiment.

FIG. 18 is a soft block diagram illustrating an example of the control apparatus 10 according to the embodiment. FIG. 18 illustrates an example of the control apparatus 10 that controls the energy supply system 17 illustrated in FIG. 5.

The control apparatus 10 includes the energy control unit 47, the vehicle operation control unit 48, the vehicle information storage unit 50, the topographical information storage unit 51, an energy switching control unit 44B, and the monitor control unit 53. The energy switching control unit 44B includes a storage battery trolley switching section 45B and the trolley storage battery charging section 46.

The energy control unit 47 monitors a state of charge (SOC) of the output storage battery 35B. When the output storage battery 35B is in a fully charged state, the SOC is 100%, and when the output storage battery 35B is in a fully discharged state, the SOC is 0%.

The vehicle operation control unit 48 monitors vehicle speed, which indicates traveling speed of the traveling apparatus 4.

The vehicle information storage unit 50 acquires data detected by the position sensor 9. The position sensor 9 detects a current position of the vehicle body 3. The vehicle information storage unit 50 acquires data detected by the position sensor 9 and monitors the current position of the vehicle body 3.

The topographical information storage unit 51 stores map information regarding the work site. As described later, trolley switching sections, trolley sections, and storage battery switching sections are set in the work site. In the embodiment, the map information includes positional information regarding trolley switching sections, positional information regarding trolley sections, and positional information regarding storage battery switching sections.

The storage battery trolley switching section 45B controls the switch mechanism including the first switch 26B and the second switch 27B such that the first state, in which power is supplied from the trolley wire 13 to the vehicle drive system 18, the second state, in which power is supplied from the capacitive storage battery 29 to the vehicle drive system 18, and the third state, in which power is supplied from the output storage battery 35B to the vehicle drive system 18, are switched. The storage battery trolley switching section 45B controls the switch mechanism in such a way as to switch between the first state, the second state, and the third state on the basis of the trolley power reception permission signal (trolley power reception permission flag) input from the first input unit 61, the map information including the positional information regarding trolley sections input from the topographical information storage unit 51, the current position of the vehicle body 3 input from the vehicle information storage unit 50, the trolley power reception flag input from the vehicle information storage unit 50, the vehicle speed input from the vehicle operation control unit 48, and the state of charge (SOC) of the output storage battery 35B input from the energy control unit 47.

The trolley storage battery charging section 46 controls the switch mechanism including the first switch 26B and the second switch 27B such that the output storage battery 35B is charged by power from the trolley wire 13. The trolley storage battery charging section 46 charges the output storage battery 35B with power from the trolley wire 13 on the basis of the trolley battery charging permission signal (trolley battery charging permission flag) input from the second input unit 62, the trolley power reception flag input from the vehicle information storage unit 50, and the state of charge (SOC) of the output storage battery 35B input from the energy control unit 47.

The storage battery trolley switching section 45B transmits the trolley power reception flag indicating that storage battery trolley switching control has been switched to the trolley power reception state to the vehicle information storage unit 50. The vehicle information storage unit 50 stores the trolley power reception flag.

The monitor control unit 53 displays a trolley power reception state on the monitor 54 on the basis of the trolley power reception flag from the vehicle information storage unit 50.

Figure 19:
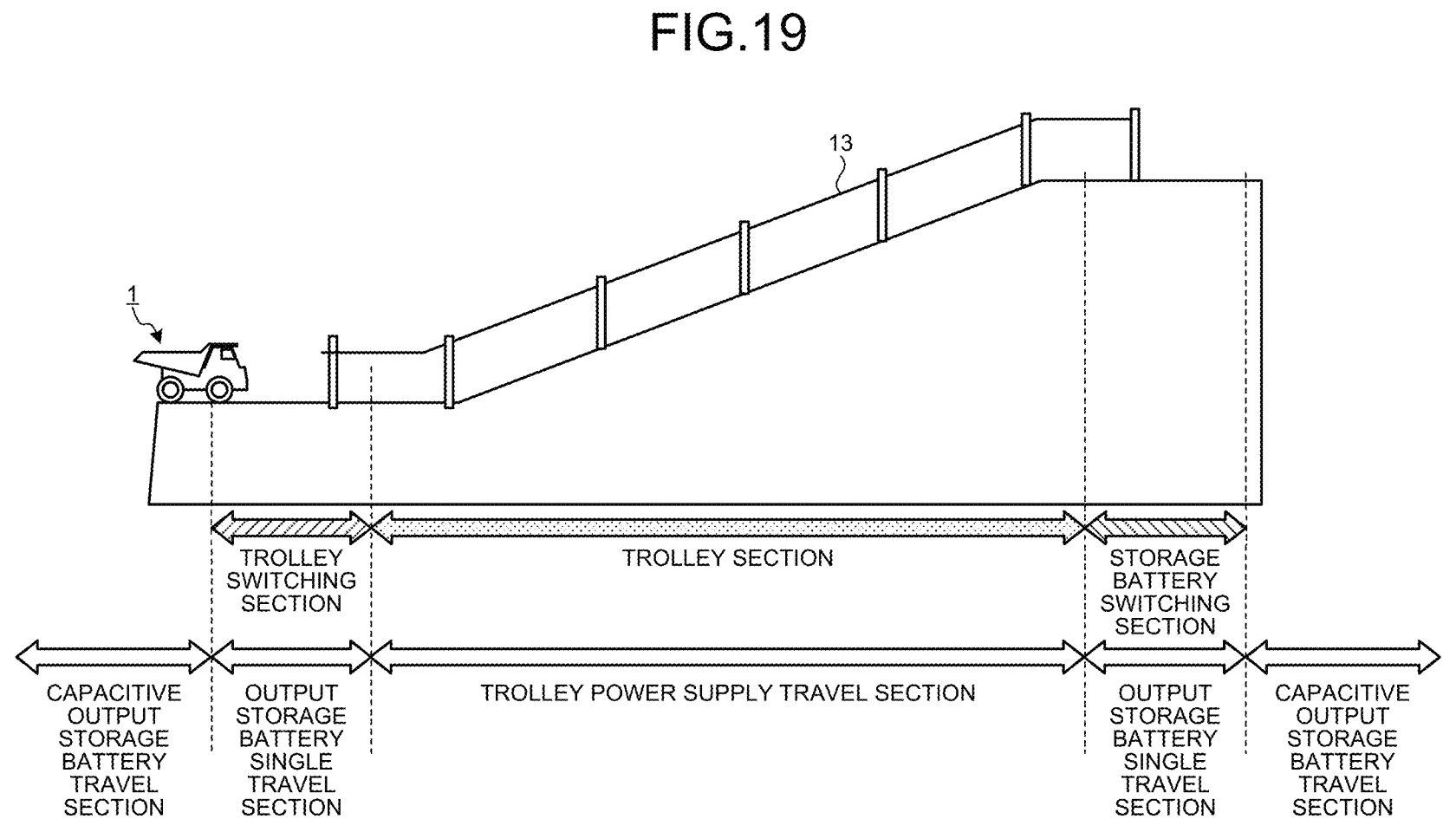

FIG. 19 is an image diagram illustrating an example of an operation of the energy supply system 17 according to the embodiment. As illustrated in FIG. 19, the trolley wire 13 is provided on a climbing road at the work site. Trolley switching sections, trolley sections, and storage battery switching sections are set in a travel path in the work site. The trolley switching sections are set before climbing roads. The trolley sections are set on the climbing roads. The storage battery switching sections are set after the climbing roads.

The storage battery trolley switching section 45B controls the switch mechanism such that the vehicle drive system 18 is driven on the basis of power output from the capacitive storage battery 29 and the output storage battery 35B in capacitive output storage battery travel sections before the trolley switching sections.

In the trolley switching sections, the storage battery trolley switching section 45B controls the switch mechanism in such a way as to switch from the second state, in which power is supplied from the capacitive storage battery 29 to the vehicle drive system 18, to the first state, in which power is supplied from the trolley wire 13 to the vehicle drive system 18. The trolley switching sections are output storage battery single travel sections where the output of power from the capacitive storage battery 29 is stopped and the vehicle drive system 18 is driven only by power supplied from the output storage battery 35B.

The trolley sections are trolley power supply travel sections where the vehicle drive system 18 is driven only by power supplied from the trolley wire 13. The storage battery trolley switching section 45B controls the switch mechanism in such a way as to maintain the first state, in which power is supplied from the trolley wire 13 to the vehicle drive system 18, in the trolley sections. Surplus power is used to charge the output storage battery 35B.

In the storage battery switching sections, the storage battery trolley switching section 45B controls the switch mechanism in such a way as to switch from the first state, in which power is supplied from the trolley wire 13 to the vehicle drive system 18, to the second state, in which power is supplied from the capacitive storage battery 29 to the vehicle drive system 18. The storage battery switching sections are output storage battery single travel sections where the reception of power from the trolley wire 13 is stopped and the vehicle drive system 18 is driven only by power supplied from the output storage battery 35B.

The storage battery trolley switching section 45B controls the switch mechanism such that the vehicle drive system 18 is driven on the basis of power output from the capacitive storage battery 29 and the output storage battery 35B in the capacitive output storage battery travel sections after the storage battery switching sections.

Figure 20:
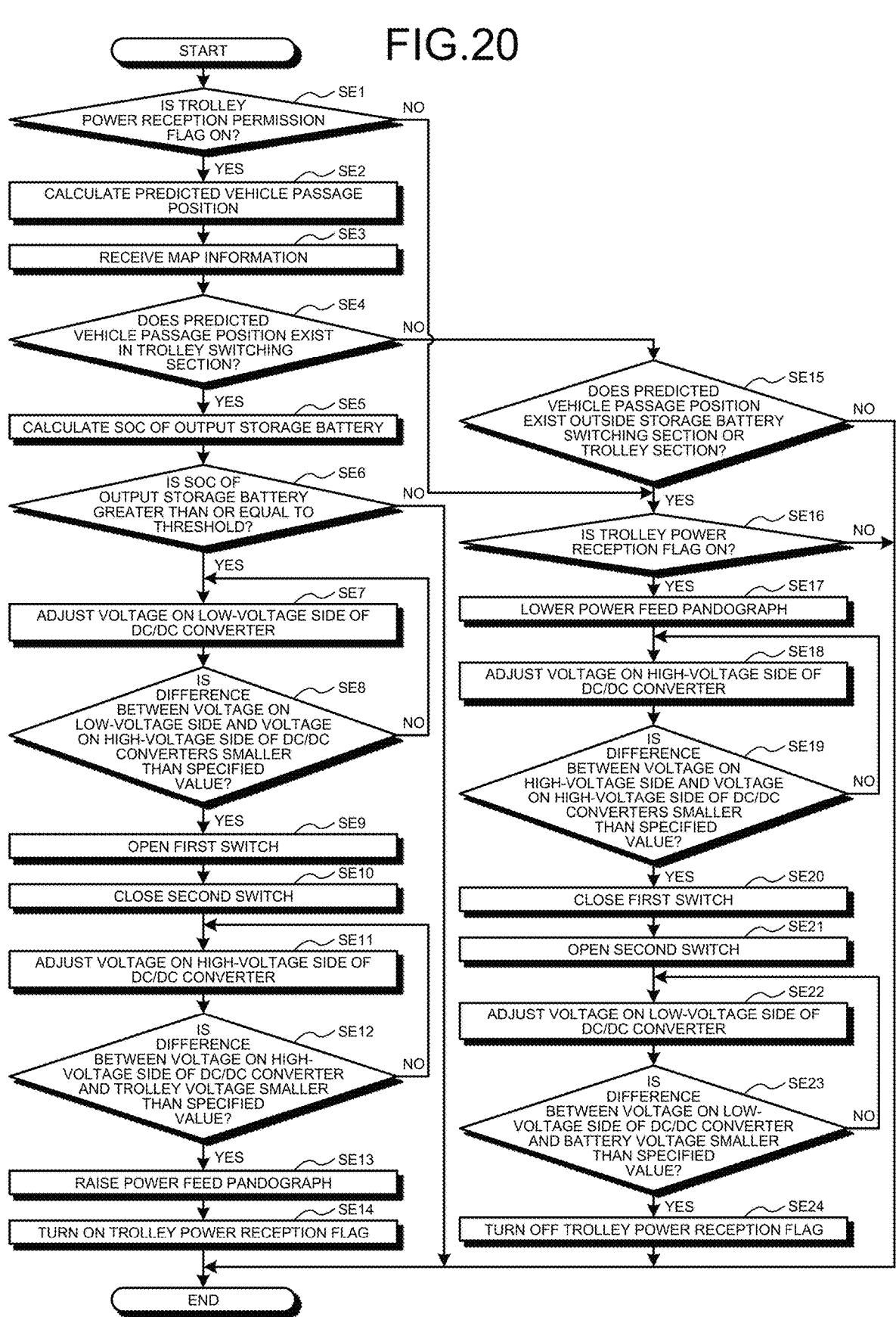
FIG. 20 is a flowchart illustrating an example of a method for controlling a haul vehicle according to the second embodiment.

FIG. 20 is a flowchart illustrating an example of a method for controlling the haul vehicle 1 according to the embodiment. FIG. 20 illustrates a method for controlling the haul vehicle 1 at a time when the haul vehicle 1 including the energy supply system 17 illustrated in FIG. 17 travels on the climbing road illustrated in FIG. 19.

When the haul vehicle 1 travels in a capacitive output storage battery travel section, the storage battery trolley switching section 45B controls the switch mechanism such that power is supplied from the capacitive storage battery 29 to the vehicle drive system 18. The first switch 26B is closed, and the second switch 27B is opened.

The storage battery trolley switching section 45B determines whether the trolley power reception permission flag is on (step SE1).

If it is determined in step SE1 that the trolley power reception permission flag is on (step SE1: Yes), the storage battery trolley switching section 45B calculates the predicted vehicle passage position on the basis of the current position of the vehicle body 3 input from the vehicle information storage unit 50 and the vehicle speed input from the vehicle operation control unit 48 (step SE2).

The storage battery trolley switching section 45B receives the map information regarding the work site from the topographical information storage unit 51 (step SE3).

The storage battery trolley switching section 45B determines whether the predicted vehicle passage position exists in a trolley switching section (step SE4).

If it is determined in step SE4 that the predicted vehicle passage position exists in a trolley switching section (step SE4: Yes), the storage battery trolley switching section 45B calculates the SOC of the output storage battery 35B (step SE5).

The storage battery trolley switching section 45B determines whether the SOC of the output storage battery 35B calculated in step SE5 is greater than or equal to a predetermined threshold (step SE6).

If it is determined in step SE6 that the SOC of the output storage battery 35B is greater than or equal to the threshold (step SE6: Yes), the storage battery trolley switching section 45B adjusts the voltage on the low-voltage side (primary side) of the DC/DC converter 24 (step SE7).

The storage battery trolley switching section 45B determines whether the difference between the voltage on the low-voltage side of the DC/DC converter 24 and the voltage on the high-voltage side (secondary side) of the DC/DC converter 22 has fallen below a predetermined specified value (step SE8).

If it is determined in step SE8 that the difference between the voltage on the low-voltage side of the DC/DC converter 24 and the voltage on the high-voltage side of the DC/DC converter 22 has not fallen below the specified value (step SE8: No), the storage battery trolley switching section 45B returns to the processing in step SE7.

If it is determined in step SE8 that the difference between the voltage on the low-voltage side of the DC/DC converter 24 and the voltage on the high-voltage side of the DC/DC converter 22 has fallen below the specified value (step SE8: Yes), the storage battery trolley switching section 45B opens the first switch 26B (step SE9).

The storage battery trolley switching section 45B closes the second switch 27B (step SE10).

The storage battery trolley switching section 45B adjusts the voltage on the high-voltage side (secondary side) of the DC/DC converter 24 (step SE11).

The storage battery trolley switching section 45B determines whether the difference between the voltage on the high-voltage side of the DC/DC converter 24 and the trolley voltage Vtry has fallen below a predetermined specified value (step SE12).

If it is determined in step SE12 that the difference between the voltage on the high-voltage side of the DC/DC converter 24 and the trolley voltage Vtry has not fallen below the specified value (step SE12: No), the storage battery trolley switching section 45B returns to the processing in step SE11.

If it is determined in step SE12 that the difference between the voltage on the high-voltage side of the DC/DC converter 24 and the trolley voltage Vtry has fallen below the specified value (step SE12: Yes), the storage battery trolley switching section 45B raises the power feed pantograph 6 (step SE13).

The storage battery trolley switching section 45B determines that reception of power from the trolley wire 13 has started, and turns on the trolley power reception flag (step SE14).

If it is determined in step SE4 that the predicted vehicle passage position does not exist in a trolley switching section (step SE4: No), the storage battery trolley switching section 45B determines whether the predicted vehicle passage position exists outside a storage battery switching section or a trolley section (step SE15).

If it is determined in step SE15 that the predicted vehicle passage position exists outside a storage battery switching section or a trolley section (step SE15: Yes), or if it is determined in step SE1 that the trolley power reception permission flag is not ON (step SE1: No), the storage battery trolley switching section 45B determines whether the trolley power reception flag is on (step SE16).

If it is determined in step SE16 that the trolley power reception flag is on (step SE16: Yes), the storage battery trolley switching section 45B lowers the power feed pantograph 6 (step SE17).

The storage battery trolley switching section 45B adjusts the voltage on the high-voltage side of the DC/DC converter 24 (step SE18).

The storage battery trolley switching section 45B determines whether the difference between the voltage on the high-voltage side of the DC/DC converter 24 and the voltage on the high-voltage side of the DC/DC converter 22 has fallen below a predetermined specified value (step SE19).

If it is determined in step SE19 that the difference between the voltage on the high-voltage side of the DC/DC converter 24 and the voltage on the high-voltage side of the DC/DC converter 22 has not fallen below the specified value (step SE19: No), the storage battery trolley switching section 45B returns to the processing in step SE18.

If it is determined in step SE18 that the difference between the voltage on the high-voltage side of the DC/DC converter 24 and the voltage on the high-voltage side of the DC/DC converter 22 has fallen below the specified value (step SE18: Yes), the storage battery trolley switching section 45B closes the first switch 26B (step SE20).

The storage battery trolley switching section 45B opens the second switch 27B (step SE21).

The storage battery trolley switching section 45B adjusts the voltage on the low-voltage side (primary side) of the DC/DC converter 24 (step SE22).

The storage battery trolley switching section 45B determines whether a difference between the voltage on the low-voltage side of the DC/DC converter 24 and the battery voltage Vbat1 has fallen below a predetermined specified value (step SE23).

If it is determined in step SE23 that the difference between the voltage on the low-voltage side of the DC/DC converter 24 and the battery voltage Vbat1 has not fallen below the specified value (step SE23: No), the storage battery trolley switching section 45B returns to the processing in step SE22.

If it is determined in step SE23 that the difference between the voltage on the low-voltage side of the DC/DC converter 24 and the battery voltage Vbat1 has fallen below the specified value (step SE23: Yes), it is determined that the reception of power from the trolley wire 13 has stopped, and the trolley power reception flag is turned off (step SE24).

When the processing in step SE14 has ended, if it is determined in step SE6 that the SOC of the output storage battery 35B is not greater than or equal to the threshold (step SE6: No), if it is determined in step SE15 that the predicted vehicle passage position does not exist outside a storage battery switching section or a trolley section (step SE15: No), if it is determined in step SE16 that the trolley power reception flag is off (step SE16: No), or when the processing in step SE24 has ended, the process ends.

Figure 21:
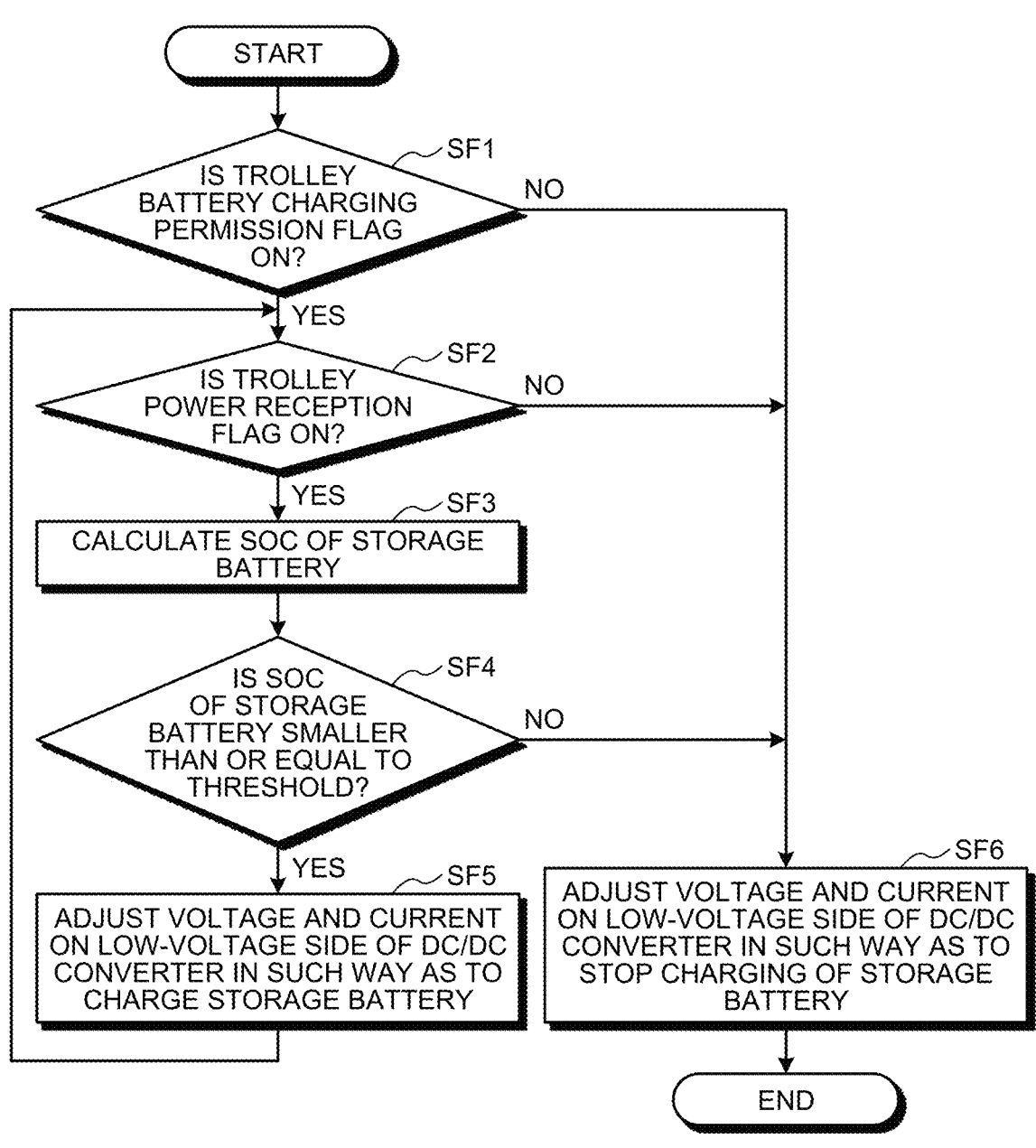
FIG. 21 is a flowchart illustrating another example of the method for controlling a haul vehicle according to the second embodiment.

FIG. 21 is a flowchart illustrating another example of the method for controlling the haul vehicle 1 according to the embodiment. FIG. 21 illustrates a method for controlling the haul vehicle 1 at a time when the haul vehicle 1 including the energy supply system 17 illustrated in FIG. 17 charges the output storage battery 35B.

The trolley storage battery charging section 46 determines whether the trolley battery charging permission flag is on (step SF1).

If it is determined in step SF1 that the trolley battery charging permission flag is on (step SF1: Yes), the trolley storage battery charging section 46 determines whether the trolley power reception flag is on (step SF2).

If it is determined in step SF2 that the trolley power reception flag is on (step SF2: Yes), the trolley storage battery charging section 46 calculates the SOC of the output storage battery 35B (step SF3).

The trolley storage battery charging section 46 determines whether the SOC of the output storage battery 35B calculated in step SF3 is smaller than or equal to a predetermined threshold (step SF4).

If it is determined in step SF4 that the SOC of the output storage battery 35B is smaller than or equal to the threshold (step SF4: Yes), the trolley storage battery charging section 46 adjusts the voltage and the current on the low-voltage side (primary side) of the DC/DC converter 22 in such a way as to charge the output storage battery 35B (step SF5), and returns to the processing in step SF2.

If it is determined in step SF1 that the trolley battery charging permission flag is off (step SF1: No), if it is determined in step SF2 that the trolley power reception flag is off (step SF2: No), or if it is determined in step SF4 that the SOC of the output storage battery 35B exceeds the threshold (step SF4: No), the trolley storage battery charging section 46 adjusts the voltage and the current on the primary side of the DC/DC converter 22 in such a way as to stop the charging of the output storage battery 35B (step SF6), and ends the process.

Figure 22:
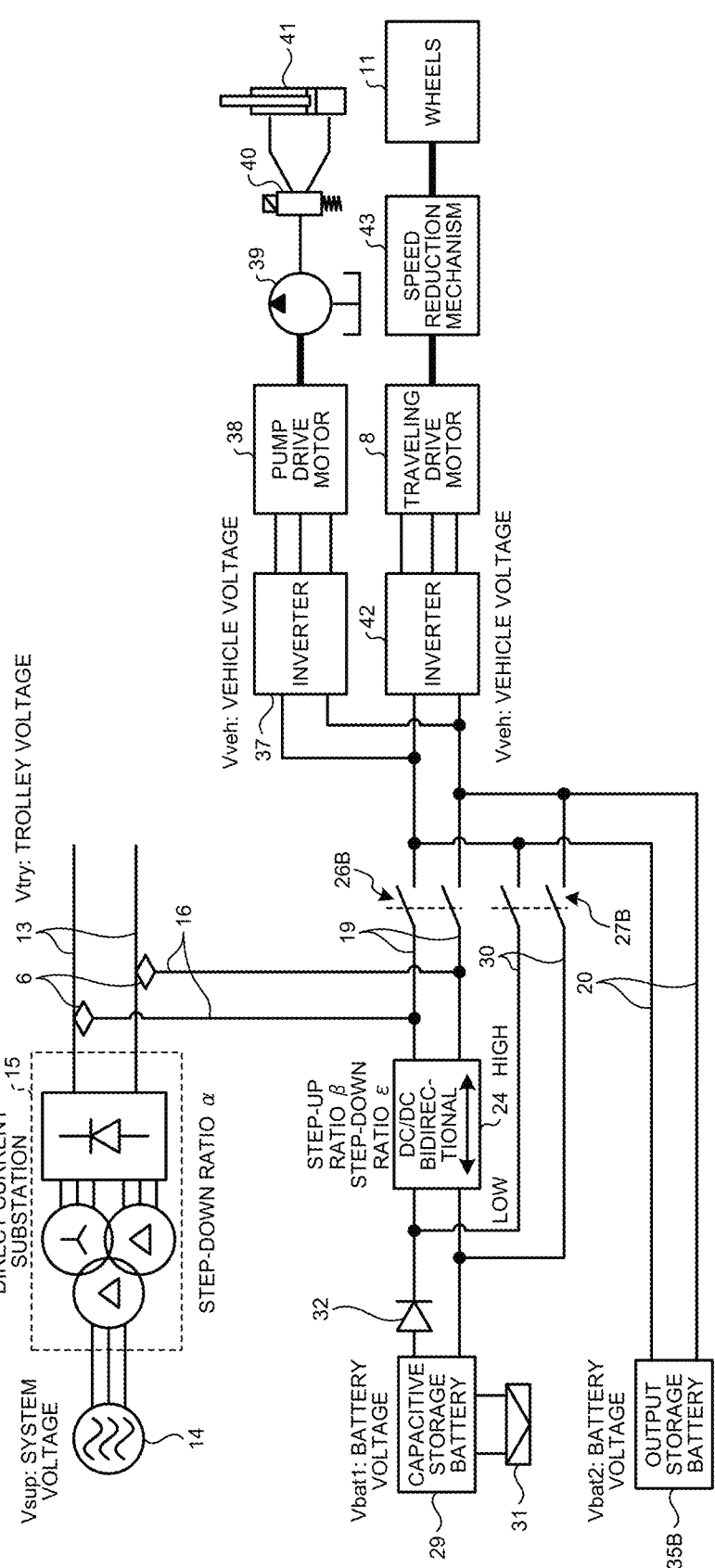
FIG. 22 is a hard block diagram illustrating another example of the energy supply system according to the second embodiment.

FIG. 22 is a hard block diagram illustrating another example of the energy supply system 17 according to the embodiment. FIG. 22 is a modification of FIG. 17 and illustrates an example where the DC/DC converter 22 is omitted from the configuration illustrated in FIG. 17. By omitting the DC/DC converter 22, increases in the cost and the size of the energy supply system 17 are suppressed.

Figure 23:
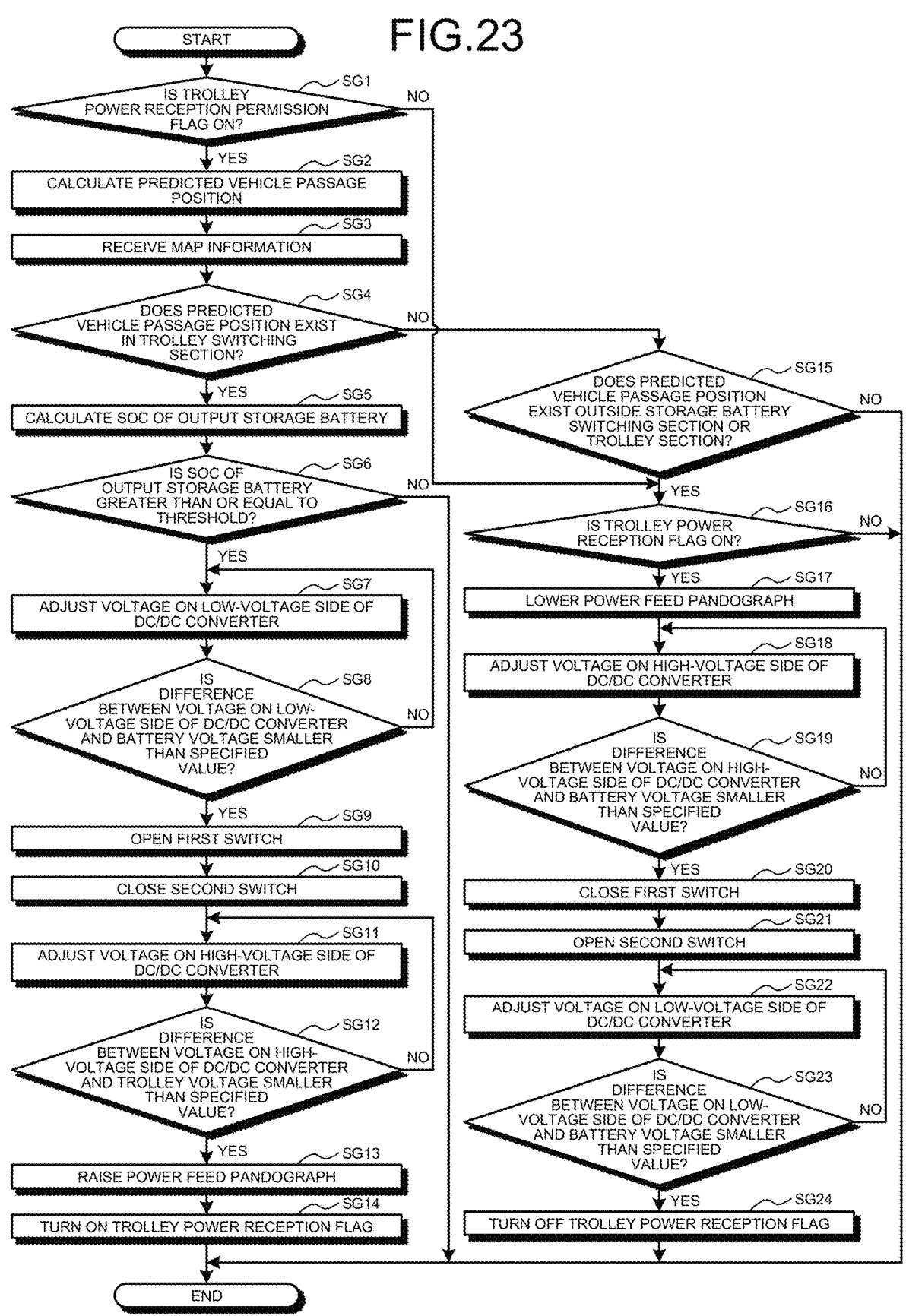
FIG. 23 is a flowchart illustrating another example of the method for controlling a haul vehicle according to the second embodiment.

FIG. 23 is a flowchart illustrating another example of the method for controlling the haul vehicle 1 according to the embodiment. FIG. 23 illustrates a method for controlling the haul vehicle 1 at a time when the haul vehicle 1 including the energy supply system 17 illustrated in FIG. 22 travels on the climbing road illustrated in FIG. 19.

When the haul vehicle 1 travels in a capacitive output storage battery travel section, the storage battery trolley switching section 45B controls the switch mechanism such that power is supplied from the capacitive storage battery 29 to the vehicle drive system 18. The first switch 26B is closed, and the second switch 27B is opened.

The storage battery trolley switching section 45B determines whether the trolley power reception permission flag is on (step SG1).

If it is determined in step SG1 that the trolley power reception permission flag is on (step SG1: Yes), the storage battery trolley switching section 45B calculates the predicted vehicle passage position on the basis of the current position of the vehicle body 3 input from the vehicle information storage unit 50 and the vehicle speed input from the vehicle operation control unit 48 (step SG2).

The storage battery trolley switching section 45B receives the map information regarding the work site from the topographical information storage unit 51 (step SG3).

The storage battery trolley switching section 45B determines whether the predicted vehicle passage position exists in a trolley switching section (step SG4).

If it is determined in step SG4 that the predicted vehicle passage position exists in a trolley switching section (step SG4: Yes), the storage battery trolley switching section 45B calculates the SOC of the output storage battery 35B (step SG5).

The storage battery trolley switching section 45B determines whether the SOC of the output storage battery 35B calculated in step SG5 is greater than or equal to a predetermined threshold (step SG6).

If it is determined in step SG6 that the SOC of the output storage battery 35B is greater than or equal to the threshold (step SG6: Yes), the storage battery trolley switching section 45B adjusts the voltage on the low-voltage side (primary side) of the DC/DC converter 24 (step SG7).

The storage battery trolley switching section 45B determines whether a difference between the voltage on the low-voltage side of the DC/DC converter 24 and the battery voltage Vbat of the output storage battery 35B has fallen below a predetermined specified value (step SG8).

If it is determined in step SG8 that the difference between the voltage on the low-voltage side of the DC/DC converter 24 and the battery voltage Vbat of the output storage battery 35B has not fallen below the specified value (step SG8: No), the storage battery trolley switching section 45B returns to the processing in step SG7.

If it is determined in step SG8 that the difference between the voltage on the low-voltage side of the DC/DC converter 24 and the battery voltage Vbat of the output storage battery 35B has fallen below the specified value (step SG8: Yes), the storage battery trolley switching section 45B opens the first switch 26B (step SG9).

The storage battery trolley switching section 45B closes the second switch 27B (step SG10).

The storage battery trolley switching section 45B adjusts the voltage on the high-voltage side (secondary side) of the DC/DC converter 24 (step SG11).

The storage battery trolley switching section 45B determines whether the difference between the voltage on the high-voltage side of the DC/DC converter 24 and the trolley voltage Vtry has fallen below a predetermined specified value (step SG12).

If it is determined in step SG12 that the difference between the voltage on the high-voltage side of the DC/DC converter 24 and the trolley voltage Vtry has not fallen below the specified value (step SG12: No), the storage battery trolley switching section 45B returns to the processing in step SG11.

If it is determined in step SG12 that the difference between the voltage on the high-voltage side of the DC/DC converter 24 and the trolley voltage Vtry has fallen below the specified value (step SG12: Yes), the storage battery trolley switching section 45B raises the power feed pantograph 6 (step SG13).

The storage battery trolley switching section 45B determines that reception of power from the trolley wire 13 has started, and turns on the trolley power reception flag (step SG14).

If it is determined in step SG4 that the predicted vehicle passage position does not exist in a trolley switching section (step SG4: No), the storage battery trolley switching section 45B determines whether the predicted vehicle passage position exists outside a storage battery switching section or a trolley section (step SG15).

If it is determined in step SG15 that the predicted vehicle passage position exists outside a storage battery switching section or a trolley section (step SG15: Yes), or if it is determined in step SG1 that the trolley power reception permission flag is not ON (step SG1: No), the storage battery trolley switching section 45B determines whether the trolley power reception flag is on (step SG16).

If it is determined in step SG16 that the trolley power reception flag is on (step SG16: Yes), the storage battery trolley switching section 45B lowers the power feed pantograph 6 (step SG17).

The storage battery trolley switching section 45B adjusts the voltage on the high-voltage side of the DC/DC converter 24 (step SG18).

The storage battery trolley switching section 45B determines whether a difference between the voltage on the high-voltage side of the DC/DC converter 24 and the battery voltage Vbat of the output storage battery 35B has fallen below a predetermined specified value (step SG19).

If it is determined in step SG19 that the difference between the voltage on the high-voltage side of the DC/DC converter 24 and the battery voltage Vbat of the output storage battery 35B has not fallen below the specified value (step SG19: No), the storage battery trolley switching section 45B returns to the processing in step SG18.

If it is determined in step SG19 that the difference between the voltage on the low-voltage side of the DC/DC converter 24 and the battery voltage Vbat of the output storage battery 35B has fallen below the specified value (step SG19: Yes), the storage battery trolley switching section 45B closes the first switch 26B (step SG20).

The storage battery trolley switching section 45B opens the second switch 27B (step SG21).

The storage battery trolley switching section 45B adjusts the voltage on the low-voltage side (primary side) of the DC/DC converter 24 (step SG22).

The storage battery trolley switching section 45B determines whether the difference between the voltage on the low-voltage side of the DC/DC converter 24 and the battery voltage Vbat1 has fallen below a predetermined specified value (step SG23).

If it is determined in step SG23 that the difference between the voltage on the low-voltage side of the DC/DC converter 24 and the battery voltage Vbat1 has not fallen below the specified value (step SG23: No), the storage battery trolley switching section 45B returns to the processing in step SG22.

If it is determined in step SG23 that the difference between the voltage on the low-voltage side of the DC/DC converter 24 and the battery voltage Vbat1 has fallen below the specified value (step SG23: Yes), the storage battery trolley switching section 45B determines that the reception of power from the trolley wire 13 has stopped, and turns off the trolley power reception flag (step SG24).

When the processing in step SG14 has ended, if it is determined in step SG6 that the SOC of the output storage battery 35B is not greater than or equal to the threshold (step SG6: No), if it is determined in step SG15 that the predicted vehicle passage position does not exist outside a storage battery switching section or a trolley section (step SG15: No), if it is determined in step SG16 that the trolley power reception flag is off (step SG16: No), or when the processing in step SG24 has ended, the process ends.

Figure 24:
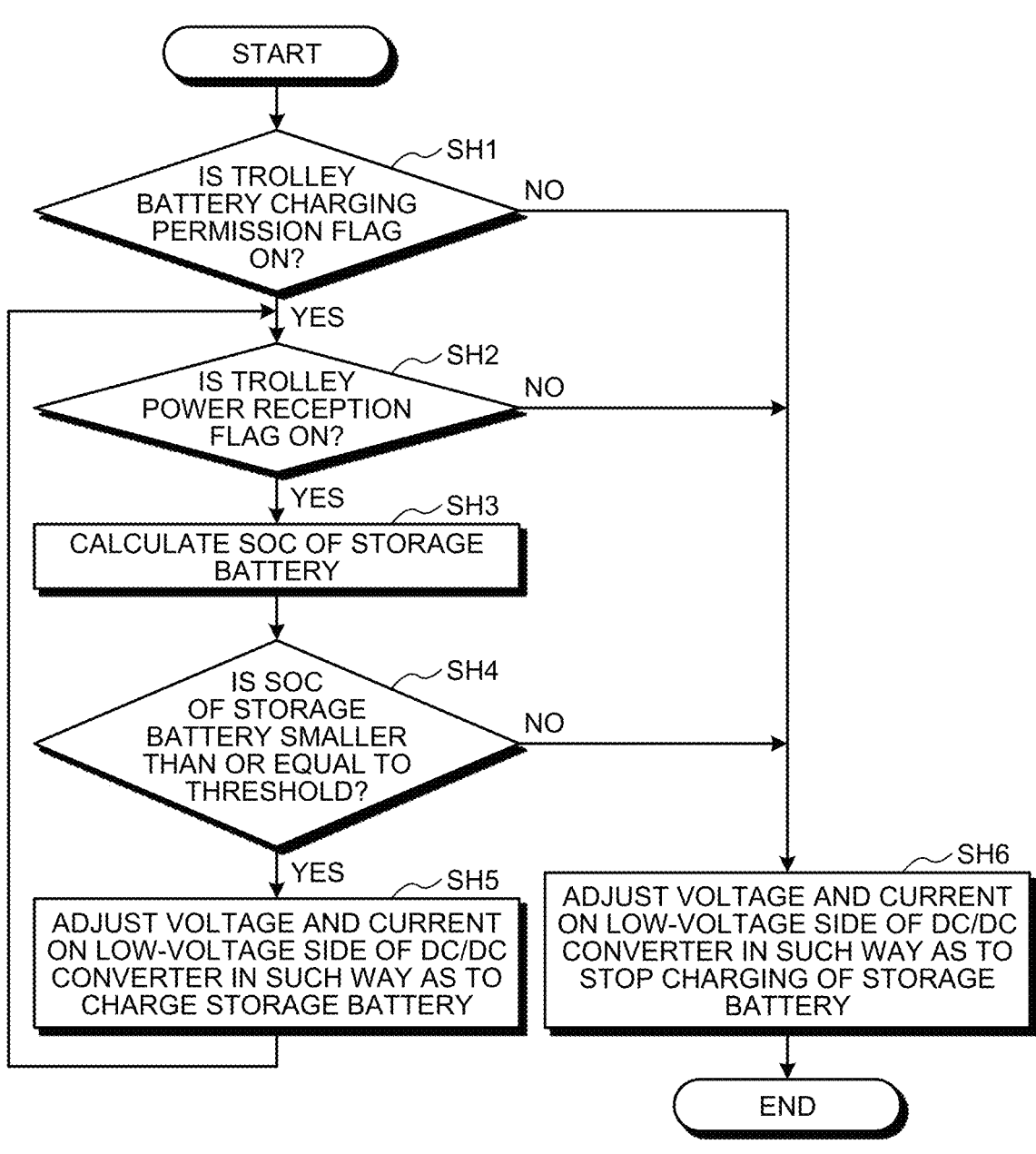
FIG. 24 is a flowchart illustrating another example of the method for controlling a haul vehicle according to the second embodiment.

FIG. 24 is a flowchart illustrating another example of the method for controlling the haul vehicle 1 according to the embodiment. FIG. 24 illustrates a method for controlling the haul vehicle 1 at a time when the haul vehicle 1 including the energy supply system 17 illustrated in FIG. 17 charges the output storage battery 35B.

The trolley storage battery charging section 46 determines whether the trolley battery charging permission flag is on (step SH1).

If it is determined in step SH1 that the trolley battery charging permission flag is on (step SH1: Yes), the trolley storage battery charging section 46 determines whether the trolley power reception flag is on (step SH2).

If it is determined in step SH2 that the trolley power reception flag is on (step SH2: Yes), the trolley storage battery charging section 46 calculates the SOC of the output storage battery 35B (step SH3).

The trolley storage battery charging section 46 determines whether the SOC of the output storage battery 35B calculated in step SH3 is smaller than or equal to a predetermined threshold (step SH4).

If it is determined in step SH4 that the SOC of the output storage battery 35B is smaller than or equal to the threshold (step SH4: Yes), the trolley storage battery charging section 46 adjusts the voltage and the current on the low-voltage side (primary side) of the DC/DC converter 24 in such a way as to charge the output storage battery 35B (step SH5), and returns to the processing in step SH2.

If it is determined in step SH1 that the trolley battery charging permission flag is off (step SH1: No), if it is determined in step SH2 that the trolley power reception flag is off (step SH2: No), or if it is determined in step SH4 that the SOC of the output storage battery 35B exceeds the threshold (step SH4: No), the trolley storage battery charging section 46 adjusts the voltage and the current on the primary side of the DC/DC converter 24 in such a way as to stop the charging of the output storage battery 35B (step SH6), and ends the process.

Effects

As described above, according to the embodiment, power is supplied from the trolley wire 13 to the haul vehicle 1. In addition, the capacitive storage battery 29 of the haul vehicle 1 is charged. Power is supplied from at least one of the trolley wire 13 or the capacitive storage battery 29 to the traveling drive motor 8 of the haul vehicle 1. The traveling drive motor 8 generates driving force for rotating the rear wheels 11R on the basis of power from at least one of the trolley wire 13 or the capacitive storage battery 29. The haul vehicle 1 travels on the driving force generated by the traveling drive motor 8. Since exhaust gas is not discharged from the haul vehicle 1, pollution of the environment of the work site is controlled.

As described with reference to FIG. 17 and the like, the DC/DC converter 24 capable of converting both the trolley voltage Vtry of the trolley wire 13 and the battery voltage Vbat1 of the capacitive storage battery 29 is provided. Since one DC/DC converter 24 is shared for the conversion of the trolley voltage Vtry and the conversion of the battery voltage Vbat1, increases in the cost and the size of the energy supply system 17 are suppressed.

When the haul vehicle 1 travels on a climbing road, the traveling drive motor 8 is driven on the basis of power from the trolley wire 13. High-speed traveling is achieved and productivity is improved on a climbing road as a result of the supply of high-output power from the outside. In addition, the use of trolley power in high-load trolley sections can reduce power consumption of the capacitive storage battery 29.

Surplus power from the trolley wire 13 is used to charge the output storage battery 35B. Since the traveling drive motor 8 is driven by power from the output storage battery 35B, the power consumption of the capacitive storage battery 29 can be reduced even during traveling on a travel path outside the trolley sections.

Third Embodiment

A third embodiment will be described. In the following description, components that are the same as or equivalent to those in the above-described embodiments will be given the same reference numerals, and description of the components will be simplified or omitted.

<Energy Supply System>

Figure 25:
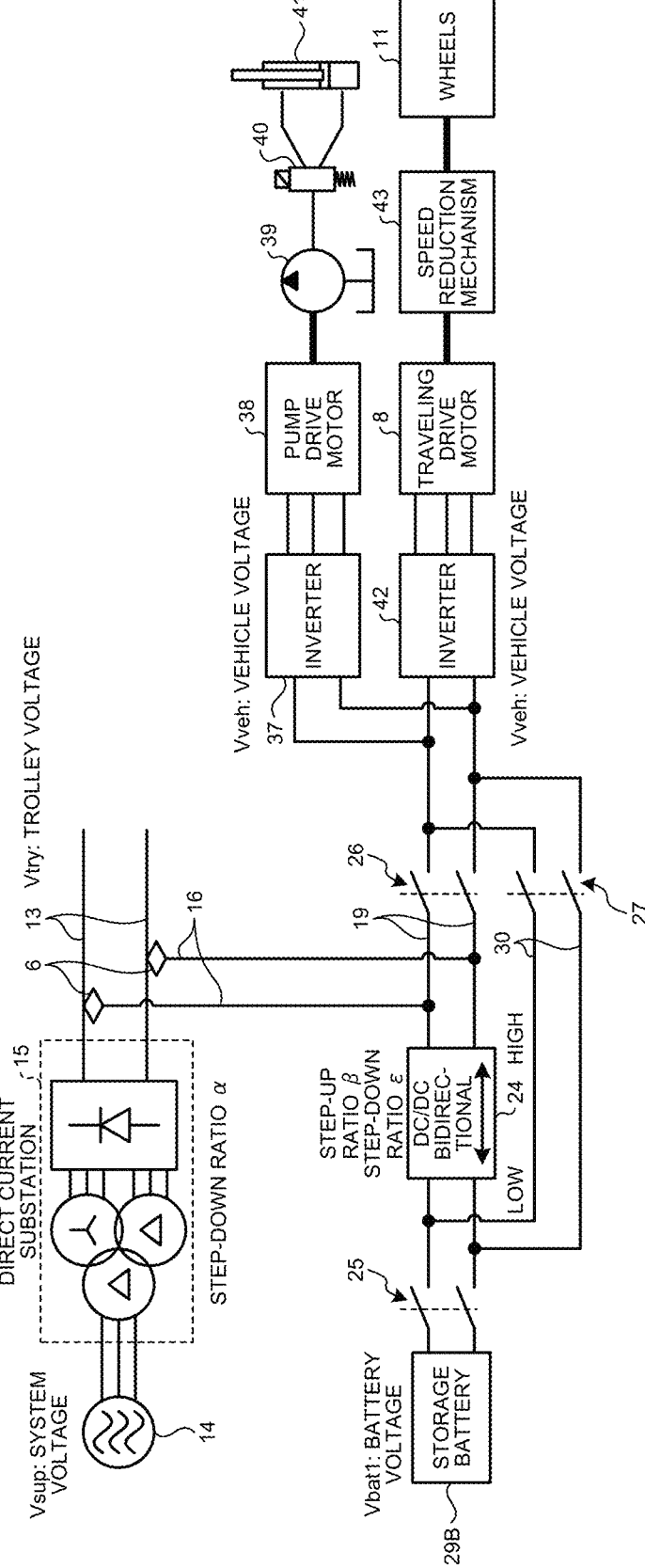
FIG. 25 is a hard block diagram illustrating an example of an energy supply system according to a third embodiment.

FIG. 25 is a hard block diagram illustrating an example of the energy supply system 17 according to the embodiment.

The energy supply system 17 includes the trolley power feed line 16, the power line 19, the power line 30, a storage battery 29B, the DC/DC converter 24, the first switch 25, the second switch 26, and the third switch 27.

The power line 30 is disposed in parallel with the power line 19. The first switch 25 is disposed in the power line 19 between the storage battery 29B and the DC/DC converter 24. The second switch 26 is disposed in the power line 19 between the DC/DC converter 24 and the vehicle drive system 18. The second switch 26 is disposed in the power line 19 between the connection between the trolley power feed line 16 and the power line 19 and the vehicle drive system 18. The third switch 27 is disposed in the power line 30. One end of the power line 30 is connected to the power line 19 between the first switch 25 and the DC/DC converter 24. The other end of the power line 30 is connected to the power line 19 between the second switch 26 and the vehicle drive system 18. The other end of the power line 30 is connected to the power line 19 between the second switch 26 and the vehicle drive system 18 via the power line 20.

The DC/DC converter 24 converts the trolley voltage Vtry of the trolley wire 13 and the battery voltage Vbat1 of the storage battery 29B. The DC/DC converter 24 is disposed in the power line 19 between the first switch 25 and the second switch 26. The trolley power feed line 16 is connected to the power line 19 between the DC/DC converter 24 and the second switch 26.

The DC/DC converter 24 is a bidirectional DC/DC converter capable of outputting power from a primary side to a secondary side and outputting power from the secondary side to the primary side. The primary side of the DC/DC converter 24 is a low-voltage side. The secondary side of the DC/DC converter 24 is a high-voltage side. The primary side of the DC/DC converter 24 is a side of the storage battery 29B, and the secondary side of the DC/DC converter 24 is the side of the trolley power feed line 16 (the side of the vehicle drive system 18).

The DC/DC converter 24 steps up the battery voltage Vbat1 by the certain step-up ratio β. The DC/DC converter 24 steps down the trolley voltage Vtry by a certain step-down ratio E. Power is supplied from at least one of the trolley wire 13 or the storage battery 29B to the vehicle drive system 18 via the DC/DC converter 24. At least one of the trolley voltage Vtry or the battery voltage Vbat1 converted by the DC/DC converter 24 is applied to the traveling drive motor 8 of the vehicle drive system 18.

The first switch 25, the second switch 26, and the third switch 27 constitute a switch mechanism for switching between a first state, in which power is supplied from the trolley wire 13 to the vehicle drive system 18 via the DC/DC converter 24, and a second state, in which power is supplied from the storage battery 29B to the vehicle drive system 18 via the DC/DC converter 24.

By controlling the first switch 25, the second switch 26, and the third switch 27, the first state, in which power is supplied from the trolley wire 13 to the vehicle drive system 18, and the second state, in which power is supplied from the storage battery 29B to the vehicle drive system 18, are switched. When power is supplied to the vehicle drive system 18, the traveling drive motor 8 is driven.

When power is supplied from the trolley wire 13 to the vehicle drive system 18, the first switch 25 is opened, the second switch 26 is opened, and the third switch 27 is closed. Power from the trolley wire 13 is input from the secondary side of the DC/DC converter 24 to the DC/DC converter 24, stepped down by the certain step-down ratio ¿, and then supplied to the vehicle drive system 18 via the power line 30 and the third switch 27. The traveling drive motor 8 generates driving force for rotating the rear wheels 11R on the basis of power from the trolley wire 13.

When power is supplied from the storage battery 29B to the vehicle drive system 18, the first switch 25 is closed, the second switch 26 is closed, and the third switch 27 is opened. Power from the storage battery 29B is input to the DC/DC converter 24 from the primary side of the DC/DC converter 24 via the first switch 25, stepped up by the certain step-up ratio, and then supplied to the vehicle drive system 18 via the second switch 26. The traveling drive motor 8 generates driving force for rotating the rear wheels 11R on the basis of power from the storage battery 29B.

When the first switch 25 is closed, the second switch 26 is opened, and the third switch 27 is opened, the storage battery 29B is charged with power supplied from the trolley wire 13 via the DC/DC converter 24.

The DC/DC converter 24 is a shared DC/DC converter shared for the conversion of the trolley voltage Vtry and conversion of the battery voltage Vbat1. Since the DC/DC converter 24 is shared for the supply of power from the trolley wire 13 to the vehicle drive system 18 and the supply of power from the storage battery 29B to the vehicle drive system 18, an increase in the cost of the energy supply system 17 is suppressed. In addition, since one DC/DC converter 24 is shared for the conversion of the trolley voltage Vtry and the conversion of the battery voltage Vbat1, an increase in the size of the energy supply system 17 is suppressed.

Figure 26:
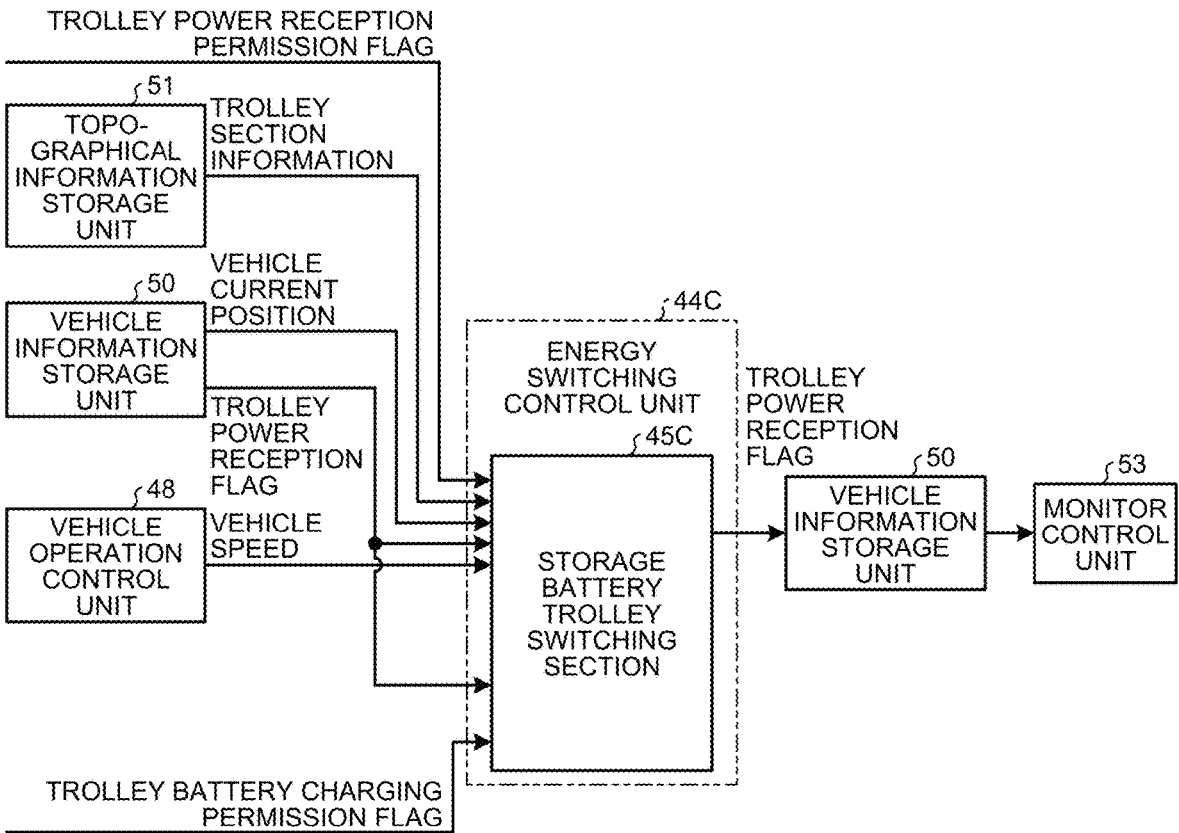
FIG. 26 is a soft block diagram illustrating an example of a control apparatus according to the third embodiment.

FIG. 26 is a soft block diagram illustrating an example of the control apparatus 10 according to the embodiment.

The control apparatus 10 includes the energy control unit 47, the vehicle operation control unit 48, the vehicle information storage unit 50, the topographical information storage unit 51, an energy switching control unit 44C, and the monitor control unit 53. The energy switching control unit 44C includes a storage battery trolley switching section 45C.

The vehicle operation control unit 48 monitors vehicle speed, which indicates traveling speed of the traveling apparatus 4.

The vehicle information storage unit 50 acquires data detected by the position sensor 9. The position sensor 9 detects a current position of the vehicle body 3. The vehicle information storage unit 50 acquires data detected by the position sensor 9 and monitors the current position of the vehicle body 3.

The topographical information storage unit 51 stores map information regarding the work site. As described later, trolley switching sections, trolley sections, and storage battery switching sections are set in the work site. In the embodiment, the map information includes positional information regarding trolley switching sections, positional information regarding trolley sections, and positional information regarding storage battery switching sections.

The storage battery trolley switching section 45C controls the switch mechanism including the first switch 25, the second switch 26, and the third switch 27 such that the first state, in which power is supplied from the trolley wire 13 to the vehicle drive system 18, and the second state, in which power is supplied from the storage battery 29B to the vehicle drive system 18, are switched. The storage battery trolley switching section 45C controls the switch mechanism in such a way as to switch between the first state and the second state on the basis of the trolley power reception permission signal (trolley power reception permission flag) input from the first input unit 61, the map information including the positional information regarding trolley sections input from the topographical information storage unit 51, the current position of the vehicle body 3 input from the vehicle information storage unit 50, the trolley power reception flag input from the vehicle information storage unit 50, and the vehicle speed input from the vehicle operation control unit 48.

The storage battery trolley switching section 45C transmits the trolley power reception flag indicating that storage battery trolley switching control has been switched to the trolley power reception state to the vehicle information storage unit 50. The vehicle information storage unit 50 stores the trolley power reception flag.

The monitor control unit 53 displays a trolley power reception state on the monitor 54 on the basis of the trolley power reception flag from the vehicle information storage unit 50.

FIG. 27 is an image diagram illustrating an example of an operation of the energy supply system 17 according to the embodiment. As illustrated in FIG. 27, the trolley wire 13 is provided on a climbing road at the work site. Trolley switching sections, trolley sections, and storage battery switching sections are set in a travel path in the work site. The trolley switching sections are set before climbing roads. The trolley sections are set on the climbing roads. The storage battery switching sections are set after the climbing roads.

The storage battery trolley switching section 45C controls the switch mechanism such that the vehicle drive system 18 is driven on the basis of power output from the storage battery 29B in storage battery travel sections before the trolley switching sections.

In the trolley switching sections, the storage battery trolley switching section 45C controls the switch mechanism in such a way as to switch from the second state, in which power is supplied from the storage battery 29B to the vehicle drive system 18, to the first state, in which power is supplied from the trolley wire 13 to the vehicle drive system 18. The trolley switching section is a coasting section where the output of power from the storage battery 29B is stopped and the haul vehicle 1 coasts.

The trolley sections are trolley power supply travel sections where the vehicle drive system 18 is driven only by power supplied from the trolley wire 13. The storage battery trolley switching section 45C controls the switch mechanism in such a way as to maintain the first state, in which power is supplied from the trolley wire 13 to the vehicle drive system 18, in the trolley sections.

In the storage battery switching sections, the storage battery trolley switching section 45C controls the switch mechanism in such a way as to switch from the first state, in which power is supplied from the trolley wire 13 to the vehicle drive system 18, to the second state, in which power is supplied from the storage battery 29B to the vehicle drive system 18. The storage battery switching sections are coasting sections where reception of power from the trolley wire 13 is stopped and the haul vehicle 1 coasts.

The storage battery trolley switching section 45C controls the switch mechanism such that the vehicle drive system 18 is driven on the basis of power output from the storage battery 29B in storage battery travel sections after the storage battery switching sections.

Figure 28:
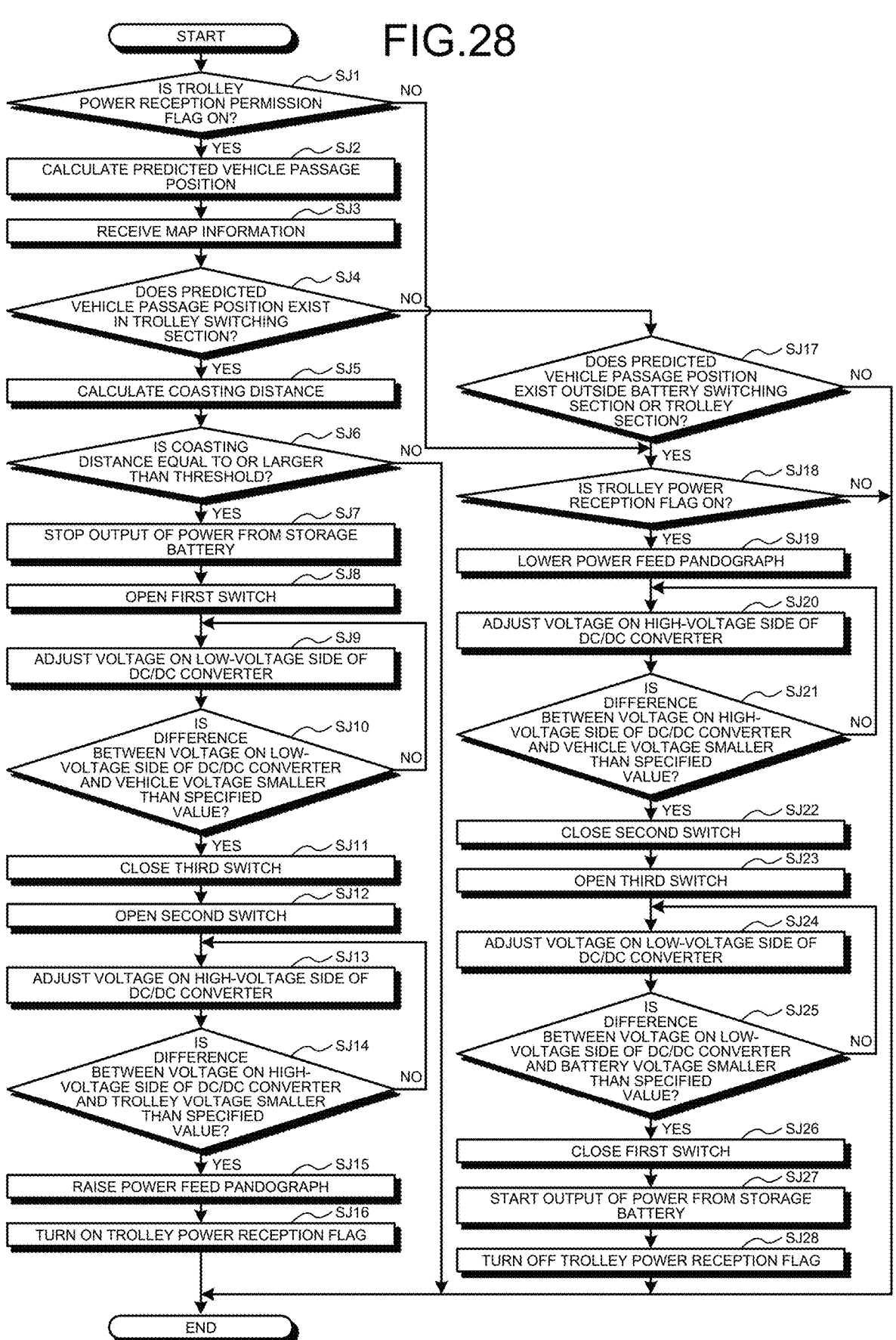
FIG. 28 is a flowchart illustrating an example of a method for controlling a haul vehicle according to the third embodiment.

FIG. 28 is a flowchart illustrating an example of a method for controlling the haul vehicle 1 according to the embodiment. FIG. 28 illustrates a method for controlling the haul vehicle 1 at a time when the haul vehicle 1 including the energy supply system 17 illustrated in FIG. 25 travels on the climbing road illustrated in FIG. 27.

When the haul vehicle 1 travels in a storage battery travel section, the storage battery trolley switching section 45C controls the switch mechanism such that power is supplied from the storage battery 29B to the vehicle drive system 18. The first switch 25 is closed, the second switch 26 is closed, and the third switch 27 is opened.

The storage battery trolley switching section 45C determines whether the trolley power reception permission flag is on (step SJ1).

If it is determined in step SJ1 that the trolley power reception permission flag is on (step SJ1: Yes), the storage battery trolley switching section 45C calculates the predicted vehicle passage position on the basis of the current position of the vehicle body 3 input from the vehicle information storage unit 50 and the vehicle speed input from the vehicle operation control unit 48 (step SJ2).

The storage battery trolley switching section 45C receives the map information regarding the work site from the topographical information storage unit 51 (step SJ3).

The storage battery trolley switching section 45C determines whether the predicted vehicle passage position exists in a trolley switching section (step SJ4).

If it is determined in step SJ4 that the predicted vehicle passage position exists in a trolley switching section (step SJ4: Yes), the storage battery trolley switching section 45C calculates a coasting distance on the basis of the vehicle speed (step SJ5).

The storage battery trolley switching section 45C determines whether the coasting distance calculated in step SJ5 is longer than or equal to a predetermined threshold (step SJ6).

If it is determined in step SJ6 that the coasting distance is longer than or equal to the threshold (step SJ6: Yes), the storage battery trolley switching section 45C stops the output of power from the storage battery 29B (step SJ7).

The storage battery trolley switching section 45C opens the first switch 25 (step SJ8).

The storage battery trolley switching section 45C adjusts the voltage on the low-voltage side (primary side) of the DC/DC converter 24 (step SJ9).

The storage battery trolley switching section 45C determines whether a difference between the voltage on the low-voltage side of the DC/DC converter 24 and a vehicle voltage Vveh of the inverter 37 or 42 has fallen below a predetermined specified value (step SJ10).

If it is determined in step SJ10 that the difference between the voltage on the low-voltage side of the DC/DC converter 24 and the vehicle voltage Vveh has not fallen below the specified value (step SJ10: No), the storage battery trolley switching section 45C returns to the processing in step SJ9.

If it is determined in step SJ10 that the difference between the voltage on the low-voltage side of the DC/DC converter 24 and the vehicle voltage Vveh has fallen below the specified value (step SJ10: Yes), the storage battery trolley switching section 45C closes the third switch 27 (step SJ11).

The storage battery trolley switching section 45C opens the second switch 26 (step SJ12).

The storage battery trolley switching section 45C adjusts the voltage on the high-voltage side (secondary side) of the DC/DC converter 24 (step SJ13).

The storage battery trolley switching section 45C determines whether the difference between the voltage on the high-voltage side of the DC/DC converter 24 and the trolley voltage Vtry has fallen below a predetermined specified value (step SJ14).

If it is determined in step SJ14 that the difference between the voltage on the high-voltage side of the DC/DC converter 24 and the trolley voltage Vtry has not fallen below the specified value (step SJ14: No), the storage battery trolley switching section 45C returns to the processing in step SJ13.

If it is determined in step SJ14 that the difference between the voltage on the high-voltage side of the DC/DC converter 24 and the trolley voltage Vtry has fallen below the specified value (step SJ14: Yes), the storage battery trolley switching section 45C raises the power feed pantograph 6 (step SJ15).

The storage battery trolley switching section 45C determines that reception of power from the trolley wire 13 has started, and turns on the trolley power reception flag (step SJ16).

If it is determined in step SJ4 that the predicted vehicle passage position does not exist in a trolley switching section (step SJ4: No), the storage battery trolley switching section 45C determines whether the predicted vehicle passage position exists outside a storage battery switching section or a trolley section (step SJ17).

If it is determined in step SJ17 that the predicted vehicle passage position exists outside a storage battery switching section or a trolley section (step SJ17: Yes), or if it is determined in step SJ1 that the trolley power reception permission flag is not ON (step SJ1: No), the storage battery trolley switching section 45C determines whether the trolley power reception flag is on (step SJ18).

If it is determined in step SJ18 that the trolley power reception flag is on (step SJ18: Yes), the storage battery trolley switching section 45C lowers the power feed pantograph 6 (step SJ19).

The storage battery trolley switching section 45C adjusts the voltage on the high-voltage side of the DC/DC converter 24 (step SJ20).

The storage battery trolley switching section 45C determines whether a difference between the voltage on the high-voltage side of the DC/DC converter 24 and the vehicle voltage Vveh has fallen below a predetermined specified value (step SJ21).

If it is determined in step SJ21 that the difference between the voltage on the high-voltage side of the DC/DC converter 24 and the vehicle voltage Vveh has not fallen below the specified value (step SJ21: No), the storage battery trolley switching section 45C returns to the processing in step SJ20.

If it is determined in step SJ21 that the difference between the voltage on the high-voltage side of the DC/DC converter 24 and the vehicle voltage Vveh has not fallen below the specified value (step SJ21: Yes), the storage battery trolley switching section 45C closes the second switch 26 (step SJ22).

The storage battery trolley switching section 45C opens the third switch 27 (step SJ23).

The storage battery trolley switching section 45C adjusts the voltage on the low-voltage side (primary side) of the DC/DC converter 24 (step SJ24).

The storage battery trolley switching section 45C determines whether the difference between the voltage on the low-voltage side of the DC/DC converter 24 and the battery voltage Vbat1 has fallen below a predetermined specified value (step SJ25).

If it is determined in step SJ25 that the difference between the voltage on the low-voltage side of the DC/DC converter 24 and the battery voltage Vbat1 has not fallen below the specified value (step SJ25: No), the storage battery trolley switching section 45C returns to the processing in step SJ24.

If it is determined in step SJ25 that the difference between the voltage on the low-voltage side of the DC/DC converter 24 and the battery voltage Vbat1 has fallen below the specified value (step SJ25: Yes), the storage battery trolley switching section 45C closes the first switch 25 (step SJ26).

The storage battery trolley switching section 45C starts output of power from the storage battery 29B (step SJ27).

The storage battery trolley switching section 45C determines that the reception of power from the trolley wire 13 has stopped, and turns off the trolley power reception flag (step SJ28).

When the processing in step SJ16 has ended, if it is determined in step SJ6 that the coasting distance is not greater than or equal to the threshold (step SJ6: No), if it is determined in step SJ17 that the predicted vehicle passage position does not exist outside a storage battery switching section or a trolley section (step SJ17: No), if it is determined in step SJ18 that the trolley power reception flag is off (step SJ18: No), or when the processing in step SJ28 has ended, the process ends.

Effects

As described above, according to the embodiment, power is supplied from the trolley wire 13 to the haul vehicle 1. In addition, the storage battery 29B of the haul vehicle 1 is charged with power supplied from the trolley wire 13 via the DC/DC converter 24. The first state, in which power is supplied from the trolley wire 13 to the traveling drive motor 8 of the haul vehicle 1 via the DC/DC converter 24, and the second state, in which power is supplied from the storage battery 29B to the traveling drive motor via the DC/DC converter 24, are switched. The traveling drive motor 8 generates driving force for rotating the rear wheels 11R on the basis of power from at least one of the trolley wire 13 or the storage battery 29B. The haul vehicle 1 travels on the driving force generated by the traveling drive motor 8. Since exhaust gas is not discharged from the haul vehicle 1, pollution of the environment of the work site is controlled.

[Computer System]

Figure 29:
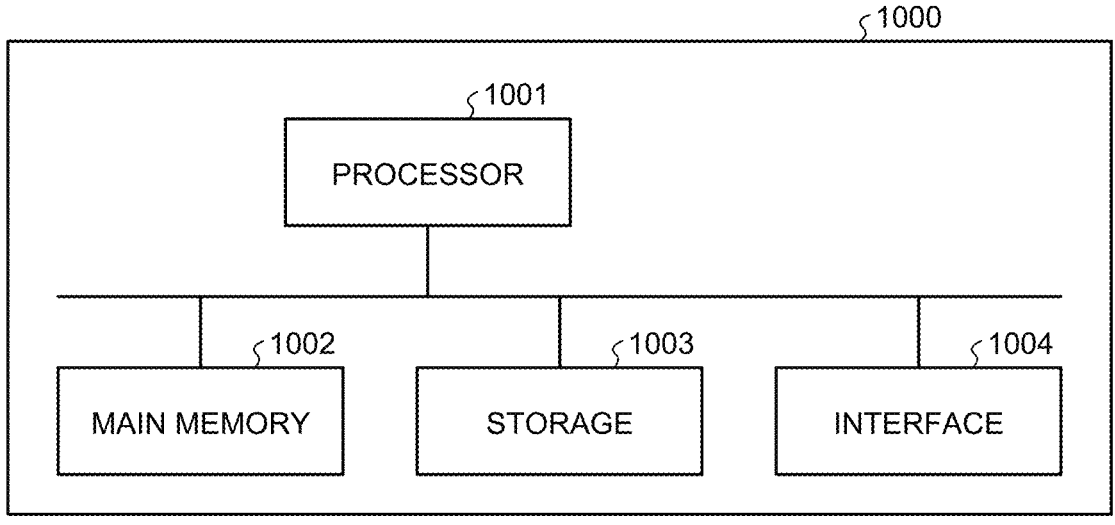
FIG. 29 is a block diagram illustrating a computer system according to the embodiments.

FIG. 29 is a block diagram illustrating a computer system 1000 according to the embodiments. The above-described control apparatus 10 includes a computer system 1000. The computer system 1000 includes a processor 1001 such as a central processing unit (CPU), a main memory 1002 including a nonvolatile memory such as a read-only memory (ROM) and a volatile memory such as a random-access memory (RAM), a storage 1003, and an interface 1004 including an input/output circuit. The function of the above-described control apparatus 10 is stored in the storage 1003 as a computer program. The processor 1001 reads the computer program from the storage 1003, loads the computer program into the main memory 1002, and performs the above-described processing in accordance with the computer program. Note that the computer program may be distributed to the computer system 1000 over a network.

Other Embodiments

It is assumed in the above-described embodiments that power is supplied from the trolley wire 13 to a haul vehicle such as a dump truck that travels in a work site and that transports a load. In another embodiment, power may be supplied from the trolley wire 13 to a work machine instead of the haul vehicle.

It is assumed in the above-described embodiments that the storage battery 35 is charged with power from at least one of the trolley wire 13 or the fuel cell 7. The storage battery 35 may be charged by a regenerative brake, instead.

It is assumed in the above-described embodiments that the output storage battery 35B is charged with power from at least one of the trolley wire 13 or the capacitive storage battery 29. The output storage battery 35B may be charged by a regenerative brake, instead.

REFERENCE SIGNS LIST

1 HAUL VEHICLE
2 DUMP BODY
3 VEHICLE BODY
4 TRAVELING APPARATUS
5 TROLLEY POWER RECEIVING APPARATUS
6 POWER FEED PANTOGRAPH
7 FUEL CELL
8 TRAVELING DRIVE MOTOR
9 POSITION SENSOR
10 CONTROL APPARATUS
11 WHEELS
11F FRONT WHEELS
11R REAR WHEELS
12 TIRES
12F FRONT TIRES
12R REAR TIRES
13 TROLLEY WIRE
14 POWER PLANT
15 DIRECT CURRENT SUBSTATION
16 TROLLEY POWER FEED LINE
17 ENERGY SUPPLY SYSTEM
18 VEHICLE DRIVE SYSTEM
19 POWER LINE
20 POWER LINE
21 DC/DC CONVERTER
22 DC/DC CONVERTER
23 DC/DC CONVERTER
24 DC/DC CONVERTER
25 FIRST SWITCH
26 SECOND SWITCH
26B FIRST SWITCH
27 THIRD SWITCH
27B SECOND SWITCH
28 DIODE
29 CAPACITIVE STORAGE BATTERY
29B STORAGE BATTERY
30 POWER LINE
31 CHARGING PORT
32 DIODE
33 HYDROGEN TANK
34 HYDROGEN SUPPLY APPARATUS
35 STORAGE BATTERY
35B OUTPUT STORAGE BATTERY
36 VOLTAGE CONVERSION APPARATUS
37 INVERTER
38 PUMP DRIVE MOTOR
39 HYDRAULIC PUMP
40 CONTROL VALVE
41 HOIST CYLINDER
42 INVERTER
43 SPEED REDUCTION MECHANISM
44 ENERGY SWITCHING CONTROL UNIT
44B ENERGY SWITCHING CONTROL UNIT
44C ENERGY SWITCHING CONTROL UNIT
45 FC TROLLEY SWITCHING SECTION

45B STORAGE BATTERY TROLLEY SWITCHING SECTION

45C STORAGE BATTERY TROLLEY SWITCHING SECTION

46 TROLLEY STORAGE BATTERY CHARGING SECTION

47 ENERGY CONTROL UNIT

48 VEHICLE OPERATION CONTROL UNIT

50 VEHICLE INFORMATION STORAGE UNIT

51 TOPOGRAPHICAL INFORMATION STORAGE UNIT

53 MONITOR CONTROL UNIT

54 MONITOR

56 ACCELERATOR BRAKE PEDAL

57 SHIFT LEVER

58 LIFT LEVER

61 FIRST INPUT UNIT

62 SECOND INPUT UNIT

1000 COMPUTER SYSTEM

1001 PROCESSOR

1002 MAIN MEMORY

1003 STORAGE

1004 INTERFACE

The invention claimed is:

1. A haul vehicle comprising:

a dump body;

a vehicle body supporting the dump body;

a traveling apparatus including driving wheels and supporting the vehicle body;

a trolley power receiving apparatus to which power is supplied from a trolley wire;

a fuel cell that generates power through electrochemical reaction between hydrogen and oxygen;

an electric motor that generates driving force for rotating the driving wheels on a basis of power from at least one of the trolley wire or the fuel cell;

a shared DC/DC converter that converts voltage of the trolley wire and voltage of the fuel cell, wherein in a first state, power is supplied from the trolley wire to the electric motor via the shared DC/DC converter, and in a second state, power is supplied from the fuel cell to the electric motor via the shared DC/DC converter; and an inverter that converts a direct current from the shared DC/DC converter into a three-phase alternating current and supplies the three-phase alternating current to the electric motor.

2. The haul vehicle according to claim 1, further comprising:

a first DC/DC converter that converts voltage of the trolley wire, wherein the voltage converted by the first DC/DC converter is applied to the electric motor.

3. The haul vehicle according to claim 1, further comprising:

a second DC/DC converter that converts voltage of the fuel cell, wherein the voltage converted by the second DC/DC converter is applied to the electric motor.

4. The haul vehicle according to claim 1, wherein the shared DC/DC converter steps up the voltage supplied from the fuel cell and steps down the voltage supplied from the trolley wire.

5. The haul vehicle according to claim 1, further comprising:

a switch mechanism that switches between the first state and the second state.

6. The haul vehicle according to claim 5, further comprising:

a position sensor that detects a current position of the vehicle body;

a topographical information storage unit that stores map information regarding a work site; and an FC trolley switching section that determines whether it is a trolley section and controls the switch mechanism in such a way as to switch between the first state and the second state on a basis of the current position and the map information.

7. The haul vehicle according to claim 1, further comprising:

a storage battery charged with power from at least one of the trolley wire or the fuel cell, wherein the electric motor generates the driving force on a basis of power from the storage battery.

8. The haul vehicle according to claim 7, further comprising:

a third DC/DC converter that converts voltage of the storage battery, wherein the voltage converted by the third DC/DC converter is applied to the electric motor.

9. The haul vehicle according to claim 7, further comprising:

a trolley storage battery charging section that charges the storage battery with power from the trolley wire on a basis of a charge state of the storage battery.

10. A haul vehicle comprising:

a dump body;

a vehicle body supporting the dump body;

a traveling apparatus including driving wheels and supporting the vehicle body;

a trolley power receiving apparatus to which power is supplied from a trolley wire;

a first storage battery charged via a charging port;

an electric motor that generates driving force for rotating the driving wheels on a basis of power from at least one of the trolley wire or the first storage battery;

a shared DC/DC converter that converts voltage of the trolley wire and voltage of a fuel cell, wherein in a first state, power is supplied from the trolley wire to the electric motor via the shared DC/DC converter, and in a second state, power is supplied from the fuel cell to the electric motor via the shared DC/DC converter; and an inverter that converts a direct current from the shared DC/DC converter into a three-phase alternating current and supplies the three-phase alternating current to the electric motor.

11. The haul vehicle according to claim 10, wherein the shared DC/DC converter converts voltage of the trolley wire and voltage of the first storage battery.

12. The haul vehicle according to claim 11, further comprising:

a switch mechanism that switches between the first state and the second state.

13. The haul vehicle according to claim 12, further comprising:

a position sensor that detects a current position of the vehicle body;

a topographical information storage unit that stores map information regarding a work site; and a storage battery trolley switching section that controls the switch mechanism in such a way as to switch between the first state and the second state on a basis of the current position and the map information.

14. The haul vehicle according to claim 10, further comprising:

a second storage battery charged with power from at least one of the trolley wire or the first storage battery, wherein the electric motor generates the driving force on a basis of power from the second storage battery.

15. The haul vehicle according to claim 14, further comprising:

a second DC/DC converter that converts voltage of the second storage battery, wherein the voltage converted by the second DC/DC converter is applied to the electric motor.

16. The haul vehicle according to claim 14, further comprising:

a trolley storage battery charging section that charges the second storage battery with power from the trolley wire on a basis of a charge state of the second storage battery.

17. A method of controlling a haul vehicle, the method comprising:

supplying power from a trolley wire to the haul vehicle;

causing a fuel cell of the haul vehicle to generate power;

supplying power from at least one of the trolley wire or the fuel cell to an electric motor of the haul vehicle;

causing the haul vehicle to travel on driving force generated by the electric motor using a shared DC/DC converter to convert voltage of the trolley wire and voltage of the fuel cell, wherein in a first state, power is supplied from the trolley wire to the electric motor via the shared DC/DC converter, and in a second state, power is supplied from the fuel cell to the electric motor via the shared DC/DC converter; and using an inverter to convert a direct current from the shared DC/DC converter into a three-phase alternating current and suppling the three-phase alternating current to the electric motor.

* * * * *